(12) United States Patent
Wang et al.

(10) Patent No.: US 12,399,002 B2
(45) Date of Patent: Aug. 26, 2025

(54) ANGLE DETERMINING METHOD, ELECTRONIC DEVICE, AND CHIP SYSTEM

(71) Applicant: Huawei Technologies Co., Ltd., Shenzhen (CN)

(72) Inventors: Qi Wang, Shenzhen (CN); Zhenguo Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 18/360,987

(22) Filed: Jul. 28, 2023

(65) Prior Publication Data

US 2023/0366676 A1 Nov. 16, 2023

Related U.S. Application Data

(63) Continuation of application No. PCT/CN2021/137947, filed on Dec. 14, 2021.

(30) Foreign Application Priority Data

Jan. 30, 2021 (CN) .......................... 202110139651.9

(51) Int. Cl.
*G01B 17/00* (2006.01)
(52) U.S. Cl.
CPC .................. *G01B 17/00* (2013.01)
(58) Field of Classification Search
CPC ......... G01B 17/00; G01S 3/802; G01S 5/186; G01C 1/00
See application file for complete search history.

(56) References Cited

U.S. PATENT DOCUMENTS

| 8,174,933 | B1 * | 5/2012 | Jitkoff | G01S 5/26 367/128 |
| 9,086,475 | B2 * | 7/2015 | Kleijn | G01S 3/80 |
| 9,170,325 | B2 * | 10/2015 | Zhang | G01S 11/14 |
| 2013/0201097 | A1 * | 8/2013 | Pasquero | G06F 3/0488 345/156 |

(Continued)

FOREIGN PATENT DOCUMENTS

| CN | 112098946 A | * 12/2020 | |
| CN | 112256130 A | * 1/2021 | G01S 3/802 |

(Continued)

*Primary Examiner* — Daniel Pihulic
(74) *Attorney, Agent, or Firm* — Conley Rose, P.C.

(57) ABSTRACT

A method includes: sending at least two sound wave signals through a loudspeaker; receiving, through a microphone, at least two sound wave signals from a second electronic device, and determining a first receiving result of receiving the at least two sound wave signals; determining a first possible angle value between the second electronic device and a first electronic device based on the first receiving result; and receiving a second possible angle value between the first electronic device and the second electronic device that is from the second electronic device, and determining an actual angle between the first electronic device and the second electronic device based on the first possible angle value and the second possible angle value; or sending the first possible angle value to the second electronic device, and receiving an actual angle between the first electronic device and the second electronic device.

20 Claims, 22 Drawing Sheets

(56) References Cited

U.S. PATENT DOCUMENTS

| | | | | |
|---|---|---|---|---|
| 2015/0062091 A1* | 3/2015 | Li | ......................... | G06F 3/0418 |
| | | | | 345/177 |
| 2023/0333850 A1* | 10/2023 | Liu | ......................... | G06F 1/163 |
| 2023/0366676 A1* | 11/2023 | Wang | ....................... | G01C 1/00 |

FOREIGN PATENT DOCUMENTS

| | | | | | | |
|---|---|---|---|---|---|---|
| CN | 113873444 A | * | 12/2021 | | | |
| CN | 114363457 A | * | 4/2022 | ........... | G01S 5/0284 |
| CN | 114839594 A | * | 8/2022 | ............. | G01B 17/00 |
| CN | 115914905 A | * | 4/2023 | | | |
| CN | 117388644 A | * | 1/2024 | ......... | G01R 31/1209 |
| CN | 119484696 A | * | 2/2025 | ........... | G01S 5/0284 |
| EP | 4258006 A1 | * | 10/2023 | ........... | G01S 15/104 |
| EP | 4270042 A1 | * | 11/2023 | ............. | G01B 17/00 |
| WO | WO-2022160986 A1 | * | 8/2022 | ............. | G01B 17/00 |

\* cited by examiner

First electronic device 100

Second electronic device 200

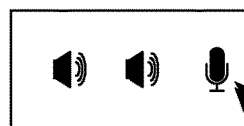
First electronic device
First electronic device
Second electronic device
FIG. 21A
Second electronic device
FIG. 21B
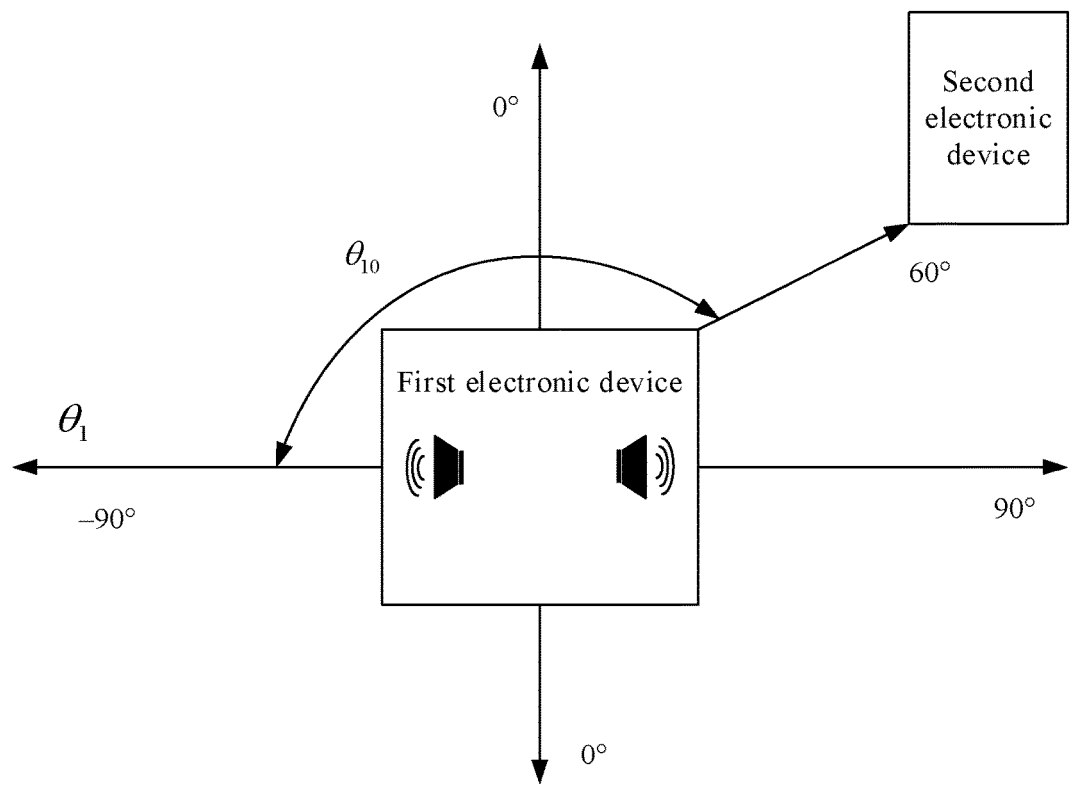
FIG. 22

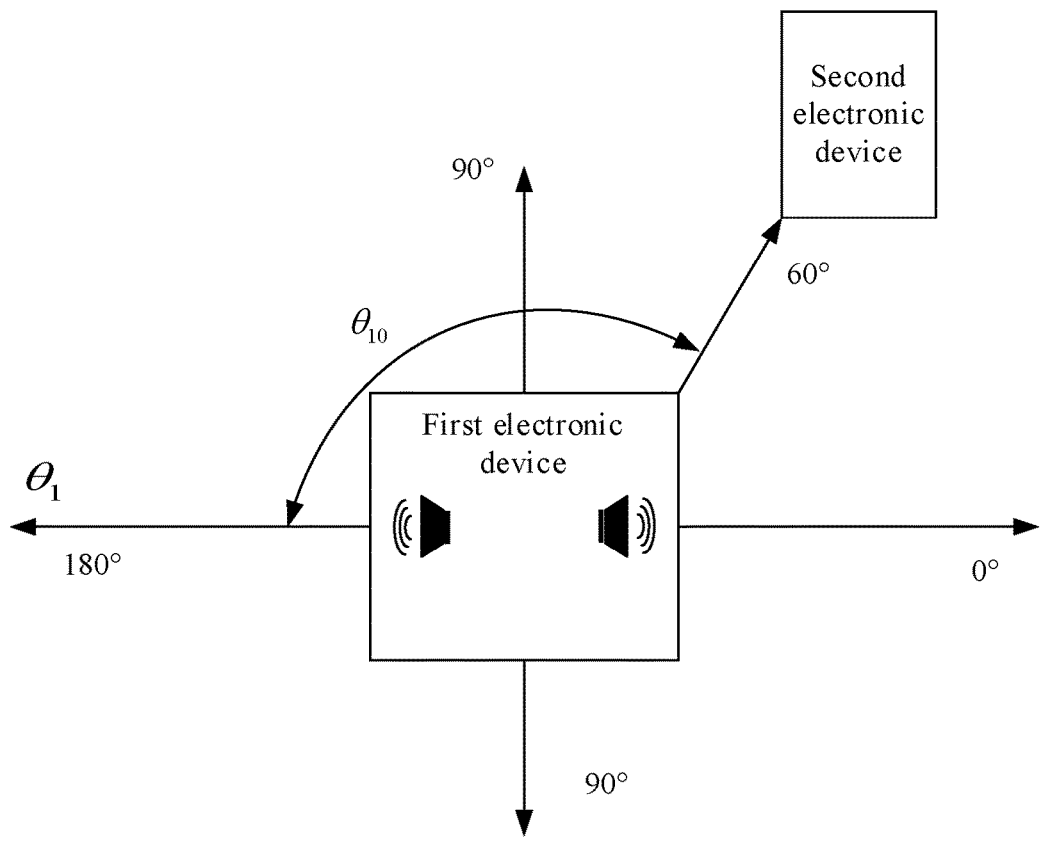
FIG. 23
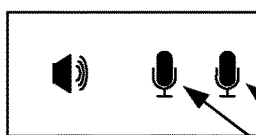
First electronic device
First electronic device
Second electronic device
FIG. 24A
Second electronic device
FIG. 24B First electronic device First electronic device Second electronic device Second electronic device First electronic device First electronic device Second electronic device Second electronic device First electronic device First electronic device Second electronic device Second electronic device First electronic device
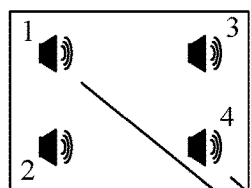
First electronic device
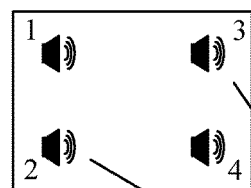
Second electronic device
FIG. 28A
Second electronic device
FIG. 28B
First electronic device
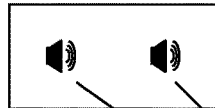
First electronic device
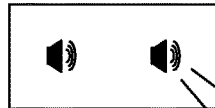
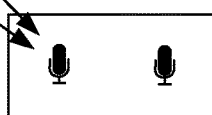
Second electronic device
FIG. 29A
Second electronic device
FIG. 29B

ANGLE DETERMINING METHOD, ELECTRONIC DEVICE, AND CHIP SYSTEM

CROSS-REFERENCE TO RELATED APPLICATIONS

This is a continuation of International Patent Application No. PCT/CN2021/137947, filed on Dec. 14, 2021, which claims priority to Chinese Patent Application No. 202110139651.9, filed on Jan. 30, 2021. The disclosures of the aforementioned applications are hereby incorporated by reference in their entireties.

TECHNICAL FIELD

This disclosure relates to the field of terminal technologies, and in particular, to an angle determining method, an electronic device, and a chip system.

BACKGROUND

With an increase in types and a quantity of electronic devices, a requirement for interaction between a plurality of electronic devices is increasing. When interaction is established between the plurality of electronic devices, relative angles between the electronic devices usually need to be determined, and then identification and interaction operations between the plurality of electronic devices are implemented based on the relative angles. For example, in a scenario in which a plurality of sound boxes implement stereo sound effects, sound fields of the sound boxes may be adjusted based on relative angles between the sound boxes, so as to implement a plurality of stereo sound effects.

A process of determining a relative angle between electronic devices is described by using a first electronic device and a second electronic device as an example. For example, the first electronic device includes one audio sending unit (for example, a loudspeaker), and the second electronic device includes a plurality of audio receiving units (for example, microphones). The audio sending unit sends an ultrasound signal, and the plurality of audio receiving units receive the ultrasound signal. The second electronic device determines a relative angle between the first electronic device and the second electronic device based on time differences of receiving the ultrasound signals by the plurality of audio receiving units.

However, the foregoing process requires that the second electronic device has the plurality of audio receiving units, and the plurality of audio receiving units need to be located on one straight line. Otherwise, a location of the electronic device cannot be uniquely determined based on the determined relative angle.

SUMMARY

This disclosure provides an angle determining method, an electronic device, and a chip system, to determine an actual angle between electronic devices, and further determine accurate locations between the electronic devices.

To achieve the foregoing objective, the following technical solutions are used in this application.

According to a first aspect, an embodiment provides an angle determining method, applied to a first electronic device. The method includes sending at least two sound wave signals through a loudspeaker, receiving, through a microphone, at least two sound wave signals sent by a second electronic device, and determining a first receiving result of receiving the at least two sound wave signals, determining a first possible angle value between the second electronic device and the first electronic device based on the first receiving result, and receiving a second possible angle value between the first electronic device and the second electronic device that is sent by the second electronic device, where the second possible angle value is determined based on a second receiving result, and the second receiving result is a receiving result of receiving the at least two sound wave signals through a microphone of the second electronic device, and determining an actual angle between the first electronic device and the second electronic device based on the first possible angle value and the second possible angle value or sending the first possible angle value to the second electronic device, and receiving an actual angle between the first electronic device and the second electronic device that is sent by the second electronic device, where the actual angle is determined by the second electronic device based on the first possible angle value and the second possible angle value, the second possible angle value is determined based on a second receiving result, and the second receiving result is a receiving result of receiving, through a microphone of the second electronic device, the sound wave signals sent by the first electronic device.

According to the angle determining method, the first possible angle value is obtained based on the first electronic device. For one known first possible angle value, there are two relative locations between the second electronic device and the first electronic device. Similarly, the second possible angle value is obtained based on the second electronic device. For one known second possible angle value, there are two relative locations between the second electronic device and the first electronic device. Therefore, actual locations between the first electronic device and the second electronic device cannot be determined based on the first possible angle value or the second possible angle value. The first possible angle value is an angle value of the second electronic device relative to the first electronic device, and the second possible angle value is an angle value of the first electronic device relative to the second electronic device, so that the first possible angle value is relative to the second possible angle value. Therefore, an actual angle between the first electronic device and the second electronic device can be determined based on the first possible angle value and the second possible angle value, and the actual locations between the first electronic device and the second electronic device can be determined based on the actual angle.

In this embodiment, the sound wave signals may be sound wave signals with a same time sequence, or may be sound wave signals with different time sequences. The sound wave signals may be infrasonic wave signals with a frequency of 0 kilohertz (kHz) to 20 kHz, or may be ultrasound signals with a frequency of more than 20 kHz. For example, the sound wave signals may have a frequency of 1 kHz, 2 kHz, 3 kHz, 5 kHz, 10 kHz, 15 kHz, 20 kHz, or 30 kHz.

In some embodiments, the sound wave signals may be ultrasound signals.

With reference to the first aspect, in some embodiments, the first receiving result includes: a first time difference between receiving the at least two sound wave signals through the microphone of the first electronic device, or first signal strength of the at least two sound wave signals received through the microphone of the first electronic device.

For example, the at least two sound wave signals include a first sound wave signal and a second sound wave signal. The first time difference is a difference between a time at which the first sound wave signal is received through the microphone of the first electronic device and a time at which the second sound wave signal is received through the microphone of the first electronic device.

The first time difference may be represented as a difference τ* between a quantity of sampling points of the microphone of the first electronic device for the first sound wave signal and a quantity of sampling points of the microphone of the first electronic device for the second sound wave signal. After the first sound wave signal and the second sound wave signal arrive at the microphone of the first electronic device, the microphone samples the first sound wave signal and the second sound wave signal at a fixed sampling frequency $f_s$. For example, the sampling frequency $f_s$ is 48 kHz. Therefore, within a time t, a quantity of sampling points collected by the microphone is $t*f_s$. For example, if the first sound wave signal first arrives at the microphone and then the second sound wave signal arrives at the microphone, a quantity of sampling points of the microphone for the second sound wave signal is greater than a quantity of sampling points of the microphone for the first sound wave signal. The difference τ* between the two quantities of sampling points is a product of the sampling frequency and the time difference: $\Delta t \cdot f_s$, and $\Delta t$ is the first time difference.

For example, the at least two sound wave signals include a first sound wave signal and a second sound wave signal. The first signal strength may be average power of the first sound wave signal and average power of the second sound wave signal within a preset time period. A time length of the first sound wave signal is a first time length, and a time length of the second sound wave signal is a second time length. Then, the preset time period may be any value less than or equal to a smaller value between the first time length and the second time length. The time length of the first sound wave signal may be a time length corresponding to a start time at which the electronic device starts sending the first sound wave signal and an end time at which the electronic device stops sending the first sound wave signal. The time length of the second sound wave signal may be a time length corresponding to a start time at which the electronic device starts sending the first sound wave signal and an end time at which the electronic device stops sending the first sound wave signal.

With reference to the first aspect, in some embodiments, the determining a first possible angle value between the second electronic device and the first electronic device based on the first receiving result includes determining a first direction from the second electronic device to the first electronic device based on the first time difference or the first signal strength, determining a first included angle between the first direction and an orientation of the first electronic device, and determining two first possible angle values between the second electronic device and the first electronic device based on the first included angle and the orientation of the first electronic device.

The first direction is a direction from the second electronic device to the first electronic device. For example, the first direction may be a direction from a central point of the second electronic device to a central point of the first electronic device. The first direction may be obtained by calculating a first angle of the second electronic device relative to the first electronic device. In a coordinate system of the first electronic device, the first electronic device and the second electronic device may be used as two particles, and the particle corresponding to the first electronic device is an origin of the coordinate system of the first electronic device. The first angle of the second electronic device relative to the first electronic device is a first angle formed by a first edge corresponding to 0° in the coordinate system of the first electronic device and a second edge formed by the particle corresponding to the first electronic device to the particle corresponding to the second electronic device.

The orientation of the first electronic device may be a direction corresponding to a central point of a screen of the first electronic device to a midpoint of any edge of the screen of the first electronic device. Alternatively, a screen of the first electronic device is a rectangular screen, and the orientation of the first electronic device may be a corresponding direction perpendicular to a plane on which a side wall of the first electronic device is located and extending from the inside of the side wall to the outside of the side wall.

The orientation of the first electronic device corresponds to an angle value in a terrestrial coordinate system. For example, if the orientation of the first electronic device corresponds to a north magnetic pole, the orientation of the first electronic device may be defined as 0°; or if the orientation of the first electronic device corresponds to a south magnetic pole, the orientation of the first electronic device may be defined as 180°. An angle corresponding to any orientation between the north magnetic pole and the south magnetic pole in a clockwise direction may be obtained by evenly dividing 0° to 180°. An angle corresponding to any orientation between the south magnetic pole and the north magnetic pole in a clockwise direction may be obtained by evenly dividing 180° to 360°. Two edges of the angle value, in the terrestrial coordinate system, that corresponds to the orientation of the first electronic device are: an edge from a central point of the first electronic device 100 to the north magnetic pole (namely, an edge corresponding to 0°) and an edge corresponding to the orientation of the first electronic device.

For example, two edges forming the first included angle are respectively an edge corresponding to the direction (that is, the first direction) from the second electronic device to the first electronic device and the edge corresponding to the orientation of the first electronic device. The first electronic device may determine the first included angle based on the first angle, reference angles in the coordinate system of the first electronic device, and the orientation of the first electronic device. For example, the first included angle is an angle formed by a line corresponding to the first angle and a line corresponding to an angle corresponding to the orientation of the first electronic device.

In a scenario, when the reference angles are 90°, 0°, and −90°, the orientation of the first electronic device is consistent with −90° in the reference angles. If the first angle is 60°, the first included angle $\theta_{10}$ is an included angle between a line corresponding to the first angle 60° and a line corresponding to the reference angle −90°, in other words, $\theta_{10}=|60°-(-90°)|=150°$. In another scenario, when the reference angles are 90°, 0°, and −90°, the orientation of the first electronic device is consistent with 90° in the reference angles. If the first angle is 60°, the first included angle $\theta_{10}$ is an included angle between a line corresponding to the first angle 60° and a line corresponding to the reference angle 90°, in other words, $\theta_{10}=|60°-90°|=30°$.

With reference to the first aspect, in some embodiments, there are two first possible angle values and two second possible angle values, and the determining an actual angle between the first electronic device and the second electronic device based on the first possible angle value and the second possible angle value includes: negating the two second possible angle values; calculating differences between two negated second possible angle values and the two first possible angle values, where each of the differences corresponds to two angle values; and determining the actual angle between the first electronic device and the second electronic device based on two angle values corresponding to a smallest value in the differences.

For example, negating a target angle may be calculating an angle corresponding to a reverse direction of a second edge of the target angle. For example, a first edge of an angle $\alpha$ is an edge corresponding to $0°$, and a second edge is an edge corresponding to a ray A. In this case, negating the angle $\alpha$ is: calculating an angle $\beta$ corresponding to a ray B in a reverse direction of the ray A. A first edge of the angle $\beta$ is an edge corresponding to $0°$, and a second edge is an edge corresponding to the ray B. The ray A and the ray B are located on one straight line. Therefore, a calculation formula for negating the angle $\alpha$ to obtain the angle $\theta$ is $\beta=\mod(\alpha+180°,360°)$. If $(\alpha+180°)<360°$, a result of $(\alpha+180°)$ is used as the angle $\beta$; or if $(\alpha+180°)\geq 360°$, a result of $(\alpha+180°)-360°$ is used as the angle $\beta$.

The first electronic device may negate second possible angle values $\theta_{21}$ and $\theta_{22}$ to obtain $\theta'_{21}$ and $\theta'_{22}$, where and $\theta'_{21}=\mod(\theta_{21})+180°,360°)$ and $\theta'_{22}=\mod(\theta_{22}+180°,360°)$. Then, the first electronic device calculates a difference $|\theta_{11}-\theta'_{21}|$, between $\theta_{11}$ and $\theta'_{21}$, a difference $|\theta_{11}-\theta'_{22}|$ between $\theta_{11}$ and $\theta'_{22}$, a difference $|\theta_{12}-\theta'_{21}|$ between $\theta_{12}$ and $\theta'_{21}$, and a difference $|\theta_{12}-\theta'_{22}|$ between $\theta_{12}$ and $\theta'_{22}$. In the two second possible angle values $\theta_{21}$ and $\theta_{22}$ only one second angle value is an actual angle of the first electronic device relative to the second electronic device, and the other second angle value is not an actual angle of the first electronic device relative to the second electronic device. Similarly, in the two first possible angle values $\theta_{11}$ and $\theta_{12}$, only one first angle value is an actual angle of the second electronic device relative to the first electronic device, and the other first angle value is not an actual angle of the second electronic device relative to the first electronic device. In addition, in a same coordinate system, the actual angle of the first electronic device relative to the second electronic device and the actual angle of the second electronic device relative to the first electronic device have a negation relationship with each other.

Therefore, the second possible angle values $\theta_{21}$ and $\theta_{22}$ may be negated, and one angle value ($\theta'_{21}$ or $\theta'_{22}$) in the angle values $\theta_{21}$ and $\theta_{22}$ obtained in this way is basically the same as one angle value ($\theta_{11}$ or $\theta_{12}$) in the first possible angle values $\theta_{11}$ and $\theta_{12}$. The two basically the same angle values are actual angles of the second electronic device relative to the first electronic device. Therefore, the first electronic device may use two angles corresponding to a smallest difference in the differences as actual angles of the second electronic device relative to the first electronic device. Alternatively, the first electronic device may use an average value of two angles corresponding to a smallest difference in the differences as an actual angle of the second electronic device relative to the first electronic device.

With reference to the first aspect, in some embodiments, the first electronic device has a first loudspeaker, a second loudspeaker, and a first microphone. The sending at least two sound wave signals through a loudspeaker includes: sending a first sound wave signal through the first loudspeaker at a first moment, and sending a second sound wave signal through the second loudspeaker at a second moment, where the first moment is different from the second moment, and/or the first sound wave signal and the second sound wave signal are two sound wave signals with different characteristics. The receiving, through a microphone, at least two sound wave signals sent by a second electronic device includes: receiving, through the first microphone, the at least two sound wave signals sent by the second electronic device.

In a scenario, the first electronic device has the first loudspeaker, the second loudspeaker, and the first microphone, and the second electronic device has a third loudspeaker, a fourth loudspeaker, and a second microphone. The first electronic device sends sound wave signals to the second electronic device through the first loudspeaker and the second loudspeaker. The sound wave signals sent by the first electronic device are received through the second microphone of the second electronic device. The second electronic device sends sound wave signals to the first electronic device through the third loudspeaker and the fourth loudspeaker, and the first electronic device receives, through the first microphone, the sound wave signals sent by the second electronic device.

In a scenario, the first electronic device has the first loudspeaker, the second loudspeaker, and two first microphones, and the second electronic device has a third loudspeaker and a second microphone. The first electronic device sends sound wave signals to the second electronic device through the first loudspeaker and the second loudspeaker. The sound wave signals sent by the first electronic device are received through the second microphone of the second electronic device. The second electronic device sends sound wave signals to the first electronic device through the third loudspeaker, and the first electronic device receives, through the two first microphones, the sound wave signals sent by the second electronic device.

With reference to the first aspect, in some embodiments, the first electronic device has a first loudspeaker and a first microphone. The sending at least two sound wave signals through a loudspeaker includes: sending a first sound wave signal and a second sound wave signal through the first loudspeaker. The receiving, through a microphone, at least two sound wave signals sent by a second electronic device includes: The first electronic device receives, through the first microphone, the at least two sound wave signals sent by the second electronic device.

In a scenario, the first electronic device has the first loudspeaker and the first microphone. The second electronic device has a third loudspeaker, a fourth loudspeaker, and two second microphones. The first electronic device sends sound wave signals to the second electronic device through the first loudspeaker. The sound wave signals sent by the first electronic device are received through the two second microphones of the second electronic device. The second electronic device sends sound wave signals to the first electronic device through the third loudspeaker and the fourth loudspeaker, and the first electronic device receives, through the first microphone, the sound wave signals sent by the second electronic device.

In a scenario, the first electronic device has the first loudspeaker and two first microphones. The second electronic device has a third loudspeaker and two second microphones. The first electronic device sends sound wave signals to the second electronic device through the first loudspeaker. The sound wave signals sent by the first electronic device are received through the two second microphones of the second electronic device. The second electronic device sends sound wave signals to the first electronic device through the third loudspeaker, and the first electronic device receives, through the two first microphones, the sound wave signals sent by the second electronic device.

With reference to the first aspect, in some embodiments, the method further includes: detecting a first operation on first target content displayed on the first electronic device; determining whether the first operation is corresponding to the actual angle; and if the first operation is corresponding to the actual angle, sending, by the first electronic device, the first target content to a display interface of the second electronic device for display.

The sending the first target content to a display interface of the second electronic device for display may include: if the actual angle is that the second electronic device is located on a left side of the first electronic device, sending, in response to the first operation, the first target content to the display interface of the second electronic device for display; or if the actual angle is that the second electronic device is located on a right side of the first electronic device, sending, in response to the first operation, the first target content to the display interface of the second electronic device for display; or if the actual angle is that the second electronic device is located on a front side or a rear side of the first electronic device, the second electronic device does not respond to the first operation, and does not send the first target content to the display interface of the second electronic device for display.

With reference to the first aspect, in some embodiments, the second electronic device includes a second electronic device located on a left side of the first electronic device and a second electronic device located on a right side of the first electronic device. The method further includes detecting a second operation on first target content displayed on the first electronic device, and if the second operation is an operation of extending the first target content leftwards, sending, by the first electronic device, the first target content to a display interface of the second electronic device located on the left side of the first electronic device, for display, or if the second operation is an operation of extending the first target content rightwards, sending, by the first electronic device, the first target content to a display interface of the second electronic device located on the right side of the first electronic device, for display.

In a scenario, the method may further include that the first electronic device generates first guidance information, where the first guidance information is used to guide a user to drag the first target content leftwards or rightwards. The first electronic device obtains a drag operation performed on target content, and the first electronic device sends, in response to the drag operation, the first target content to the display interface of the second electronic device for display.

For example, if the second electronic device includes the second electronic device located on the left side of the first electronic device, the first guidance information is used to guide the user to drag the first target content leftwards. If the second electronic device includes the second electronic device located on the right side of the first electronic device, the first guidance information is used to guide the user to drag the first target content rightwards. If the second electronic device includes the second electronic device located on the left side of the first electronic device and the second electronic device located on the right side of the first electronic device, the first guidance information is used to guide the user to drag the first target content leftwards or rightwards.

For example, the first guidance information may be displayed on a display interface of the first electronic device in a text form; or the first guidance information may be displayed on a display interface of the first electronic device in an animation form; or the first guidance information may be displayed on a display interface of the first electronic device in a form of a combination of an animation and a text.

In a scenario, the first electronic device moves, in response to a user operation, the first target content in a direction corresponding to the user operation. If the first target content is moved to a first preset location on the display interface of the first electronic device and remains for a first preset time, it indicates that a first content part of the first target content is moved out of the display interface of the first electronic device. The second electronic device displays the first content part of the first target content, and the first electronic device displays a second content part of the first target content, where the first content part and the second content part of the first target content form the first target content. In this case, the first electronic device and the second electronic device jointly display the first target content.

In a scenario, the first electronic device moves, in response to a user operation, the first target content in a direction corresponding to the user operation. If the first target content is moved to a second preset location on the display interface of the first electronic device and remains for a second preset time, it indicates that the first target content is completely moved out of the display interface of the first electronic device. In this case, the second electronic device displays the first target content, and the first electronic device no longer displays the first target content.

With reference to the first aspect, in some embodiments, if the actual angle between the second electronic device and the first electronic device is changed, and the changed actual angle is that the second electronic device is located on a front side or a rear side of the first electronic device, an extension direction is not changed between the first electronic device and the second electronic device, where the extension direction includes rightward extension and leftward extension.

The rightward extension may be that the user drags the first target content rightwards on the display interface of the first electronic device, to extend the first target content to the second electronic device located in a right side region of the first electronic device, for display. The leftward extension may be: The user drags the first target content leftwards on the display interface of the first electronic device, to extend the first target content to the second electronic device located in a left side region of the first electronic device, for display.

For example, the second electronic device is located in the right side region of the first electronic device. In this case, the first electronic device sends the first target content to the display interface of the second electronic device for display. Then, if the first electronic device and/or the second electronic device are/is moved, so that the second electronic device is located in a front side region or a rear side region of the first electronic device, and the extension direction remains rightward extension. In this case, the user may still drag the target content rightwards, and send the target content to the display interface of the second electronic device for display. That the first electronic device and/or the second electronic device are/is moved includes that the second electronic device is moved or the first electronic device is moved, or the first electronic device and the second electronic device are moved.

With reference to the first aspect, in some embodiments, when extended display starts to be performed between the first electronic device and the second electronic device, if the second electronic device is located on the front side or the rear side of the first electronic device, the first electronic device does not send the first target content to the second electronic device. In addition, the first electronic device may generate first prompt information, where the first prompt information is used to prompt the user that the second electronic device is located in the front side region or the rear side region of the first electronic device, and the first electronic device cannot send the first target content to the display interface of the second electronic device for display.

In a scenario, if the first electronic device detects a third operation, and relative location information in this case indicates that the second electronic device is located in the front side region or the rear side region of the first electronic device, the first electronic device sends, based on a default extension direction or an extension direction habitually used by the user, the first target content to the display interface of the second electronic device for display. The default extension direction may be leftward extension or rightward extension.

With reference to the first aspect, in some embodiments, the method further includes: re-determining an actual angle between the second electronic device and the first electronic device after a location of the first electronic device and/or a location of the second electronic device are/is changed.

For example, both the first electronic device and the second electronic device may detect, by using a built-in accelerometer sensor, gyro sensor, or magnetometer sensor, whether respective locations of the first electronic device and the second electronic device are changed. If the location of the first electronic device and/or the location of the second electronic device are/is changed, the actual angle between the second electronic device and the first electronic device may be changed. Therefore, after the location of the first electronic device and/or the location of the second electronic device are/is changed, relative location information between the second electronic device and the first electronic device needs to be re-determined.

In a scenario, the first electronic device detects, by using a built-in accelerometer sensor, gyro sensor, or magnetometer sensor, that the location of the first electronic device is changed, and the first electronic device notifies the second electronic device that the actual angle needs to be re-determined. In this case, the first electronic device performs the step of sending at least two sound wave signals through a loudspeaker and subsequent steps, so as to re-determine the actual angle between the second electronic device and the first electronic device.

In another scenario, the second electronic device detects, by using a built-in accelerometer sensor, gyro sensor, or magnetometer sensor, that the location of the second electronic device is changed, and the second electronic device notifies the first electronic device that the actual angle needs to be re-determined. The first electronic device performs the step of sending at least two sound wave signals through a loudspeaker and subsequent steps, so as to re-determine the actual angle between the second electronic device and the first electronic device.

With reference to the first aspect, in some embodiments, the method may further include: detecting a third operation on first target content displayed on the first electronic device, where the third operation is an operation of screen projection of second target content; determining whether the actual angle meets a preset location requirement; and if the actual angle meets the preset location requirement, sending, by the first electronic device, the second target content to the display interface of the second electronic device for display.

The preset location requirement may be that the second electronic device is located on the front side or the rear side of the first electronic device. Alternatively, a preset screen projection condition may be that the second electronic device is located on the left side of the first electronic device. Alternatively, a preset screen projection condition may be that the second electronic device is located on the right side of the first electronic device.

With reference to the first aspect, in some embodiments, the method may include: The first electronic device generates second prompt information, where the second prompt information is used to prompt the user that the second electronic device is placed in a target region of the first electronic device, and the second target is one or more of a front side region, a rear side region, a left side region, and a right side region. The user can help, based on the second prompt information, the user place the second electronic device in a correct region, to quickly implement screen projection.

The second target content may have a privacy requirement, or may not have a privacy requirement. For second target content having a privacy requirement, privacy leakage needs to be prevented, or a risk of privacy leakage needs to be reduced.

In a scenario, for the second target content having the privacy requirement, if the actual angle meets the preset location requirement, and a distance between the first electronic device and the second electronic device is less than a threshold, the first electronic device sends the second target content to the display interface of the second electronic device for display. When the actual angle meets the preset location requirement and the distance between the first electronic device and the second electronic device is less than the threshold, the second target content having the privacy requirement is sent to the second electronic device for screen projection display. This can prevent privacy leakage of the second target content, or reduce a risk of privacy leakage of the second target content.

When screen projection display has been established between the first electronic device and the second electronic device, if the actual angle between the second electronic device and the first electronic device is changed, the changed actual angle does not meet the preset location requirement, and/or the distance between the first electronic device and the second electronic device is greater than the threshold, the first electronic device sends, to the second electronic device, request information used to request the second electronic device to stop displaying the second target content.

In another scenario, for second target content not having a privacy requirement, if the actual angle meets the preset location requirement, the first electronic device sends the second target content to the display interface of the second electronic device for display.

In addition, for the second target content not having the privacy requirement, when screen projection display has been established between the first electronic device and the second electronic device, if the actual angle between the second electronic device and the first electronic device is changed, the changed actual angle does not meet the preset location requirement, and/or the distance between the first electronic device and the second electronic device is greater than the threshold, the second electronic device continues to display the second target content.

According to a second aspect, an embodiment provides an angle determining method, applied to a first electronic device. The method includes: sending at least two sound wave signals through a first group of loudspeakers at a first moment, and sending at least two sound wave signals through a second group of loudspeakers at a second moment, where the first moment is different from the second moment, and/or characteristics of the at least two sound wave signals sent through the first group of loudspeakers are different from characteristics of the at least two sound wave signals sent through the second group of loudspeakers; receiving an actual angle between the first electronic device and a second electronic device that is sent by the second electronic device, where the actual angle is determined by the second electronic device based on a first possible angle value and a second possible angle value, the first possible angle value is determined based on a receiving result of receiving, through a microphone of the second electronic device, the at least two sound wave signals sent through the first group of loudspeakers, and the second possible angle value is determined by the second electronic device based on a receiving result of receiving, through the microphone of the second electronic device, the at least two sound wave signals sent through the second group of loudspeakers.

According to the angle determining method, the first possible angle value is obtained based on the first group of loudspeakers of the first electronic device. For one known first possible angle value, there are two relative locations between the second electronic device and the first electronic device. Similarly, the second possible angle value is obtained based on the first group of loudspeakers of the first electronic device. For one known second possible angle value, there are two relative locations between the second electronic device and the first electronic device. Therefore, actual locations between the first electronic device and the second electronic device cannot be determined based on the first possible angle value or the second possible angle value. One angle value in the first possible angle value is an actual angle between the first electronic device and the second electronic device, and one angle value in the second possible angle value is an actual angle between the first electronic device and the second electronic device. Therefore, the actual angle between the first electronic device and the second electronic device can be determined based on the first possible angle value and the second possible angle value, and the actual locations between the first electronic device and the second electronic device can be determined based on the actual angle.

In this embodiment, the sound wave signals may be sound wave signals with a same time sequence, or may be sound wave signals with different time sequences. The sound wave signals may be infrasonic wave signals with a frequency of 0 kHz to 20 kHz, or may be ultrasound signals with a frequency of more than 20 kHz. For example, the sound wave signals may have a frequency of 1 kHz, 2 kHz, 3 kHz, 5 kHz, 10 kHz, 15 kHz, 20 kHz, or 30 kHz.

In some embodiments, the sound wave signals may be ultrasound signals.

In a scenario, the first electronic device has a first loudspeaker, a second loudspeaker, and a third loudspeaker that are not located on one straight line, where the first group of loudspeakers and the second group of loudspeakers each include any two of the first loudspeaker, the second loudspeaker, and the third loudspeaker, and loudspeakers in the first group of loudspeakers and the second group of loudspeakers are not completely the same.

For example, the first loudspeaker and the second loudspeaker form the first group of loudspeakers, and the first loudspeaker and the second loudspeaker form the second group of loudspeakers. The first electronic device may first send sound wave signals to the second electronic device through the first group of loudspeakers, and after sending of the sound wave signals to the second electronic device through the first group of loudspeakers is completed, send sound wave signals to the second electronic device through the second group of loudspeakers. The second electronic device has a first microphone. The second electronic device receives the sound wave signals of the first electronic device through the first microphone. Because times at which sound wave signals are sent through the two groups of loudspeakers are different, the second electronic device can distinguish, based on times at which the sound wave signals are received, whether the received sound wave signals are sound wave signals sent through the first group of loudspeakers or sound wave signals sent through the second group of loudspeakers.

In a scenario, the first electronic device has a first loudspeaker, a second loudspeaker, a third loudspeaker, and a fourth loudspeaker distributed in a quadrilateral, where the first loudspeaker and the third loudspeaker are located at two opposite angles of the quadrilateral, the second loudspeaker and the fourth loudspeaker are located at two opposite angles of the quadrilateral, the first group of loudspeakers includes the first loudspeaker and the third loudspeaker, and the first group of loudspeakers includes the second loudspeaker and the fourth loudspeaker.

For example, the first electronic device may first send sound wave signals to the second electronic device through the first group of loudspeakers, and after sending of the sound wave signals to the second electronic device through the first group of loudspeakers is completed, send sound wave signals to the second electronic device through the second group of loudspeakers. The second electronic device has a first microphone. The second electronic device receives the sound wave signals of the first electronic device through the first microphone. Because times at which sound wave signals are sent through the two groups of loudspeakers are different, the second electronic device can distinguish, based on times at which the sound wave signals are received, whether the received sound wave signals are sound wave signals sent through the first group of loudspeakers or sound wave signals sent through the second group of loudspeakers.

For another example, the first electronic device sends sound wave signals to the second electronic device through the first group of loudspeakers and the second group of loudspeakers at the same time, and characteristics of the sound wave signals sent through the first group of loudspeakers are different from characteristics of the sound wave signals sent through the second group of loudspeakers. The second electronic device has a first microphone. The second electronic device receives the sound wave signals of the first electronic device through the first microphone. Because characteristics of sound wave signals sent through the two groups of loudspeakers are different, the second electronic device can distinguish, based on characteristics of the sound wave signals that are received, whether the received sound wave signals are sound wave signals sent through the first group of loudspeakers or sound wave signals sent through the second group of loudspeakers.

In a scenario, the first electronic device has a first loudspeaker and a second loudspeaker, the first group of loudspeakers include the first loudspeaker and the second loudspeaker, and the second group of loudspeakers include the first loudspeaker or the second loudspeaker.

For example, the first electronic device has the first loudspeaker and the second loudspeaker, and may not have a microphone. The second electronic device has a first microphone, and may not have a loudspeaker. The first electronic device first sends sound wave signals to the second electronic device through the first loudspeaker and the second loudspeaker, and after the sending is completed, sends sound wave signals to the second electronic device through the first loudspeaker or the second loudspeaker. The second electronic device receives the sound wave signals of the first electronic device through the first microphone. Because times at which sound wave signals are sent through the two groups of loudspeakers are different, the second electronic device can distinguish, based on times at which the sound wave signals are received, whether the received sound wave signals are sound wave signals sent through the first group of loudspeakers or sound wave signals sent through the second group of loudspeakers.

With reference to the second aspect, in some embodiments, the method further includes: detecting a first operation on first target content displayed on the first electronic device; determining whether the first operation is corresponding to the actual angle; and if the first operation is corresponding to the actual angle, sending, by the first electronic device, the first target content to a display interface of the second electronic device for display.

With reference to the second aspect, in some embodiments, the second electronic device includes a second electronic device located on a left side of the first electronic device and a second electronic device located on a right side of the first electronic device. The method further includes: detecting a second operation on first target content displayed on the first electronic device; and if the second operation is an operation of extending the first target content leftwards, sending, by the first electronic device, the first target content to a display interface of the second electronic device located on the left side of the first electronic device, for display; or if the second operation is an operation of extending the first target content rightwards, sending, by the first electronic device, the first target content to a display interface of the second electronic device located on the right side of the first electronic device, for display.

With reference to the second aspect, in some embodiments, the method further includes: re-determining an actual angle between the second electronic device and the first electronic device after a location of the first electronic device and/or a location of the second electronic device are/is changed.

According to a third aspect, an embodiment provides an angle determining method, applied to a first electronic device. The method includes: receiving, through a microphone, at least four sound wave signals sent by a second electronic device, where the at least four sound wave signals include a first group of sound wave signals and a second group of sound wave signals, both the first group of sound wave signals and the second group of sound wave signals include at least two sound wave signals, and at least two sound wave signals in each group of sound wave signals are sound wave signals with close receiving times or same characteristics; determining a second receiving result of receiving the first group of sound wave signals and a third receiving result of receiving the second group of sound wave signals; determining a third possible angle value between the second electronic device and the first electronic device based on the second receiving result; determining a fourth possible angle value between the second electronic device and the first electronic device based on the third receiving result; and determining an actual angle between the first electronic device and the second electronic device based on the third possible angle value and the fourth possible angle value.

According to the angle determining method, the third possible angle value is obtained based on the first group of sound wave signals sent by the second electronic device. For one known third possible angle value, there are two relative locations between the second electronic device and the first electronic device. Similarly, the second possible angle value is obtained based on the second group of loudspeakers sent by the second electronic device. For one known second possible angle value, there are two relative locations between the second electronic device and the first electronic device. Therefore, actual locations between the first electronic device and the second electronic device cannot be determined based on the first possible angle value or the second possible angle value. One angle value in the first possible angle value is an actual angle between the first electronic device and the second electronic device, and also, one angle value in the first possible angle value is an actual angle between the first electronic device and the second electronic device. Therefore, the actual angle between the first electronic device and the second electronic device can be determined based on the first possible angle value and the second possible angle value, and the actual locations between the first electronic device and the second electronic device can be determined based on the actual angle.

With reference to the third aspect, in some embodiments, the second receiving result includes: a second time difference between receiving the first group of sound wave signals through the microphone of the first electronic device, or second signal strength of the first group of sound wave signals received through the microphone of the first electronic device; and the third receiving result includes: a third time difference between receiving the second group of sound wave signals through the microphone of the first electronic device, or third signal strength of the second group of sound wave signals received through the microphone of the first electronic device.

With reference to the third aspect, in some embodiments, the determining a third possible angle value between the second electronic device and the first electronic device based on the second receiving result includes: determining a second direction from the second electronic device to the first electronic device based on the second time difference or the second signal strength; determining a second included angle between the second direction and an orientation of the first electronic device; and determining two second possible angle values between the second electronic device and the first electronic device based on the second included angle and the orientation of the first electronic device.

With reference to the third aspect, in some embodiments, the determining a fourth possible angle value between the second electronic device and the first electronic device based on the third receiving result includes: determining a third direction from the second electronic device to the first electronic device based on the third time difference or the third signal strength; determining a third included angle between the third direction and an orientation of the first electronic device; and determining two third possible angle values between the second electronic device and the first electronic device based on the third included angle and the orientation of the first electronic device.

With reference to the third aspect, in some embodiments, there are two third possible angle values and two fourth possible angle values, and the determining an actual angle between the first electronic device and the second electronic device based on the third possible angle value and the fourth possible angle value includes: negating the two third possible angle values; calculating differences between two negated third possible angle values and the two fourth possible angle values, where each of the differences corresponds to two angle values; and determining the actual angle between the first electronic device and the second electronic device based on two angle values corresponding to a smallest value in the differences.

With reference to the third aspect, in some embodiments, the method further includes: detecting a first operation on first target content displayed on the first electronic device; determining whether the first operation is corresponding to the actual angle; and if the first operation is corresponding to the actual angle, sending, by the first electronic device, the first target content to a display interface of the second electronic device for display.

With reference to the third aspect, in some embodiments, the second electronic device includes a second electronic device located on a left side of the first electronic device and a second electronic device located on a right side of the first electronic device. The method further includes: detecting a second operation on first target content displayed on the first electronic device; and if the second operation is an operation of extending the first target content leftwards, sending, by the first electronic device, the first target content to a display interface of the second electronic device located on the left side of the first electronic device, for display; or if the second operation is an operation of extending the first target content rightwards, sending, by the first electronic device, the first target content to a display interface of the second electronic device located on the right side of the first electronic device, for display.

With reference to the third aspect, in some embodiments, the method further includes: re-determining an actual angle between the second electronic device and the first electronic device after a location of the first electronic device and/or a location of the second electronic device are/is changed.

According to a fourth aspect, an embodiment provides an audio play method, applied to a first electronic device. The method includes: determining a first actual angle between the first electronic device and a first audio play device and a second actual angle between the first electronic device and a second audio play device by using the angle determining methods in the first aspect to the third aspect; determining relative location information between the first audio play device and the second audio play device based on the first actual angle and the second actual angle, where the relative location information includes that the first audio play device is located on a first side of the second audio play device, the second audio play device is located on a second side of the first audio play device, and the first side is a left side or a right side; and sending left channel audio information to an audio play device located on a left side between the first audio play device and the second audio play device, and sending right channel audio information to an audio play device located on a right side between the first audio play device and the second audio play device.

In this embodiment, the first electronic device can automatically determine third relative location information between the first audio play device and the second audio play device, and then send the left channel audio information to the audio play device on the left side and send the right channel audio information to the audio play device on the right side, without manually setting a location relationship between the first audio play device and the second audio play device.

It should be noted that the relative location information may be location information of the first audio play device relative to the second audio play device, or may be location information of the second audio play device relative to the first audio play device. This is not limited in this embodiment.

With reference to the fourth aspect, in some embodiments, the determining relative location information between the first audio play device and the second audio play device may include: determining the relative location information between the first audio play device and the second audio play device based on a relationship between the first actual angle and the second actual angle.

With reference to the fourth aspect, in some embodiments, the determining relative location information between the first audio play device and the second audio play device may include: determining, based on the first actual angle and the second actual angle, that the first audio play device and the second audio play device are separately located in specific regions of the first electronic device; and if the first audio play device and the second audio play device are located in two regions of the first electronic device, determining, by the first electronic device, the third relative location information based on a location relationship between the two regions; or if the first audio play device and the second audio play device are located in a same region of the first electronic device, determining, by the first electronic device, the third relative location information between the first audio play device and the second audio play device based on a first angle and a second angle, where the first angle is an angle of the first audio play device relative to the first electronic device, and the second angle is an angle of the second audio play device relative to the first electronic device.

In a scenario, if the first audio play device is located in a left side region of the first electronic device, and the second audio play device is located in a front side region, a rear side region, or a right side region of the first electronic device, it indicates that the first audio play device is located on a left side of the second audio play device. In this case, the first electronic device sends the left channel audio information to the first audio play device, and sends the right channel audio information to the second audio play device.

In a scenario, if the first audio play device is located in a right side region of the first electronic device, and the second audio play device is located in a front side region, a rear side region, or a left side region of the first electronic device, it indicates that the first audio play device is located on a right side of the second audio play device. In this case, the first electronic device sends the left channel audio information to the second audio play device, and sends the right channel audio information to the first audio play device.

In a scenario, if the first audio play device and the second audio play device are located in a region on a same side of the first electronic device, the first electronic device may determine the third relative location information based on the first angle and the second angle.

For example, if both the first audio play device and the second audio play device are located in a left side region of the first electronic device, an angle of the first audio play device relative to the first electronic device is $\alpha 1$, an angle of the second audio play device relative to the first electronic device is $\alpha 2$, and a1 is greater than $\alpha 2$, the first electronic device determines, based on $\alpha 1$ and $\alpha 2$, that the first audio play device is located on the right side of the second audio play device. Then, the first electronic device sends the right channel audio information to the first audio play device, and sends the left channel audio information to the second audio play device.

If both the first audio play device and the second audio play device are located in a left side region of the first electronic device, an angle of the first audio play device relative to the first electronic device is $\alpha 1$, an angle of the second audio play device relative to the first electronic device is α2, and a1 is less than α2, the first electronic device determines, based on α1 and α2, that the first audio play device is located on the left side of the second audio play device. Then, the first electronic device sends the right channel audio information to the second audio play device, and sends the left channel audio information to the first audio play device.

According to a fifth aspect, an embodiment provides an audio play method, applied to a first electronic device. The method includes: determining an actual angle between the first electronic device and a second electronic device by using the angle determining methods in the first aspect to the third aspect; and playing, by the second electronic device, audio in a direction corresponding to the actual angle based on the actual angle.

According to the foregoing audio play method, the second electronic device can play, based on the actual angle between the first electronic device and the second electronic device, the audio in the direction corresponding to the actual angle, to be specific, an audio sound in a direction in which the first electronic device is located is relatively large and an audio sound in a region outside the first electronic device is relatively small.

In some embodiments, the second electronic device may have an audio play unit that can adjust an audio play direction. For example, the audio play unit may include a directional loudspeaker and a rotating mechanism, and the rotating mechanism can drive the directional loudspeaker to rotate. A processor of the second electronic device may determine a target direction based on the actual angle, and then control the rotating mechanism to drive the directional loudspeaker to rotate, so that the directional loudspeaker plays a sound in the target direction.

According to a sixth aspect, an embodiment provides an electronic device, including one or more processors, a memory, and a display. The memory and the display are coupled to the one or more processors, the memory is configured to store computer program code, and the computer program code includes computer instructions. When the one or more processors execute the computer instructions, the electronic device is enabled to perform the method according to any item of the first aspect, the method according to any item of the second aspect, the method according to any item of the third aspect, the method according to any item of the fourth aspect, or the method according to any item of the fifth aspect.

According to a seventh aspect, an embodiment provides a chip system. The chip system includes a processor, the processor is coupled to a memory, and the processor executes a computer program stored in the memory, to implement the method according to any item of the first aspect, the method according to any item of the second aspect, the method according to any item of the third aspect, the method according to any item of the fourth aspect, or the method according to any item of the fifth aspect. The chip system may be a single chip, or a chip module including a plurality of chips.

According to an eighth aspect, an embodiment provides a chip system. The chip system includes a memory and a processor, and the processor executes a computer program stored in the memory, to implement the method according to any item of the first aspect, the method according to any item of the second aspect, the method according to any item of the third aspect, the method according to any item of the fourth aspect, or the method according to any item of the fifth aspect. The chip system may be any chip, or a chip module including a plurality of chips.

According to a ninth aspect, an embodiment provides a computer program product. When the computer program product runs on a terminal device, an electronic device is enabled to perform the method according to any item of the first aspect, the method according to any item of the second aspect, the method according to any item of the third aspect, the method according to any item of the fourth aspect, or the method according to any item of the fifth aspect.

According to a tenth aspect, an embodiment provides a computer-readable storage medium. The computer-readable storage medium stores a computer program, and when the computer program is executed by a processor, the method according to any item of the first aspect, the method according to any item of the second aspect, the method according to any item of the third aspect, the method according to any item of the fourth aspect, or the method according to any item of the fifth aspect is implemented.

It may be understood that the electronic device according to the sixth aspect, the chip systems according to the seventh aspect and the eighth aspect, the computer program product according to the ninth aspect, and the computer-readable storage medium according to the tenth aspect that are provided above are all configured to perform the method provided in the first aspect, the method provided in the second aspect, the method provided in the third aspect, the method provided in the fourth aspect, or the method provided in the fifth aspect. Therefore, for beneficial effects that can be achieved, refer to beneficial effects in a corresponding method. Details are not described herein again.

BRIEF DESCRIPTION OF DRAWINGS

FIG. 21A and FIG. 21B are schematic diagrams of scenarios corresponding to FIG. 17;

FIG. 22 is a schematic diagram of a scenario of determining a first included angle according to an embodiment;

FIG. 23 is a schematic diagram of another scenario of determining a first included angle according to an embodiment;

FIG. 24A and FIG. 24B are schematic diagrams of scenarios of determining an angle between electronic devices according to an embodiment;

FIG. 28A and FIG. 28B are schematic diagrams of scenarios of determining an angle between electronic devices according to an embodiment; and FIG. 29A and FIG. 29B are schematic diagrams of scenarios of determining an angle between electronic devices according to an embodiment.

DESCRIPTION OF EMBODIMENTS

Figure 1:
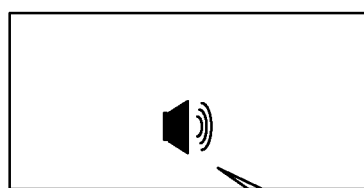
FIG. 1 is a schematic diagram of a scenario of an algorithm for determining an angle between electronic devices according to a related technology 1.

In the following descriptions, for illustration instead of limitation, specific details such as a particular system structure and a technology are provided to make a thorough understanding of embodiments of this disclosure. However, persons skilled in the art should know that this disclosure may also be implemented in other embodiments without these specific details. In other cases, detailed descriptions of well-known systems, apparatuses, circuits, and methods are omitted, so that this disclosure is described without being obscured by unnecessary details.

It should be understood that, when used in the specification and the appended claims, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims refers to any combination and all possible combinations of one or more associated listed items, and includes these combinations.

As used in the specification and the appended claims, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and claims, the terms "first", "second", "third", and the like are merely intended for a purpose of differentiated description, but shall not be understood as an indication or an implication of relative importance.

Reference to "an embodiment", "some embodiments", or the like described in the specification indicates that one or more embodiments include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In addition, "a plurality of" mentioned in embodiments should be explained as two or more.

Steps in an angle determining method provided in embodiments are merely examples. Not all steps are mandatory, or not all content in each piece of information or each message is mandatory. The steps or the content may be added or reduced as required in a use process.

A same step or steps or messages having a same function in embodiments may be mutually referenced in different embodiments.

A service scenario described in embodiments is intended to describe the technical solutions in embodiments more clearly, and does not constitute any limitation on the technical solutions provided in embodiments. Persons of ordinary skill in the art may know that, with evolution of a network architecture and emergence of a new service scenario, the technical solutions provided in embodiments are also applicable to a similar technical problem.

FIG. 1 is a schematic diagram of a scenario of an algorithm for determining an angle between electronic devices according to a related technology 1. The scenario includes an electronic device 11 and an electronic device 12. The electronic device 11 has at least one loudspeaker, and the electronic device 12 has at least two microphones (FIG. 1 shows two microphones, and this is not limited thereto). One loudspeaker of the electronic device 11 can transmit an ultrasound signal, and each microphone of the electronic device 12 can receive the ultrasound signal.

Referring to FIG. 1, an algorithm for determining an angle between electronic devices may be as follows: One loudspeaker of the electronic device 11 transmits an ultrasound signal to the electronic device 12, the two microphones of the electronic device 12 each receive the ultrasound signal, and the electronic device 12 determines an angle of the electronic device 11 relative to the electronic device 12 based on a time difference of receiving the ultrasound signal by the two microphones.

The following specifically describes, by using a specific example, the foregoing algorithm for determining an angle between electronic devices.

The electronic device 11 has one loudspeaker, and the electronic device 12 has a microphone M1 and a microphone M2. For example, the electronic device 11 transmits an ultrasound signal through the loudspeaker, the microphone M1 of the electronic device 12 receives the ultrasound signal at a moment $T_1$, and the microphone M2 receives the ultrasound signal at a moment $T_2$. In this case, the electronic device 12 may determine the angle of the electronic device 11 relative to the electronic device 12 based on a difference between $T_1$ and $T_2$.

For example, both the microphone M1 and the microphone M2 can sample the ultrasound signal at a fixed sampling frequency $f_s$. For example, the sampling frequency $f_s$ is 48 kHz. Then, within a time t, a quantity of sampling points collected by the microphone is $t*f_s$. Therefore, a time difference between arrival of the ultrasound signal at the microphone M1 and arrival of the ultrasound signal at the microphone M2 may be represented as a difference between a quantity of sampling points of the microphone M1 for the ultrasound signal and a quantity of sampling points of the microphone M2 for the ultrasound signal.

For example, the ultrasound signal first arrives at the microphone M1 and then the ultrasound signal arrives at the microphone M2. A quantity of sampling points of the microphone M1 for the ultrasound signal is $\tau_1$, and a quantity of sampling points of the microphone M2 for the ultrasound signal is $\tau_2$, where $\tau_1$ is greater than $\tau_2$. Then, a difference between the two quantities of sampling points is $\tau^*=\tau_1-\tau_2$. The difference $\tau^*$ between the quantities of sampling points corresponds to the time difference between the arrival of the ultrasound signal at the microphone M1 and the arrival of the ultrasound signal at the microphone M2, and may be $\Delta t \cdot f_s$, where $\Delta t$ is the foregoing time difference.

It is assumed that a distance between the microphone M1 and the microphone M2 is D, a distance between the loudspeaker and the microphone M1 is $D_1$, and a distance between the loudspeaker and the microphone M2 is $D_2$. Then, $$\Delta t = \frac{D_1 - D_2}{v}, \text{ and}$$

$$\tau^* = \frac{D_1 - D_2}{v} f_s,$$

where v is a propagation speed of the ultrasound signal.

The following describes how to determine the angle of the electronic device 11 relative to the electronic device 12.

In some embodiments, locations corresponding to reference angles may be first set.

Figure 2:
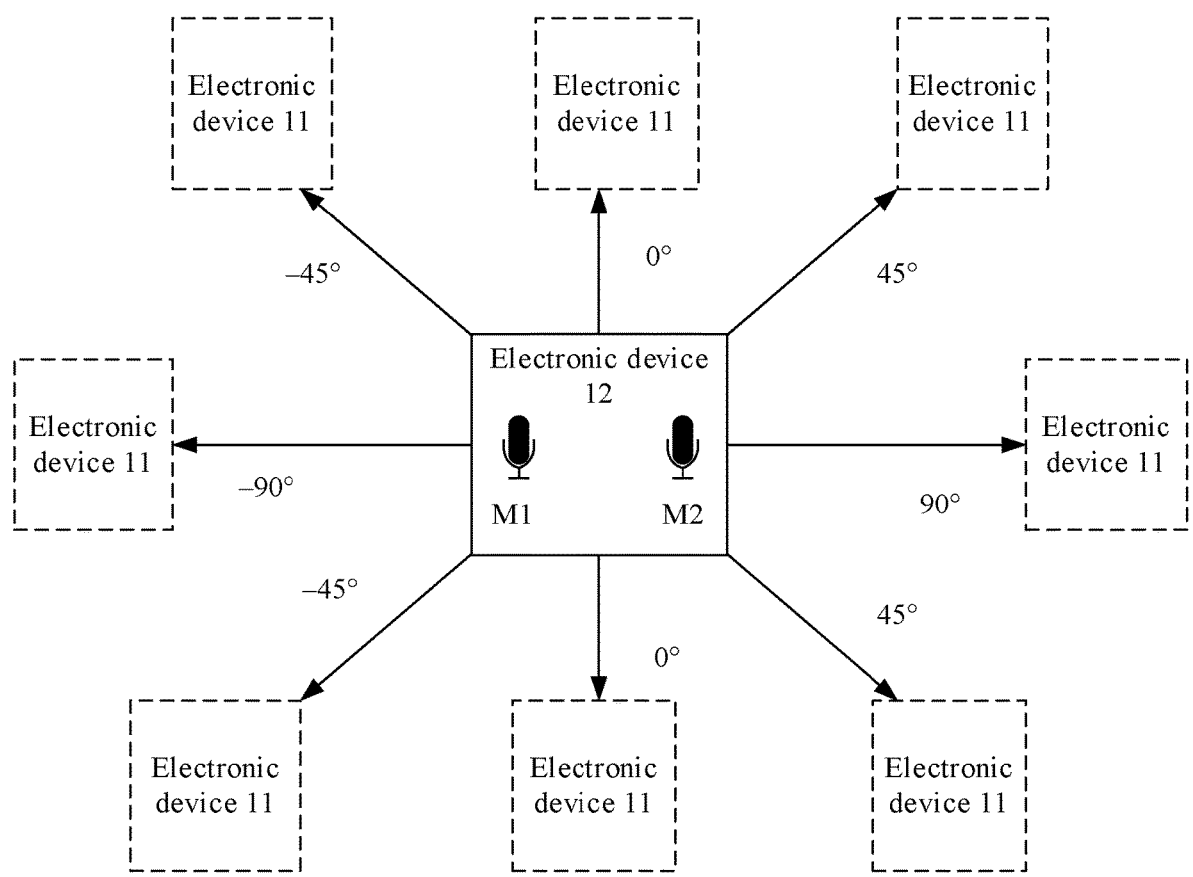
FIG. 2 is a schematic diagram of an angle of an electronic device 11 relative to an electronic device 12.

For example, the reference angles may be 90°, −90°, and 0°. As shown in FIG. 2, if the microphone M1 is located on a left side of the microphone M2, that the angle of the electronic device 11 relative to the electronic device 12 is 90° may be as follows: The electronic device 11 is located in a right side region of the electronic device 12, the electronic device 11 is located on a connection line between the two microphones of the electronic device 12, and $D_1-D_2=D$. That the angle of the electronic device 11 relative to the electronic device 12 is −90° may be as follows: The electronic device 11 is located in a left side region of the electronic device 12, the electronic device 11 is located on the connection line between the two microphones of the electronic device 12, and $D_1-D_2=-D$. That the angle of the electronic device 11 relative to the electronic device 12 is 0° may be as follows: The electronic device 11 is located on a perpendicular bisector of the connection line between the two microphones of the electronic device 12, and $D_1-D_2=0$.

Figure 3:
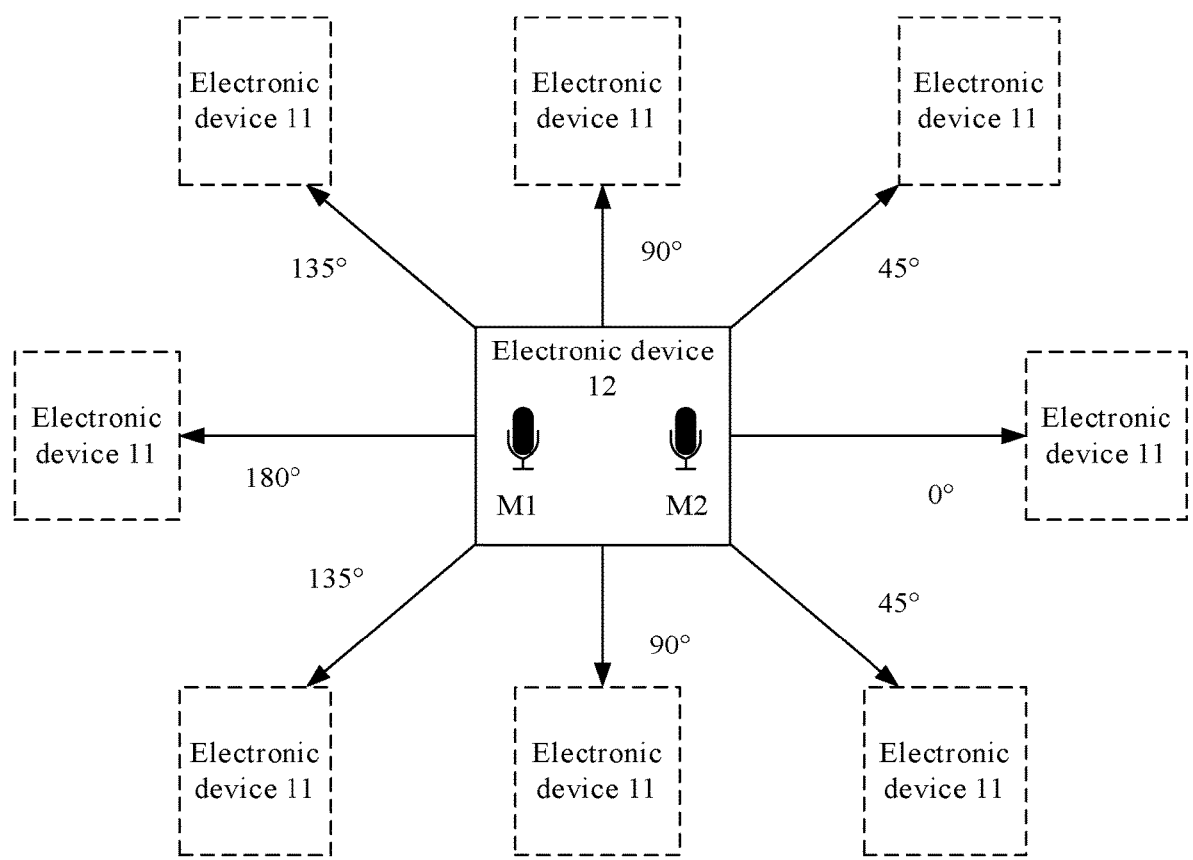
FIG. 3 is another schematic diagram of an angle of an electronic device 11 relative to an electronic device 12.

For another example, the reference angles may be 0°, 90°, and 180°. As shown in FIG. 3, if the microphone M1 is located on a left side of the microphone M2, that the angle of the electronic device 11 relative to the electronic device 12 is 0° may be as follows: The electronic device 11 is located in a right side region of the electronic device 12, the electronic device 11 is located on a connection line between the two loudspeakers of the electronic device 12, and $D_1-D_2=D$. That the angle of the electronic device 11 relative to the electronic device 12 is 90° may be as follows: The electronic device 11 is located in a front side region or a rear side region of the electronic device 12, the electronic device 11 is located on a perpendicular bisector of the connection line between the two loudspeakers of the electronic device 12, and $D_1-D_2=D$. That the angle of the electronic device 11 relative to the electronic device 12 is 180° may be as follows: The electronic device 11 is located in a left side region of the electronic device 12, the electronic device 11 is located on the connection line between the two loudspeakers of the electronic device 12, and $D_1-D_2=D$.

Then, the angle θ of the electronic device 11 relative to the electronic device 12 may be determined based on the reference angles and a relationship between $D_1-D_2$ and D.

For example, when the reference angles are 90°, 0°, and −90°, the angle θ of the electronic device 11 relative to the electronic device 12 may be approximately $$\theta \approx \frac{D_1 - D_2}{2D} \cdot 180°.$$

It can be learned from the formula $$\tau^* = \frac{D_1 - D_2}{v} f_s$$

that $$D_1 - D_2 = \frac{\tau^* v}{f_s},$$

that and therefore, the angle θ may be approximately $$\theta \approx \frac{D_1 - D_2}{2D} \cdot 180° = \frac{\tau^* v}{D f_s} \cdot 90°.$$

For another example, when the reference angles are 0°, 90°, and 180°, the angle θ of the electronic device 11 relative to the electronic device 12 may be approximately $$\theta \approx \frac{D - (D_4 - D_5)}{2D} \cdot 180°.$$

It can be learned from the formula $$\tau^* = \frac{D_4 - D_5}{v} f_s$$

that $$D_4 - D_5 = \frac{\tau^* v}{f_s},$$

and therefore, the angle θ may be approximately $$\theta \approx \frac{D-(D_4-D_5)}{2D} \cdot 180° = \left(1 - \frac{\tau^* v}{Df_s}\right) \cdot 90°.$$

In this embodiment, the angle of the electronic device 11 relative to the electronic device 12 may be determined based on the time difference of receiving the ultrasound signal through the two microphones of the electronic device 12.

To describe a problem existing in the related technology 1, a region of the electronic device 12 is first described.

Figure 4:
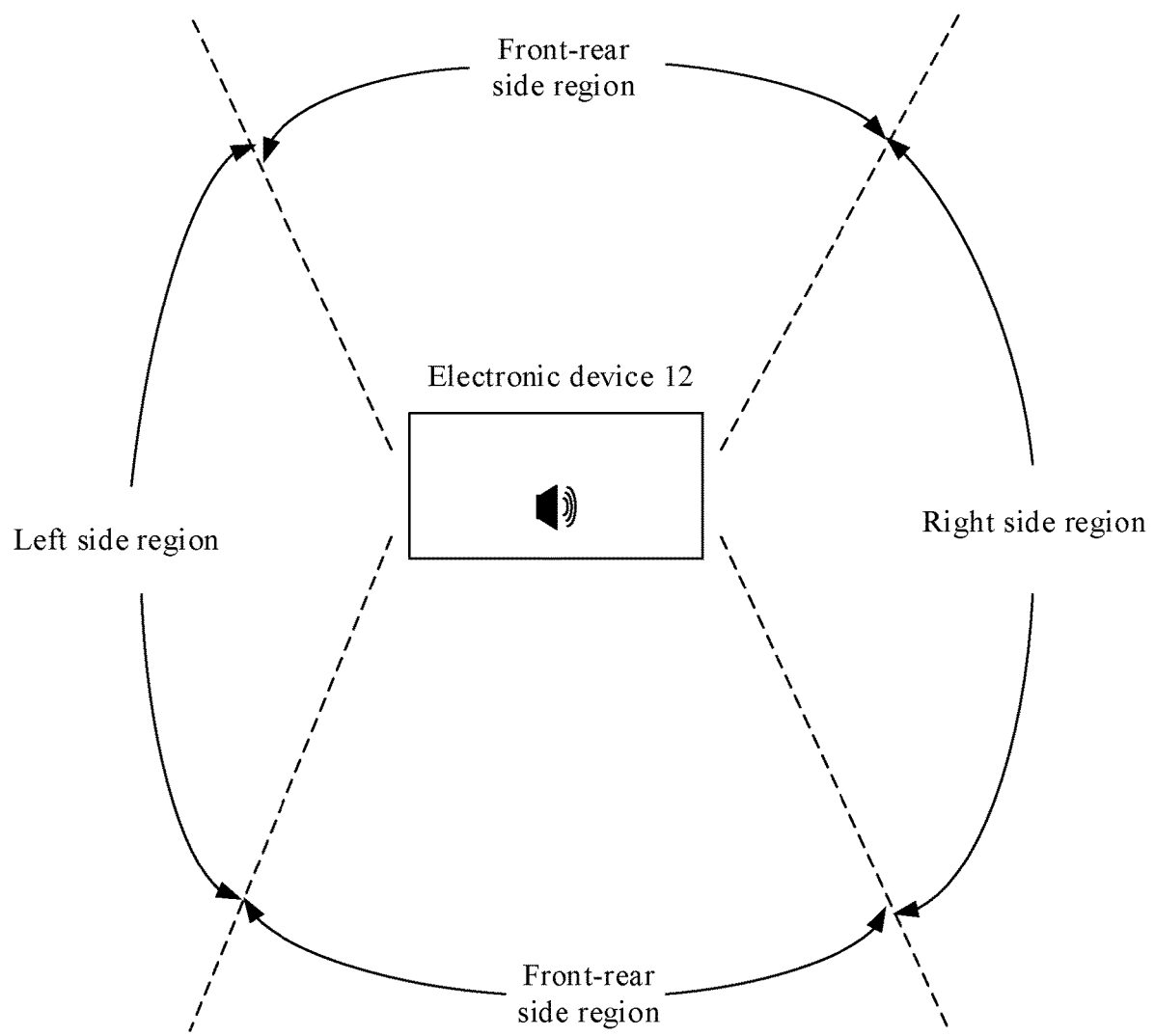
FIG. 4 is a schematic diagram of a region of an electronic device.

Referring to FIG. 4, in some embodiments, the region of the electronic device 12 may include a left side region, a right side region, a front side region, and a rear side region.

For example, the electronic device 11 transmits a sound wave signal through the loudspeaker, the microphone M1 of the electronic device 12 receives the sound wave signal at a moment $T_1$, the microphone M2 receives the sound wave signal at a moment $T_2$, and the microphone M1 is located on a left side of the microphone M2. In this case, a direction of the electronic device 11 relative to the electronic device 12 may be determined based on a relationship between $|T_1-T_2|$ and a threshold $$t_1\left(0 < t_1 < \frac{D}{c}\right),$$

where D is a distance between the microphone M1 and the microphone M2.

For example, if $T_1$ is earlier than $T_2$, and $|T_1-T_2|>t_1$, the electronic device 11 is located in the left side region of the electronic device 12. If $T_1$ is later than $T_2$, and $|T_1-T_2|>t_1$, the electronic device 11 is located in the right side region of the electronic device 12. If $|T_1-T_2|\leq t_1$, in other words, the sound wave signal arrives at the microphone M1 and the microphone M2 almost at the same time, the electronic device 11 is located in the front side region or the rear side region of the electronic device 12.

It should be noted that, in different application scenarios, a region of the electronic device 12 may be divided into two regions or four or more regions according to an actual requirement, and is not limited to three regions.

As shown in FIG. 2, if the angle of the electronic device 11 relative to the electronic device 12 is 45°, the electronic device 11 may be located in the right side region of the electronic device 12, and an included angle between a connection line between the electronic device 11 and the electronic device 12 and the connection line between the microphones M1 and M2 is 45°. Similarly, if the angle of the electronic device 11 relative to the electronic device 12 is −45°, the electronic device 11 may be located in the left side region of the electronic device 12, and an included angle between a connection line between the electronic device 11 and the electronic device 12 and the connection line between the microphones M1 and M2 is 45°. However, if the angle of the electronic device 11 relative to the electronic device 12 is 0°, the electronic device 11 may be located at two symmetric locations on the perpendicular bisector of the connection line between the two microphones of the electronic device 12.

It can be learned that, the location of the electronic device 11 relative to the electronic device 12 cannot be uniquely determined based on the angle that is of the electronic device 11 relative to the electronic device 12 and that is determined according to the related technology 1. However, if the location of the electronic device 11 relative to the electronic device 12 needs to be uniquely determined, the electronic device 12 needs to have at least three microphones that are not on a straight line.

Figure 5:
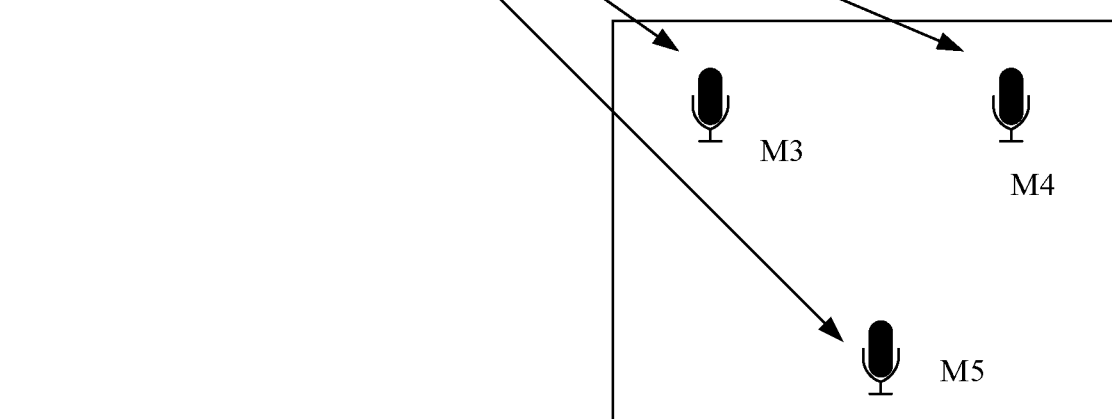
FIG. 5 is a schematic diagram of a scenario of an algorithm for determining an angle between electronic devices according to a related technology 2.

FIG. 5 is a schematic diagram of a scenario of an algorithm for determining an angle between electronic devices according to a related technology 2. The scenario includes an electronic device 21 and an electronic device 22. The electronic device 21 has at least one loudspeaker, the electronic device 22 has at least three microphones, and three microphones of the at least three microphones are not located on one straight line. One loudspeaker of the electronic device 21 can transmit an ultrasound signal, and each microphone of the electronic device 22 can receive the ultrasound signal.

Referring to FIG. 5, in the related technology 2, an algorithm for determining an angle between electronic devices may be as follows: A loudspeaker of the electronic device 21 transmits an ultrasound signal to the electronic device 22, each microphone of the electronic device 22 receives the ultrasound signal, and the electronic device 22 determines an angle of the electronic device 21 relative to the electronic device 22 based on a time difference of receiving the ultrasound signal by three microphones. The three microphones need to meet the following condition: The three microphones are not located on one straight line.

The following specifically describes, by using a specific example, the foregoing algorithm for determining an angle between electronic devices.

The electronic device 21 has one loudspeaker, the electronic device 22 has a microphone M3, a microphone M4, and a microphone M5, and the microphone M3, the microphone M4, and the microphone M5 are not located on one straight line. For example, the electronic device 21 transmits an ultrasound signal through the loudspeaker, the microphone M3 of the electronic device 22 receives the ultrasound signal at a moment $T_3$, the microphone M4 receives the ultrasound signal at a moment $T_4$, and the microphone M5 receives the ultrasound signal at a moment $T_5$. In this case, the electronic device 22 or the electronic device 21 may determine the angle of the electronic device 21 relative to the electronic device 22 based on a difference between $T_3$, $T_4$, and $T_5$.

For example, both the microphone M3, the microphone M4, and the microphone M5 can sample the ultrasound signal at a fixed sampling frequency $f_s$. Then, within a time t, a quantity of sampling points collected by the microphone is $t^*f_s$. Therefore, a time difference between arrival of the ultrasound signal at the microphone M3 and arrival of the ultrasound signal at the microphone M4 may be represented as a difference between a quantity of sampling points of the microphone M3 for the ultrasound signal and a quantity of sampling points of the microphone M4 for the ultrasound signal. A time difference between arrival of the ultrasound signal at the microphone M4 and arrival of the ultrasound signal at the microphone M5 may be represented as a difference between a quantity of sampling points of the microphone M4 for the ultrasound signal and a quantity of sampling points of the microphone M5 for the ultrasound signal. A time difference between arrival of the ultrasound signal at the microphone M3 and arrival of the ultrasound signal at the microphone M5 may be represented as a difference between a quantity of sampling points of the microphone M3 for the ultrasound signal and a quantity of sampling points of the microphone M5 for the ultrasound signal.

For a relationship between the time differences and the differences between the quantities of sampling points, refer to the related technology 1. Details are not described herein again.

After the foregoing three time differences are obtained, a location of the electronic device 21 relative to the electronic device 22 may be determined based on the three time differences. Then, the angle of the electronic device 21 relative to the electronic device 22 is determined based on the location of the electronic device 21 relative to the electronic device 22.

Figure 6:
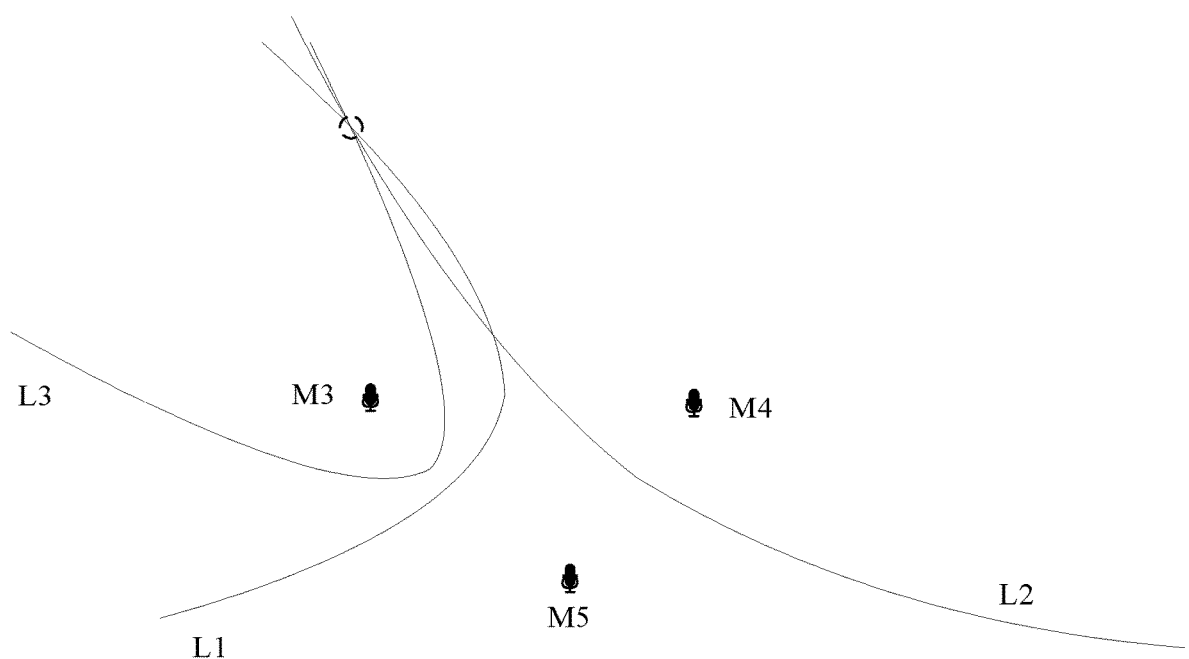
FIG. 6 is a schematic diagram of a scenario of determining a location of an electronic device 11.

For example, as shown in FIG. 6, a curve L1 in hyperbolic lines that use the microphone M3 and the microphone M4 as focuses may be obtained based on the time difference between the arrival of the ultrasound signal at the microphone M3 and the arrival of the ultrasound signal at the microphone M4. In other words, the curve L1 is a possible location of the electronic device 21. For an ultrasound signal sent by the electronic device 21 located at all points on the curve L1, a time difference between arrival of the ultrasound signal at the microphone M3 and arrival of the ultrasound signal at the microphone M4 is a fixed value. Similarly, a curve L2 may be obtained based on the time difference between the arrival of the ultrasound signal at the microphone M4 and the arrival of the ultrasound signal at the microphone M5. A curve L3 may be obtained based on the time difference between the arrival of the ultrasound signal at the microphone M3 and the arrival of the ultrasound signal at the microphone M5. An intersection point (a location enclosed by a dashed line in FIG. 6) of the curves L1, L2, and L3 is the location of the electronic device 21 relative to the electronic device 22.

In this embodiment, the angle of the electronic device 21 relative to the electronic device 22 may be uniquely determined based on the time difference of receiving the ultrasound signal through the three microphones of the electronic device 22.

However, in the related technology 2, it is required that the electronic device 22 has three microphones that are not on one straight line. However, in existing electronic devices, there are very few electronic devices that have three microphones that are not on one straight line.

Figure 7:
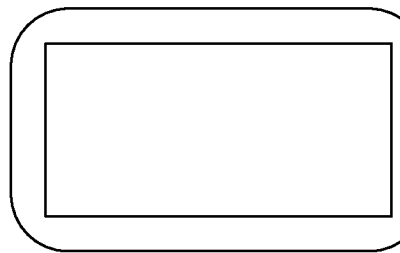
FIG. 7 is a schematic diagram of a system architecture to which an angle determining method is applicable according to an embodiment.
Figure 7:
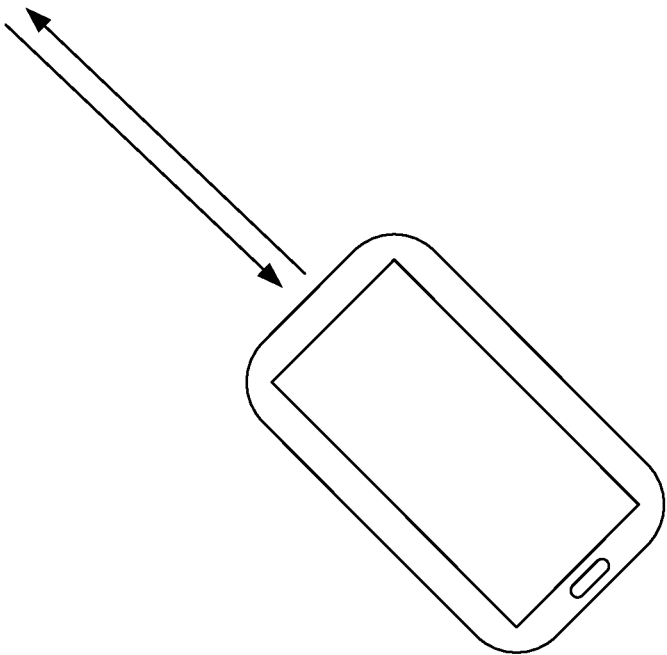

FIG. 7 is a schematic diagram of a system architecture to which an angle determining method is applicable according to an embodiment. As shown in FIG. 7, the system architecture may include a first electronic device 100 and a second electronic device 200.

The first electronic device 100 and the second electronic device 200 each may include an audio sending unit and/or an audio receiving unit. The audio sending unit is a unit capable of sending a sound wave signal, for example, a loudspeaker. The audio receiving unit is a unit capable of receiving a sound wave signal, for example, a microphone.

The sound wave signals may be infrasonic wave signals with a frequency of 0 kHz to 20 kHz, or may be ultrasound signals with a frequency of more than 20 kHz. This is not limited in this embodiment. For example, the sound wave signals may have a frequency of 1 kHz, 2 kHz, 3 kHz, 5 kHz, 10 kHz, 15 kHz, 20 kHz, or 30 kHz.

Figure 8:
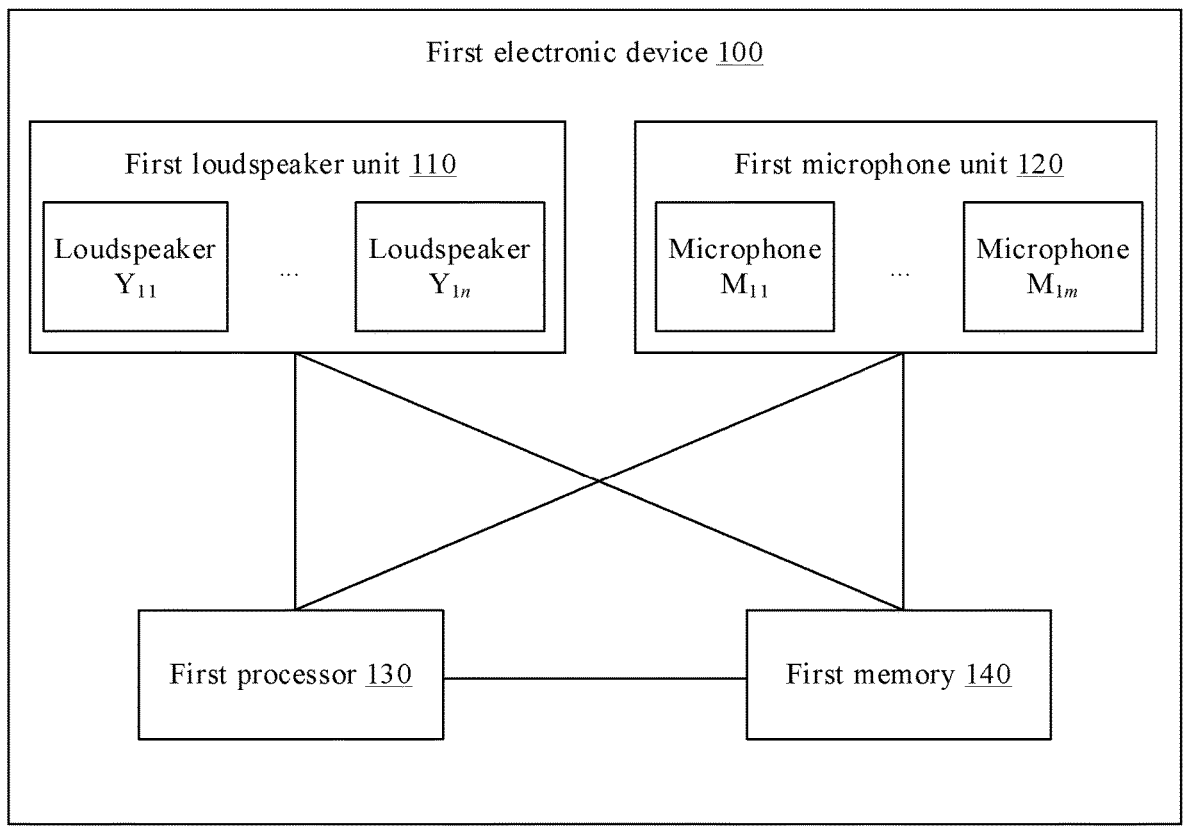
FIG. 8 is a schematic diagram of a structure of a first electronic device according to an embodiment.

In some embodiments, the audio sending unit of the first electronic device 100 may be a loudspeaker, and the audio receiving unit may be a microphone. Referring to FIG. 8, the first electronic device 100 may include a first loudspeaker unit 110 and/or a first microphone unit 120, a first memory 140, a first processor 130, and a computer program that is stored in the first memory 140 and that can run on the first processor 130. The first loudspeaker unit 110 includes a loudspeaker $Y_{11}$ to a loudspeaker $Y_{1n}$, and the first microphone unit 120 includes a microphone $M_{11}$ to a microphone $M_{1m}$, where m and n are natural numbers.

For example, the computer program may be divided into one or more modules/units. The one or more modules/units are stored in the first memory 140, and are executed by the first processor 130, to implement this disclosure. The one or more modules/units may be a series of computer program segments that can complete a specific function, and the program segments are used to describe an execution process of the computer program in the first electronic device 100.

For example, the first memory 140 is configured to store a first instruction, an audio file, and the like. The first loudspeaker unit 110, the first microphone unit 120, and the first memory 140 may be connected to the first processor 130 through a bus, to implement data exchange. The first processor 130 is configured to invoke the first instruction and the audio file in the first memory 140, and control, based on the first instruction and the audio file, one or more loudspeakers in the first loudspeaker unit 110 to send a sound wave signal. The first processor 130 is configured to invoke the first instruction and the audio file in the first memory 140, and control, based on the first instruction and the audio file, one or more microphones in the first microphone unit 120 to receive a sound wave signal.

Figure 9:
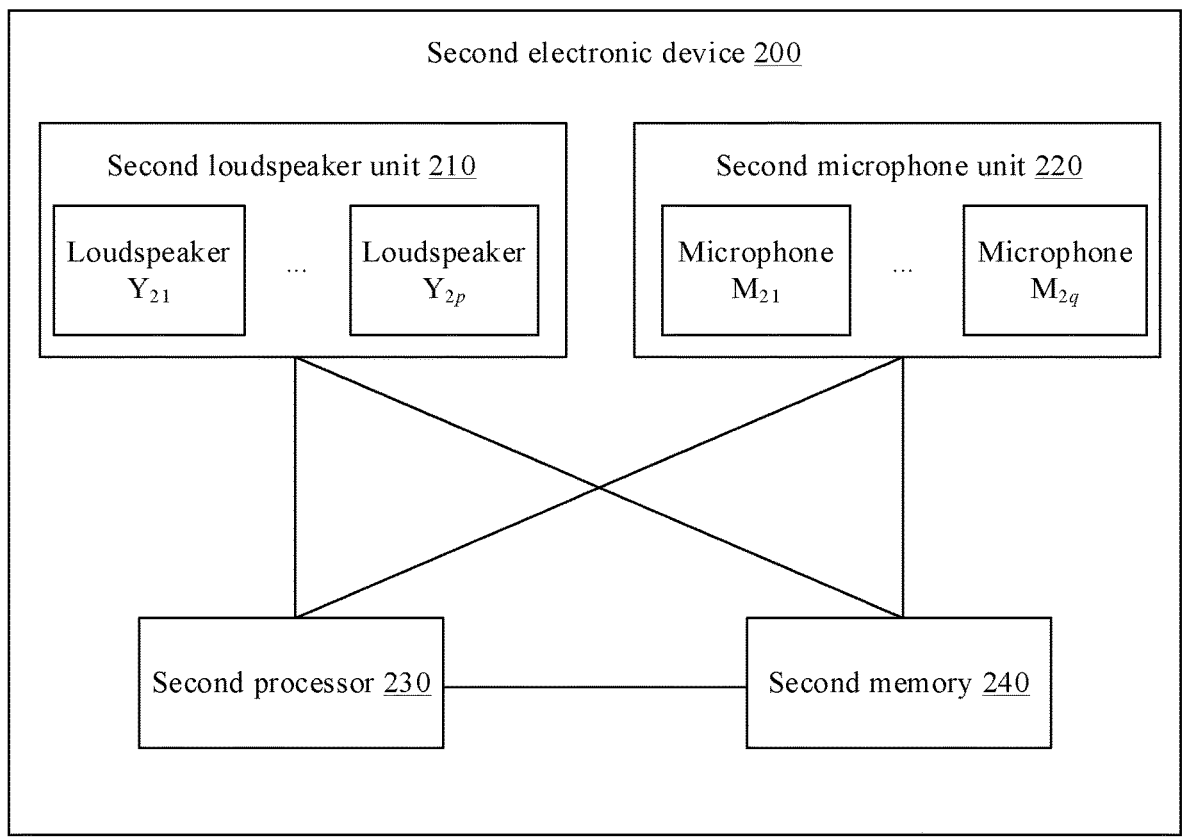
FIG. 9 is a schematic diagram of a structure of a second electronic device according to an embodiment.

In some embodiments, the audio sending unit of the second electronic device 200 may be a loudspeaker, and the audio receiving unit may be a microphone. Referring to FIG. 9, the second electronic device 200 may include a second loudspeaker unit 210 and/or a second microphone unit 220, a second memory 240, a second processor 230, and a computer program that is stored in the second memory 240 and that can run on the second processor 230. The second loudspeaker unit 210 includes a loudspeaker $Y_{21}$ to a loudspeaker $Y_{2p}$, and the second microphone unit 220 includes a microphone $M_{21}$ to a microphone $M_{2q}$, where p and q are natural numbers.

For example, the computer program may be divided into one or more modules/units. The one or more modules/units are stored in the second memory 240, and are executed by the second processor 230, to implement this disclosure. The one or more modules/units may be a series of computer program segments that can complete a specific function, and the program segments are used to describe an execution process of the computer program in the second electronic device 200.

For example, the second memory 240 is configured to store a second instruction, an audio file, and the like. The second loudspeaker unit 210, the second microphone unit 220, and the second memory 240 may be connected to the second processor 230 through a bus, to implement data exchange. The second processor 230 is configured to invoke the second instruction in the second memory 240, and control, based on the second instruction and the audio file, one or more loudspeakers in the second loudspeaker unit 210 to send a sound wave signal. The second processor 230 is configured to invoke the second instruction in the second memory 240, and control, based on the second instruction and the audio file, one or more microphones in the second microphone unit 220 to receive a sound wave signal.

It should be noted that the first electronic device 100 may have only the first loudspeaker unit 110, or have only the first microphone unit 120, or have the first loudspeaker unit 110 and the first microphone unit 120. Similarly, the second electronic device 200 may have only the second loudspeaker unit 210, or have only the second microphone unit 220, or have the second loudspeaker unit 210 and the second microphone unit 220.

In some embodiments, the audio sending units and the audio receiving units of the first electronic device 100 and the second electronic device 200 may be divided into two audio transceiver units. Each audio transceiver unit includes at least one audio sending unit of the first electronic device 100 and at least one audio receiving unit of the second electronic device 200. Alternatively, each audio transceiver unit includes at least one audio receiving unit of the first electronic device 100 and at least one audio sending unit of the second electronic device 200.

An example in which the two audio transceiver units are a first audio transceiver unit and a second audio transceiver unit is used to describe how to determine an angle of the first electronic device 100 relative to the second electronic device 200.

Figure 10:
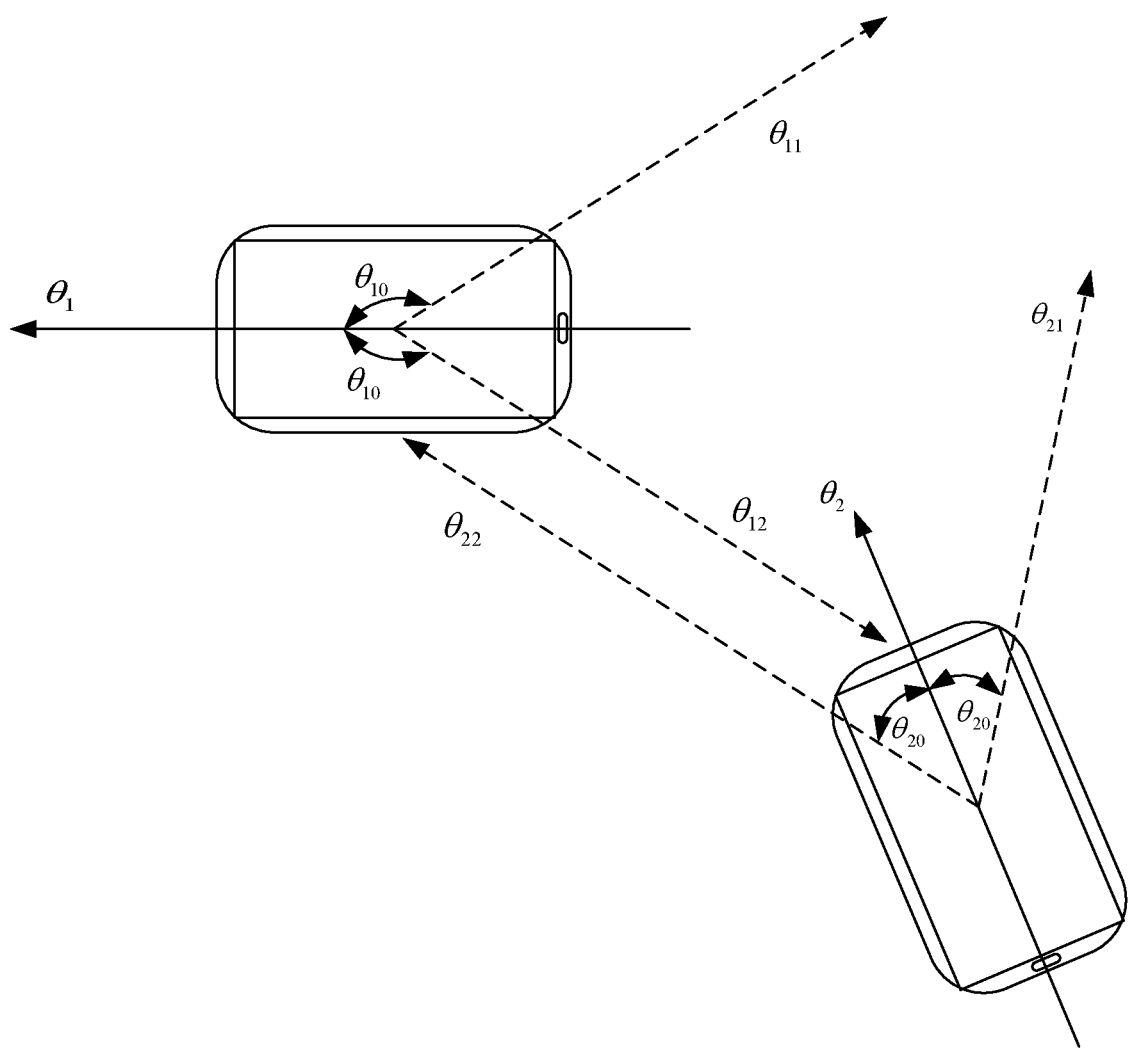
FIG. 10 is a schematic diagram of an angle between a first electronic device and a second electronic device according to an embodiment.

Referring to FIG. 10, the first electronic device 100 determines a first included angle between a first direction and an orientation of the first electronic device. The first direction is a direction from the second electronic device 200 to the first electronic device 100. For example, the first direction may be a direction from a central point of the second electronic device 200 to a central point of the first electronic device 100. The first direction may be obtained by calculating a first angle of the second electronic device 200 relative to the first electronic device 100. The first angle of the second electronic device 200 relative to the first electronic device 100 may be determined with reference to the algorithms in FIG. 2 and FIG. 3.

Referring to FIG. 2 and FIG. 3, in a coordinate system of the first electronic device, the first electronic device 100 and the second electronic device 200 may be used as two particles, and the particle corresponding to the first electronic device 100 is an origin of the coordinate system of the first electronic device. The first angle of the second electronic device 200 relative to the first electronic device 100 is a first angle formed by a first edge corresponding to 0° in the coordinate system of the first electronic device and a second edge formed by the particle corresponding to the first electronic device 100 to the particle corresponding to the second electronic device 200.

When the reference angles are 90°, 0°, and −90°, if the first edge is rotated through the first angle in a clockwise direction by using the origin of the coordinate system as a fixed point, the first angle formed by the first edge and the second edge is a positive value; or if the first edge is rotated through the first angle in a counterclockwise direction by using the origin of the coordinate system as a fixed point, the first angle formed by the first edge and the second edge is a negative value. When the reference angles are 0°, 90°, and 180°, the first angle formed by the first edge and the second edge is a positive value in each of the following cases: The first edge is rotated through the first angle in a clockwise direction by using the origin of the coordinate system as a fixed point; and the first edge is rotated through the first angle in a counterclockwise direction by using the origin of the coordinate system as a fixed point.

The orientation of the first electronic device may be a direction corresponding to a central point of a screen of the first electronic device to a midpoint of any edge of the screen of the first electronic device. Alternatively, a screen of the first electronic device is a rectangular screen, and the orientation of the first electronic device may be a corresponding direction perpendicular to a plane on which a side wall of the first electronic device is located and extending from the inside of the side wall to the outside of the side wall. The orientation of the first electronic device corresponds to an angle value in a terrestrial coordinate system. For example, if the orientation of the first electronic device corresponds to a north magnetic pole, the orientation of the first electronic device may be defined as 0°; or if the orientation of the first electronic device corresponds to a south magnetic pole, the orientation of the first electronic device may be defined as 180°. An angle corresponding to any orientation between the north magnetic pole and the south magnetic pole in a clockwise direction may be obtained by evenly dividing 0° to 180°. An angle corresponding to any orientation between the south magnetic pole and the north magnetic pole in a clockwise direction may be obtained by evenly dividing 180° to 360°. Two edges of the angle value, in the terrestrial coordinate system, that corresponds to the orientation of the first electronic device are: an edge from a central point of the first electronic device 100 to the north magnetic pole (namely, an edge corresponding to 0°) and an edge corresponding to the orientation of the first electronic device.

Figure 11:
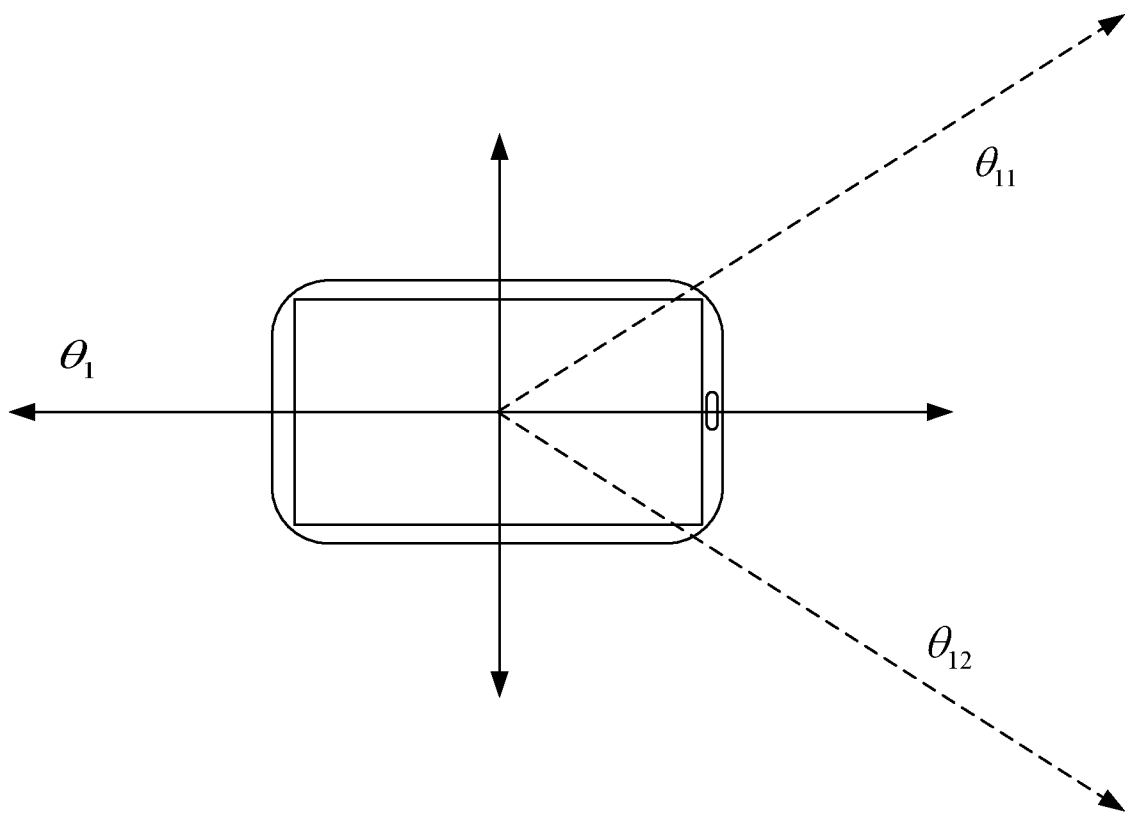
FIG. 11 is a schematic diagram of a coordinate system of a first electronic device and an orientation of the first electronic device according to an embodiment.

As shown in FIG. 11, in the coordinate system of the first electronic device 100, if the reference angles are 90°, 0°, and −90°, the orientation of the first electronic device corresponds to an edge corresponding to the reference angle −90°, and a reverse direction of the orientation of the first electronic device corresponds to an edge corresponding to the reference angle 90°. If the reference angles are 0°, 90°, and 180°, the orientation of the first electronic device corresponds to an edge corresponding to the reference angle 180°, and a reverse direction of the orientation of the first electronic device corresponds to an edge corresponding to the reference angle 0°.

In this embodiment, two edges forming the first included angle are respectively an edge corresponding to the direction (that is, the first direction) from the second electronic device 200 to the first electronic device 100 and the edge corresponding to the orientation of the first electronic device.

In some embodiments, the first electronic device 100 may determine the first angle by using the first audio transceiver unit and the method in the related technology 1. The first electronic device 100 may determine the first included angle $\theta_{10}$ based on the first angle, the reference angles, and the orientation of the first electronic device. For a specific process, refer to Embodiment 2 below. Details are not described herein again. Then, the first electronic device 100 may determine two first possible angle values $\theta_{11}$ and $\theta_{12}$ of the second electronic device 200 relative to the first electronic device 100 based on the first included angle $\theta_{10}$ and the orientation of the first electronic device. For example $\theta_{11}=\theta_1+\theta_{10}$, $\theta_{12}=\theta_1-\theta_{10}$, and an angle $\theta_1$ corresponding to the orientation of the first electronic device is an angle based on the terrestrial coordinate system. Therefore, the first possible angle values $\theta_{11}$ and $\theta_{12}$ that are obtained through calculation by using the formulas $\theta_{11}=\theta_1+\theta_{10}$ and $\theta_{12}=\theta_1-\theta_{10}$ are angle values in the terrestrial coordinate system.

Similarly, referring to FIG. 10, the second electronic device 200 determines a second included angle between a second direction and an orientation of the second electronic device. The second direction is a direction from the first electronic device 100 to the second electronic device 200. For example, the second direction may be a direction from a central point of the first electronic device 100 to a central point of the second electronic device 200. The second direction may be obtained by calculating a second angle of the first electronic device 100 relative to the second electronic device 200. The second angle of the first electronic device 100 relative to the second electronic device 200 may be determined with reference to the algorithms in FIG. 2 and FIG. 3.

Referring to FIG. 2 and FIG. 3, in a coordinate system of the second electronic device, the first electronic device 100 and the second electronic device 200 may be used as two particles, and the particle corresponding to the second electronic device 200 is an origin of the coordinate system of the second electronic device. The second angle of the first electronic device 100 relative to the second electronic device 200 is a second angle formed by a third edge corresponding to 0° in the coordinate system of the second electronic device and a fourth edge formed by the particle corresponding to the second electronic device 200 to the particle corresponding to the first electronic device 100.

When the reference angles are 90°, 0°, and −90°, if the third edge is rotated through the second angle in a clockwise direction by using the origin of the coordinate system as a fixed point, the second angle formed by the third edge and the fourth edge is a positive value; or if the third edge is rotated through the second angle in a counterclockwise direction by using the origin of the coordinate system as a fixed point, the second angle formed by the third edge and the fourth edge is a negative value. When the reference angles are 0°, 90°, and 180°, the second angle formed by the third edge and the fourth edge is a positive value in each of the following cases: The third edge is rotated through the second angle in a clockwise direction by using the origin of the coordinate system as a fixed point; and the third edge is rotated through the second angle in a counterclockwise direction by using the origin of the coordinate system as a fixed point.

The orientation of the second electronic device may be a direction corresponding to a symmetry axis in a length direction or a width direction of the second electronic device 200. For example, the orientation of the second electronic device may be a direction corresponding to a midpoint at the bottom of the second electronic device 200 to a midpoint at the top of the second electronic device 200. The orientation of the second electronic device corresponds to an angle value in a terrestrial coordinate system. For example, if the orientation of the second electronic device corresponds to a north magnetic pole, the orientation of the second electronic device may be defined as 0°; or if the orientation of the second electronic device corresponds to a south magnetic pole, the orientation of the second electronic device may be defined as 180°. An angle corresponding to any orientation between the north magnetic pole and the south magnetic pole in a clockwise direction may be obtained by evenly dividing 0° to 180°. An angle corresponding to any orientation between the south magnetic pole and the north magnetic pole in a clockwise direction may be obtained by evenly dividing 180° to 360°. Two edges of the angle value, in the terrestrial coordinate system, that corresponds to the orientation of the second electronic device are: an edge from a central point of the second electronic device 200 to the north magnetic pole (namely, an edge corresponding to 0°) and an edge corresponding to the orientation of the second electronic device.

The orientation of the second electronic device corresponds to one angle value $\theta_2$ in the terrestrial coordinate system, and also corresponds to one angle value $\theta'_2$ (not shown in FIG. 10) in the coordinate system of the second electronic device. $\theta_2$ is formed by an edge corresponding to the orientation of the second electronic device and an edge corresponding to 0° in the terrestrial coordinate system, and the edge corresponding to 0° in the terrestrial coordinate system is omitted in FIG. 10. $\theta'_2$ is formed by the edge corresponding to the orientation of the second electronic device and the edge that corresponds to the reference angle 0° in the coordinate system of the second electronic device.

Figure 12:
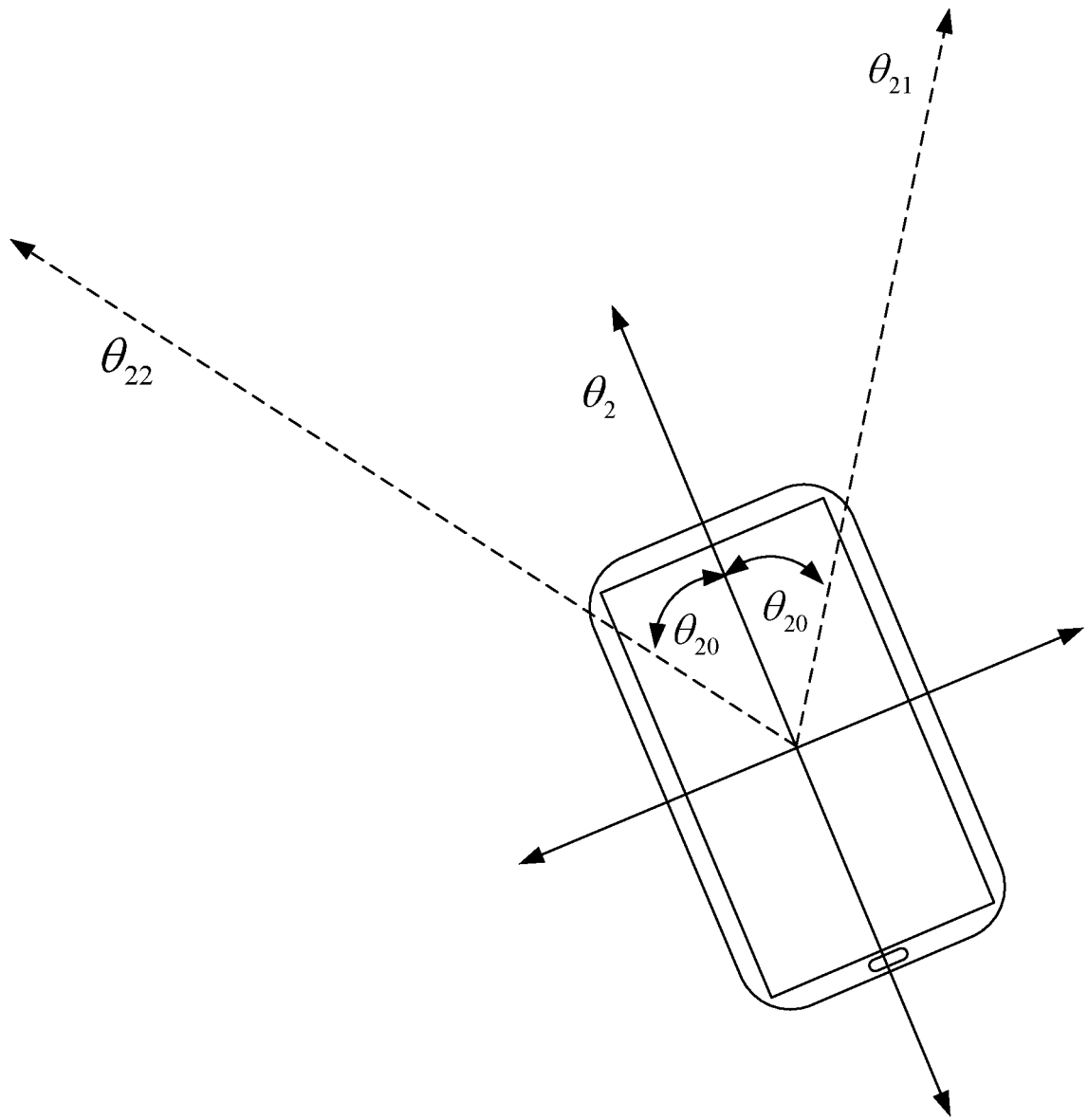
FIG. 12 is a schematic diagram of a coordinate system of a second electronic device and an orientation of the second electronic device according to an embodiment.

As shown in FIG. 12, in the coordinate system of the second electronic device 200, if the reference angles are 90°, 0°, and −90°, the orientation of the second electronic device corresponds to an edge corresponding to the reference angle −90°, and a reverse direction of the orientation of the second electronic device corresponds to an edge corresponding to the reference angle 90°. If the reference angles are 0°, 90°, and 180°, the orientation of the second electronic device corresponds to an edge corresponding to the reference angle 180°, and a reverse direction of the orientation of the second electronic device corresponds to an edge corresponding to the reference angle 0°.

In this embodiment, two edges forming the second included angle are respectively an edge corresponding to the direction (that is, the second direction) from the first electronic device 100 to the second electronic device 200 and the edge corresponding to the orientation of the second electronic device.

In some embodiments, the second electronic device 200 may determine the second angle by using the second audio transceiver unit and the method in the related technology 1. The second electronic device 200 may determine the second included angle $\theta_{20}$ based on the second angle, the reference angles, and the orientation of the second electronic device. For a specific process, refer to Embodiment 2 below. Details are not described herein again. Then, the second electronic device 200 may determine two second possible angle values $\theta_{21}$ and $\theta_{22}$ of the first electronic device 100 relative to the second electronic device 200 based on the second included angle $\theta_{20}$ and the orientation of the second electronic device. For example, $\theta_{21}=\theta_2+\theta_{20}$, $\theta_{22}=\theta_2-\theta_{20}$, and an angle $\theta_2$ corresponding to the orientation of the second electronic device 200 is an angle based on the terrestrial coordinate system. Therefore, the second possible angle values $\theta_{21}$ and $\theta_{22}$ that are obtained through calculation by using the formulas $\theta_{21}=\theta_2+\theta_{20}$ and $\theta_{22}=\theta_2-\theta_{20}$ are angle values in the terrestrial coordinate system.

The two first possible angle values $\theta_{11}$ and $\theta_{12}$ of the second electronic device 200 relative to the first electronic device 100 and the two second possible angle values $\theta_{21}$ and $\theta_{22}$ of the first electronic device 100 relative to the second electronic device 200 are obtained through the foregoing calculation process. The first possible angle values $\theta_{11}$ and $\theta_{12}$ are obtained through calculation based on the first electronic device 100 and the angle $\theta_1$ corresponding to the orientation of the first electronic device 100, and the second possible angle values $\theta_{21}$ and $\theta_{22}$ are obtained through calculation based on the second electronic device 200 and the angle $\theta_2$ corresponding to the orientation of the second electronic device 200. In other words, the first possible angle values $\theta_{11}$ and $\theta_{12}$ and the second possible angle values $\theta_{21}$ and $\theta_{22}$ are obtained through calculation based on different reference objects. In addition, the first possible angle values $\theta_{11}$ and $\theta_{12}$ and the second possible angle values $\theta_{21}$ and $\theta_{22}$ are angles based on a same coordinate system. After the first possible angle values $\theta_{11}$ and $\theta_{12}$ are negated, negated first possible angle values may be compared with the second possible angle values $\theta_{21}$ and $\theta_{22}$, and an actual angle of the first electronic device 100 relative to the second electronic device 200 is determined based on a comparison result. Alternatively, after the second possible angle values $\varphi_{21}$ and $\varphi_{22}$ are negated, negated second possible angle values may be compared with the first possible angle values $\varphi_{11}$ and $\varphi_{12}$ and an actual angle of the second electronic device 200 relative to the first electronic device 100 is determined based on a comparison result.

Figure 13A:
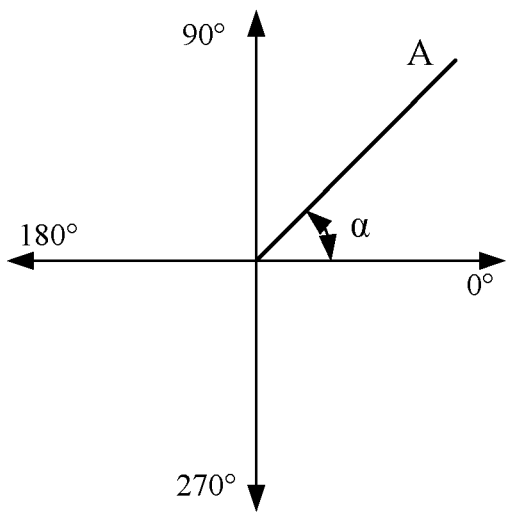
FIG. 13A and FIG. 13B are schematic diagrams of angle negation according to an embodiment.
Figure 13B:
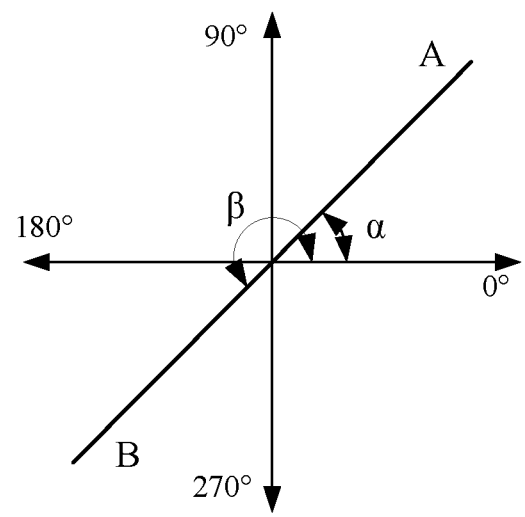

Negating a target angle may be: calculating an angle corresponding to a reverse direction of a second edge of the target angle. Referring to FIG. 13A, a first edge of an angle α is an edge corresponding to 0°, and a second edge is an edge corresponding to a ray A. In this case, negating the angle α is: calculating an angle β corresponding to a ray B in a reverse direction of the ray A. As shown in FIG. 13B, a first edge of the angle β is an edge corresponding to 0°, and a second edge is an edge corresponding to the ray B. The ray A and the ray B are located on one straight line. A calculation formula for negating the angle α to obtain the angle β is β=mod(α+180°,360°). If (α+180°)<360°, a result of (α+180°) is used as the angle β; or if (α+180°)≥360°, a result of (α+180°)−360° is used as the angle β.

Specifically, the second electronic device 200 may send the determined two second possible angle values $\theta_{21}$ and $\theta_{22}$ to the first electronic device 100. After negating the two second possible angle values $\theta_{21}$ and $\theta_{22}$, the first electronic device 100 calculates a difference between the first possible angle values and the negated second possible angle values. The first electronic device 100 determines the actual angle of the second electronic device 200 relative to the first electronic device 100 based on a first possible angle value and a negated second possible angle value that correspond to a smallest difference.

For example, the first electronic device 100 may negate second possible angle values $\theta_{21}$ and $\theta'_{22}$ to obtain $\theta'_{21}$ and $\theta'_{22}$, where $\theta'_{21}=\mathrm{mod}(\theta_{21}+180°,360°)$ and $\theta'_{22}=\mathrm{mod}(\theta_{22}+180°,360°)$. Then, the first electronic device 100 calculates a difference $|\theta_{11}-\theta'_{21}|$ between $\theta_{11}$ and $\theta'_{21}$, a difference $|\theta_{11}-\theta'_{22}|$ between $\theta_{11}$ and $\theta'_{22}$, a difference $|\theta_{12}-\theta'_{21}|$ between $\theta_{12}$ and $\theta'_{21}$, and a difference $|\theta_{12}-\theta'_{22}|$ between $\theta_{12}$ and $\theta'_{22}$. In the two second possible angle values $\theta_{21}$ and $\theta_{22}$, only one second angle value (for example, $\theta_{22}$ in FIG. 10) is an actual angle of the first electronic device 100 relative to the second electronic device 200, and the other second angle value (for example, $\theta_{21}$ in FIG. 10) is not an actual angle of the first electronic device 100 relative to the second electronic device 200. Similarly, in the two first possible angle values $\theta_{11}$ and $\theta_{12}$, only one first angle value (for example, $\theta_{12}$ in FIG. 10) is an actual angle of the second electronic device 200 relative to the first electronic device 100, and the other first angle value (for example, $\theta_{11}$ in FIG. 10) is not an actual angle of the second electronic device 200 relative to the first electronic device 100. In addition, with reference to FIG. 10, FIG. 13A, and FIG. 13B, it can be learned that in a same coordinate system, the actual angle (for example, $\theta_{22}$ in FIG. 10) of the first electronic device 100 relative to the second electronic device 200 and the actual angle (for example, $\theta_{12}$ in FIG. 10) of the second electronic device 200 relative to the first electronic device 100 are in a negation relationship between the two actual angles. Therefore, the second possible angle values $\theta_{21}$ and $\theta_{22}$ may be negated, and one angle value ($\theta'_{21}$ or $\theta'_{22}$) in the angle values $\theta'_{21}$ and $\theta'_{22}$ obtained in this way is basically the same as one angle value ($\theta_{11}$ or $\theta_{12}$) in the first possible angle values $\theta_{11}$ and $\theta_{12}$. The two basically the same angle values are actual angles of the second electronic device 200 relative to the first electronic device 100. Therefore, the first electronic device 100 may use two angles corresponding to a smallest difference as actual angles of the second electronic device 200 relative to the first electronic device 100. Alternatively, the first electronic device 100 may use an average value of two angles corresponding to a smallest difference as an actual angle of the second electronic device 200 relative to the first electronic device 100.

Alternatively, the first electronic device 100 may send the determined two first possible angle values $\theta_{11}$ and $\theta_{12}$ to the second electronic device 200. After negating the two first possible angle values $\theta_{11}$ and $\theta_{12}$ the second electronic device 200 calculates a difference between the second possible angle values and the negated first possible angle values. The second electronic device 200 determines the actual angle of the first electronic device 100 relative to the second electronic device 200 based on a second possible angle value and a negated first possible angle value that correspond to a smallest difference.

For example, the second electronic device 200 may negate first possible angle values $\theta_{11}$ and $\theta_{12}$ to obtain $\theta'_{11}$ and $\theta'_{12}$, where $\theta'_{11}=\mathrm{mod}(\theta_{11}+180°,360°)$ and $\theta'_{12}=\mathrm{mod}(\theta_{12}+180°,360°)$. Then, the second electronic device 200 calculates a difference $|\theta_{21}-\theta'_{11}|$ between $\theta_{21}$ and $\theta'_{11}$, a difference $|\theta_{21}-\theta'_{12}|$ between $\theta_{21}$ and $\theta'_{12}$, a difference $|\theta_{22}-\theta'_{11}|$ between $\theta_{22}$ and $\theta'_{11}$, and a difference $|\theta_{22}-\theta'_{12}|$ between $\theta_{22}$ and $\theta'_{12}$. The second electronic device 200 uses two angles corresponding to a smallest difference as actual angles of the first electronic device 100 relative to the second electronic device 200. Alternatively, the second electronic device 200 uses an average value of two angles corresponding to a smallest difference as an actual angle of the first electronic device 100 relative to the second electronic device 200.

In this embodiment, the first possible angle values $\theta_{11}$ and $\theta_{12}$ and the second possible angle values $\theta_{21}$ and $\theta_{22}$ are four possible angles that are of the first electronic device 100 relative to the second electronic device 200 and that are obtained through calculation based on different reference objects. In addition, the four possible angles are angles in a same coordinate system, and may be compared with each other. The foregoing difference between the first possible angle and the second possible angle is calculated, and the actual angle of the first electronic device 100 relative to the second electronic device 200 can be determined based on two possible angles with a smallest difference. The actual angle is an angle in the terrestrial coordinate system and is unique. Therefore, compared with the related technology 1, an actual location of the first electronic device 100 relative to the second electronic device 200 can be determined in this embodiment. In addition, compared with the related technology 2, this embodiment requires only one microphone or two microphones, and does not require that at least three microphones are not on one straight line. Therefore, this embodiment is easier to implement.

Figure 14:
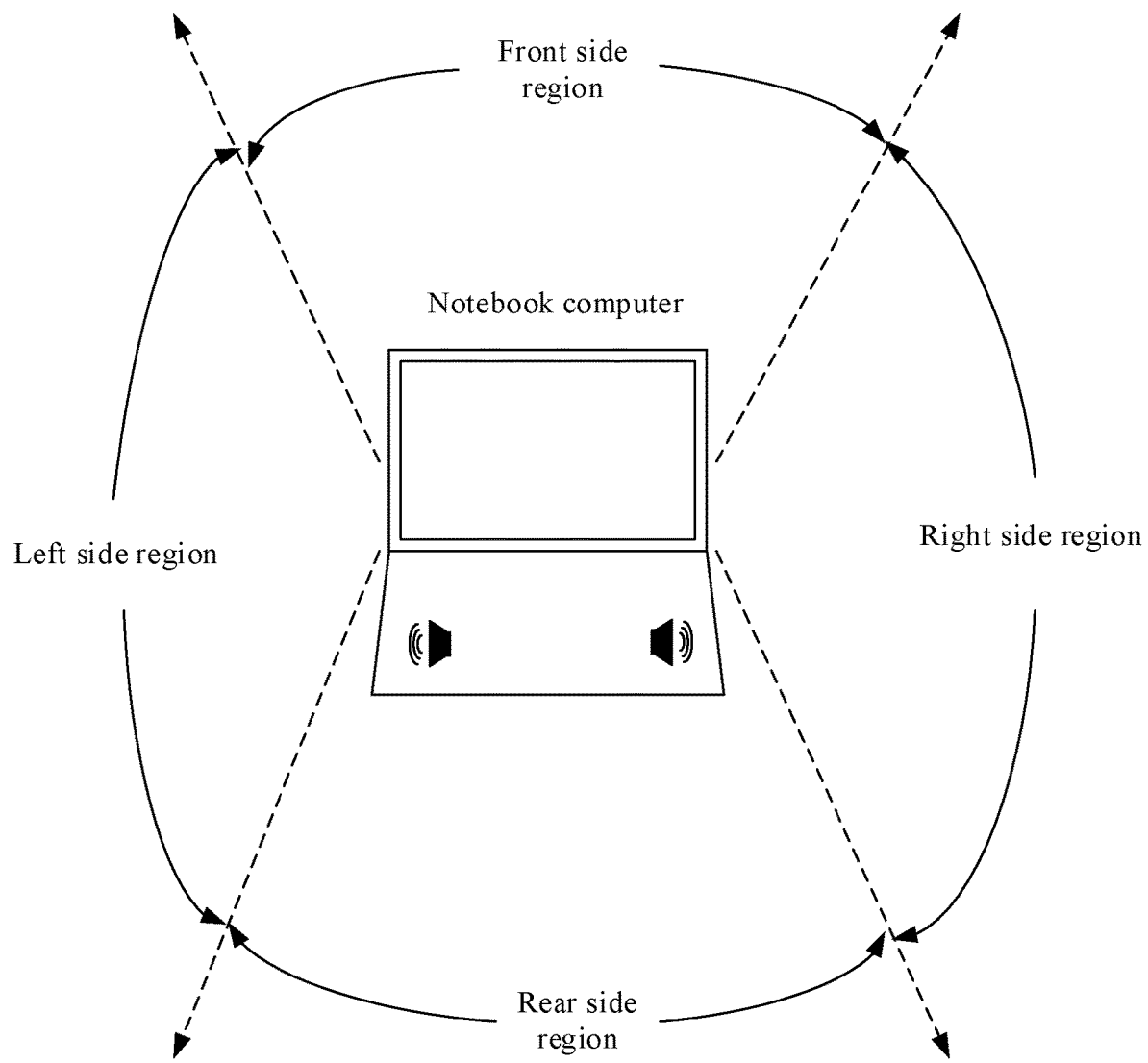
FIG. 14 is a schematic diagram of region division of a notebook computer according to an embodiment.

Further, because the foregoing actual angle is unique, it can be determined, based on the actual angle of the first electronic device 100 relative to the second electronic device 200, that the first electronic device 100 is located in a specific region among a left side region, a right side region, a front side region, and a rear side region of the second electronic device 200. Alternatively, it can be determined, based on the actual angle of the second electronic device 200 relative to the first electronic device 100, that the second electronic device 200 is located in a specific region among a left side region, a right side region, a front side region, and a rear side region of the first electronic device 100. The left side region, the right side region, the front side region, and the rear side region of the first electronic device 100 are shown in FIG. 14.

In some embodiments, angles corresponding to boundaries of the left side region, the right side region, the front side region, and the rear side region may be preset, and then a region in which the actual angle is located is determined based on the preset region. For example, referring to FIG. 15, angles corresponding to boundaries of the left side region, the right side region, the front side region, and the rear side region may be preset to 70°, 110°, 250°, and 290°. To be specific, if the angle of the second electronic device 200 relative to the first electronic device 100 falls within a range [70°,110°], the second electronic device 200 is located in the front side region of the first electronic device 100; if the angle of the second electronic device 200 relative to the first electronic device 100 falls within a range [250°,290°], the second electronic device 200 is located in the rear side region of the first electronic device 100; if the angle of the second electronic device 200 relative to the first electronic device 100 falls within a range (290°,70°), the second electronic device 200 is located in the right side region of the first electronic device 100; or if the angle of the second electronic device 200 relative to the first electronic device 100 falls within a range (110°,250°), the second electronic device 200 is located in the left side region of the first electronic device 100.

It should be noted that, only two audio transceiver units are used as an example above to describe how to determine the actual angle of the first electronic device 100 relative to the second electronic device 200, and this is not limited thereto. For example, the audio sending units and the audio receiving units of the first electronic device 100 and the second electronic device 200 may be divided into three or more audio transceiver units. The actual angle of the first electronic device 100 relative to the second electronic device 200 may be determined by using any two of the three or more audio transceiver units.

For example, the first processor 130 and the second processor 230 each may include one or more processing units. For example, the first processor 130 and the second processor 230 each may include one or more processing units among a central processing unit (CPU), a modulation/demodulation processing unit, a graphics processing unit (GPU), an image signal processor (ISP), a video codec unit, a digital signal processor (DSP), a baseband processing unit, and/or a neural-network processing unit (NPU). Different processing units may be independent devices, or may be integrated into one or more processors.

The first processor 130 or the second processor 230 may be a central processing unit, or may be another general-purpose processor, a digital signal processor, an application-specific integrated circuit (ASIC), or a field-programmable gate array (FPGA), or another programmable logic device, discrete gate, transistor logic device, discrete hardware component, or the like. The general purpose processor may be a microprocessor or any processor or the like.

For example, the first processor 130 and the second processor 230 each may include one or more interfaces. For example, the interfaces may include an inter-integrated circuit (I2C) interface, an inter-integrated circuit sound (I2S) interface, a secure digital input/output (SDIO) interface, a serial peripheral interface (SPI), a mobile industry processor interface (MIPI), a subscriber identity module (SIM) interface, and/or a universal serial bus (USB) interface.

For example, the first memory 140 and/or the second memory 240 may be an internal storage unit of the electronic device, or may be an external storage device of the electronic device, for example, a removable hard disk, a smart media card (SMC), a secure digital (SD) card, or a flash card. The first memory 140 and the second memory 240 each are configured to store a computer program and other programs and data required by the electronic device. The first memory 140 and the second memory 240 may be further configured to temporarily store data that has been output or is to be output.

The bus may be an Industry Standard Architecture (ISA) bus, a Peripheral Component Interconnect (PCI) bus, an Extended Industry Standard Architecture (EISA) bus, a Universal Serial Bus (USB), or the like. The bus may include an address bus, a data bus, a control bus, and the like.

It may be understood that the schematic structure in this embodiment constitutes no specific limitation on the first electronic device 100 and the second electronic device 200. In some other embodiments, the first electronic device 100 and/or the second electronic device 200 may include more or fewer components than those shown in the figure, or some components may be combined, or some components may be split, or different component arrangements may be used. The components shown in the figure may be implemented by using hardware, software, or a combination of software and hardware. For example, the first electronic device 100 and/or the second electronic device 200 may further include a universal serial bus (USB) interface, a battery, a mobile communications unit, an audio unit, a loudspeaker, a telephone receiver, a microphone, a button, a camera, a subscriber identity module (SIM) card interface, a pressure sensor, a barometric pressure sensor, a magnetic sensor, a distance sensor, an optical proximity sensor, a fingerprint sensor, a temperature sensor, a touch sensor, an ambient light sensor, and a bone conduction sensor.

For example, the first electronic device and the second electronic device each may be an electronic device such as a notebook computer, a television, a display, a mobile phone, a tablet computer, a wearable device, an in-vehicle device, an augmented reality (AR)/virtual reality (VR) device, an ultra-mobile personal computer (UMPC), a netbook, and a personal digital assistant (PDA). In this embodiment, specific types of the first electronic device and the second electronic device are not limited.

The following separately describes four application scenarios of an angle determining method provided in embodiments: an application scenario of extended display, an application scenario of secure screen projection, an application scenario of a stereo, and an application scenario of directional sound playing.

1. Application Scenario of Extended Display

Figure 16:
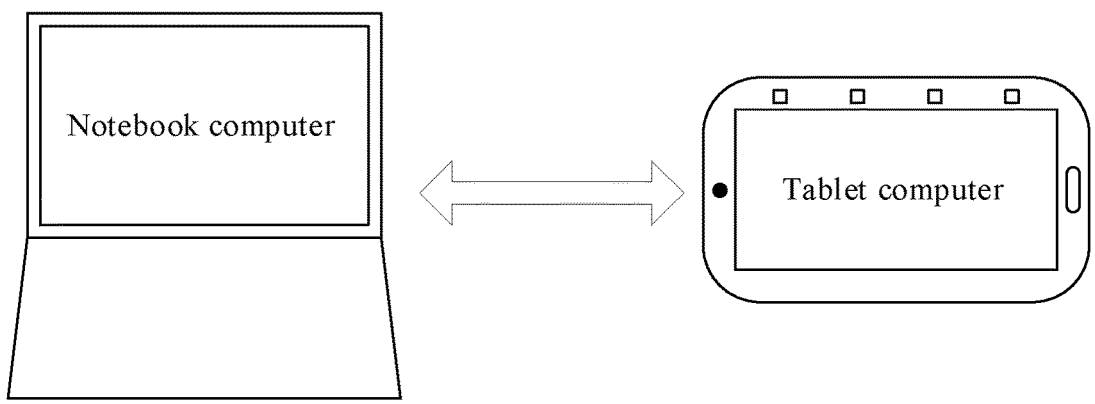
FIG. 16 is a schematic diagram of an application scenario of extended display according to an embodiment.

FIG. 16 is a schematic diagram of an application scenario of extended display according to an embodiment. The following describes the application scenario of the extended display by using an example in which the first electronic device is a notebook computer and the second electronic device is a tablet computer. In the application scenario of the extended display, content displayed on a display interface of the notebook computer may be extended to a display interface of the tablet computer for display.

First, a pairing connection is established between the notebook computer and the tablet computer.

In some embodiments, before the pairing connection between the notebook computer and the tablet computer is established, the following may be further included, starting an extended display application. For example, a user may apply a first preset operation to the notebook computer, and the notebook computer runs the extended display application in response to the first preset operation. The first preset operation may be a touch operation, or an operation input by the user by using a mouse or a keyboard.

For example, the user may apply a second preset operation in the extended display application of the notebook computer, and the notebook computer sends first request information to the tablet computer in response to the second preset operation. The first request information is used to request the notebook computer to establish a pairing connection to the tablet computer. The tablet computer displays the first request information, and obtains a third preset operation input by the user. The tablet computer establishes a pairing connection to the notebook computer in response to the third operation.

Alternatively, the extended display application in the notebook computer may not be started. After detecting the second preset operation, the notebook computer may determine that extended display needs to be performed, and therefore send the first request information to the tablet computer.

Alternatively, before the extended display application in the notebook computer is started, a pairing connection has been established between the notebook computer and the tablet computer. In this case, after running the extended display application, the notebook computer may not need to send the first request information to the tablet computer.

For example, a pairing connection may be established between the notebook computer and the tablet computer in a wired manner. For example, a pairing connection may be established between the first electronic device and the second electronic device through an HDMI (high definition multimedia interface).

For example, a pairing connection may be established between the notebook computer and the tablet computer in a wireless manner. For example, a pairing connection may be established between the notebook computer and the tablet computer by sharing one AP (access point). Alternatively, a pairing connection may be established between the notebook computer and the tablet computer in a wireless manner such as Wi-Fi Direct or Bluetooth. A specific connection manner of establishing a pairing connection between the notebook computer and the tablet computer is not limited in this embodiment.

In a scenario, a process in which a pairing connection is established between the notebook computer and the tablet computer by sharing one AP may include: The notebook computer and the tablet computer establish Wi-Fi connections to the same AP. The notebook computer obtains address information of each electronic device that establishes a connection to the AP. The notebook computer obtains operation information input by a user, where the operation information may be that the user selects an electronic device to establish a pairing connection to the notebook computer. In response to the operation information, the notebook computer initiates a pairing connection establishment request to the tablet computer based on address information of the tablet computer, where the pairing connection establishment request includes address information of the notebook computer. In response to the pairing connection establishment request, the tablet computer establishes a pairing connection to the notebook computer based on the address information of the notebook computer.

In a scenario, a process in which a pairing connection is established between the notebook computer and the tablet computer through Wi-Fi Direct may include: The notebook computer establishes a Wi-Fi link layer connection to the tablet computer through channel search. The notebook computer establishes a Transmission Control Protocol (TCP) data connection to the tablet computer after the Wi-Fi link layer connection is established. The notebook computer initiates a pairing connection establishment request to the tablet computer through the TCP data connection, where the pairing connection establishment request includes address information of the notebook computer. In response to the pairing connection establishment request, the tablet computer establishes a pairing connection to the notebook computer based on the address information of the notebook computer.

In a scenario, a process in which a pairing connection is established between the notebook computer and the tablet computer through Bluetooth may include: The notebook computer performs broadcasting through Bluetooth. The tablet computer generates a Bluetooth device list based on a received broadcast packet. The tablet computer calculates signal strength of each Bluetooth device in the Bluetooth device list, and sends a Bluetooth pairing connection request to a Bluetooth device with highest signal strength. The notebook computer automatically displays a pairing connection request dialog box, and receives operation information input by a user, where the operation information may be that the user agrees to establish a pairing connection between the notebook computer and the tablet computer. The notebook computer establishes a Bluetooth pairing connection to the tablet computer in response to the operation information.

Then, an angle of the tablet computer relative to the notebook computer is determined by using the angle determining method in embodiments.

In this embodiment, the angle of the tablet computer relative to the notebook computer may be 0° to 360°. For a specific process, refer to related content in FIG. 10 and subsequent Embodiment 1 to Embodiment 7. Details are not described herein again.

When the notebook computer needs to perform extended display on the tablet computer, the angle between the tablet computer and the notebook computer needs to be determined. However, in an extended display process, if a location of the tablet computer and/or a location of the notebook computer are/is changed, the angle between the tablet computer and the notebook computer also needs to be re-determined. For example, if an accelerometer sensor, a gyro sensor, or a magnetometer sensor of the tablet computer detects that the location of the tablet computer is changed, or an accelerometer sensor, a gyro sensor, or a magnetometer sensor of the notebook computer detects that the location of the notebook computer is changed, the notebook computer and the tablet computer re-determine a new angle between the tablet computer and the notebook computer by using the method in FIG. 10.

Finally, the notebook computer sends, based on the angle of the tablet computer relative to the notebook computer and to the display interface of the tablet computer for display, content displayed on the display interface of the notebook computer.

In some embodiments, after the angle between the tablet computer and the notebook computer is obtained, extended display may be directly performed based on the angle. For example, it may be determined, based on the angle and a preset angle range, to perform leftward extension or rightward extension, where the leftward extension corresponds to a preset angle range, and the rightward extension corresponds to another preset angle range. The rightward extension may be: The user drags content such as a document, a web page, or a window rightwards on the display interface of the notebook computer, and sends, for display, the content such as the document, the web page, or the window to the tablet computer located in a right side region of the notebook computer. The leftward extension may be: The user drags content such as a document, a web page, or a window leftwards on the display interface of the notebook computer, and sends, for display, the content such as the document, the web page, or the window to the tablet computer located in a left side region of the notebook computer.

Alternatively, the angle may be converted into a direction of the tablet computer relative to the notebook computer, and extended display is performed based on the direction. In the application scenario of the extended display, the direction of the tablet computer relative to the notebook computer may include: The tablet computer is located in a left side region of the notebook computer, the tablet computer is located in a right side region of the notebook computer, the tablet computer is located in a front side region of the notebook computer, and the tablet computer is located in a rear side region of the notebook computer.

Figure 15:
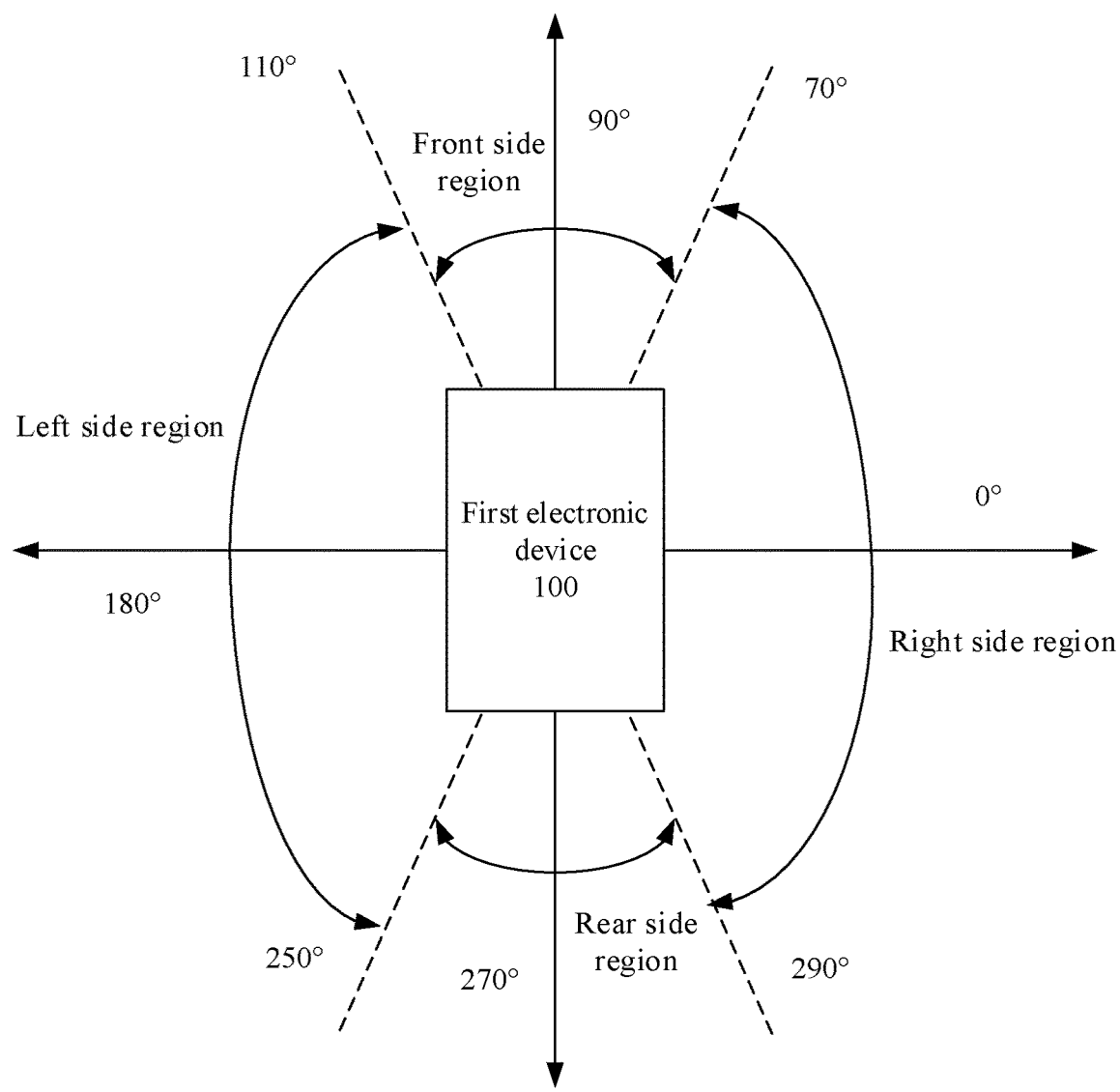
FIG. 15 is a schematic diagram of a relationship between region division and an angle of a first electronic device according to an embodiment.

In some embodiments, a front side region, a rear side region, a left side region, and a right side region of the notebook computer may be obtained through division with reference to content in FIG. 14 and FIG. 15.

In some embodiments, the notebook computer may have a left loudspeaker and a right loudspeaker. The notebook computer transmits a first sound wave signal through the left loudspeaker, and transmits a second sound wave signal through the right loudspeaker. A microphone of the tablet computer receives the first sound wave signal at a moment $T_3$, and receives the second sound wave signal at a moment $T_4$. In this case, the notebook computer may determine boundaries between the left side region, the right side region, the front side region, and the rear side region based on $T_3$, $T_4$, and a threshold $t_2$. For example, curves that meet a condition that $T_3$ is earlier than $T_4$ and $|T_3-T_4|=t_2$ may be used as a boundary between the right side region and the front side region and a boundary between the right side region and the rear side region, and curves that meet a condition that $T_3$ is later than $T_4$ and $|T_3-T_4|=t_2$ may be used as a boundary between the left side region and the front side region and a boundary between the left side region and the rear side region.

It should be noted that, in the application scenario of the extended display, a region around the notebook computer is divided into four regions shown in FIG. 14 and FIG. 15, but this is not limited thereto. In another application scenario, a region around the first electronic device may be divided into three regions or five or more regions according to an actual requirement. For example, a plurality of thresholds may be set, and the region around the first electronic device is divided into five or more regions based on a relationship between $|T_3-T_4|$ and each threshold.

The following uses a direction as an example to describe extension of content displayed on the display interface of the notebook computer to the display interface of the tablet computer for display.

In this embodiment, the user only needs to perform an operation on the notebook computer, to extend, to the display interface of the tablet computer for display, the content displayed on the display interface of the notebook computer.

An example in which the tablet computer is located in a right side region of the notebook computer is used below to describe extending of a window by the notebook computer to the tablet computer for display.

The user drags a window on the display interface of the notebook computer to move rightwards, and the notebook computer moves first target content rightwards in response to the operation of the user. As the user drags the window, the window is moved rightwards on the display interface of the notebook computer. If the window is moved to a first preset location on the display interface of the notebook computer and remains for a first preset time, it indicates that a first content part of the window has been moved out of the display interface of the notebook computer. The tablet computer displays the first content part of the window, and the notebook computer displays a second content part of the first target content, where the first content part and the second content part of the window form the entire window. In this case, the notebook computer and the tablet computer display the window together. If the window is moved to a second preset location on the display interface of the notebook computer and remains for a second preset time, it indicates that the window has been completely moved out of the display interface of the notebook computer. In this case, the tablet computer displays all content of the window, and the notebook computer no longer displays the window.

In a scenario, the notebook computer may further generate first guidance information, where the first guidance information is used to guide the user to drag content such as a document, a web page, or a window leftwards or rightwards. The notebook computer obtains a drag operation performed on the content such as the document, the web page, or the window; and the notebook computer sends, in response to the drag operation, the content such as the document, the web page, or the window to the display interface of the tablet computer for display.

For example, if the relative location information indicates that the tablet computer is located in a left side region of the notebook computer, the notebook computer generates first guidance information. The first guidance information is used to guide the user to drag leftwards content such as the document, the web page, or the window displayed on the display interface of the notebook computer. For example, the first guidance information may be displayed on the display interface of the notebook computer in a text form. For example, the first guidance information may be "Please drag XX leftwards" displayed on the display interface. For example, the first guidance information may be displayed on the display interface of the notebook computer in an animation form. For example, the notebook computer may simulate displaying, on a window, of an animation of dragging the window leftwards by a human hand. For example, the first guidance information may be displayed on the display interface of the notebook computer in a form of a combination of an animation and a text. For example, the notebook computer may simulate displaying, on a window, of an animation and a related text description of dragging the window leftwards by a human hand.

After the first guidance information is displayed on the display interface of the notebook computer, the user may drag rightwards, through a mouse or a touchscreen, the content such as the document, the web page, or the window displayed on the display interface of the notebook computer. The notebook computer sends, in response to the operation of dragging leftwards, the content such as the document, the web page, or the window to the tablet computer. The tablet computer receives the content such as the document, the web page, or the window, and displays the content such as the document, the web page, or the window on the display interface. In this way, the content such as the document, the web page, or the window in the notebook computer is extended, for display, to the display interface of the tablet computer located in the left side region of the notebook computer.

Certainly, in a specific implementation process, the first guidance information may alternatively not be displayed. This is not limited in this embodiment.

In another scenario, in the extended display process, if the notebook computer and/or the tablet computer are/is moved, location information of the tablet computer relative to the notebook computer is changed, and the changed location information indicates that the tablet computer is located in a front side region or a rear side region of the notebook computer, an extension direction may not be changed between the notebook computer and the tablet computer.

The extension direction may include rightward extension and leftward extension. The rightward extension may be: The user drags content such as a document, a web page, or a window rightwards on the display interface of the notebook computer, and extends, for display, the content such as the document, the web page, or the window to the tablet computer located in a right side region of the notebook computer. The leftward extension may be: The user drags content such as a document, a web page, or a window leftwards on the display interface of the notebook computer, and extends, for display, the content such as the document, the web page, or the window to the tablet computer located in a left side region of the notebook computer.

For example, the tablet computer is located in the right side region of the notebook computer. In this case, the notebook computer extends the content such as the document, the web page, or the window rightwards to the tablet computer for display. If the tablet computer and/or the notebook computer are/is moved, so that the tablet computer is located in front-rear side regions of the notebook computer, the extension direction remains rightward extension. In this case, the user may drag the content such as the document, the web page, or the window rightwards on the display interface of the notebook computer, and extends the content such as the document, the web page, or the window to the tablet computer for display.

That the tablet computer and/or the notebook computer are/is moved includes: The tablet computer is moved, the notebook computer is moved, or the tablet computer and the notebook computer are moved together.

In another scenario, if the notebook computer and/or the tablet computer are/is moved, relative location information between the tablet computer and the notebook computer is changed, and the changed relative location information indicates that the tablet computer is located in the left side region of the notebook computer, an extension direction may not be changed between the notebook computer and the tablet computer.

In another scenario, if the notebook computer and/or the tablet computer are/is moved, relative location information between the tablet computer and the notebook computer is changed, and the changed relative location information indicates that the tablet computer is located in the right side region of the notebook computer, an extension direction may not be changed between the notebook computer and the tablet computer.

In a scenario, if an extension direction is changed between the notebook computer and the tablet computer, the notebook computer may generate prompt information indicating that the extension direction has been changed, to prompt the user.

In a scenario, if the notebook computer detects a preset operation, and location information in this case indicates that the tablet computer is located in the front side region or the rear side region of the notebook computer, the notebook computer may send, to the tablet computer when the preset operation is a screen projection operation, content displayed on the display interface. The tablet computer displays the content, and the notebook computer continues to display the content. Alternatively, when the preset operation is a display extension operation, the notebook computer may extend, based on a default extension direction or an extension direction habitually used by the user, the content displayed on the display interface to the display interface of the tablet computer. The default extension direction may be leftward extension or rightward extension, and the extension direction habitually used by the user is leftward extension or rightward extension.

For example, the tablet computer is located in the right side region of the notebook computer. In this case, an extension direction of the notebook computer is rightward extension. If the tablet computer and/or the notebook computer are/is moved, so that the tablet computer is located in the front side region or the rear side region of the notebook computer, the notebook computer may send content displayed on the display interface to the tablet computer, and request the tablet computer to display the content. The tablet computer displays, in response to the request, the content sent by the notebook computer, and the notebook computer continues to display the content, so that the display interface of the tablet computer is the same as the display interface of the notebook computer.

In another scenario, when extended display starts to be performed between the notebook computer and the tablet computer, if the tablet computer is located in the front side region or the rear side region of the notebook computer, the notebook computer does not send the content such as the document, the web page, or the window to the tablet computer.

Specifically, if the user performs an operation of dragging the content such as the document, the web page, or the window in any direction on the display interface of the notebook computer, the notebook computer does not respond to the operation, does not send the content such as the document, the web page, or the window to the tablet computer, and does not extend the content such as the document, the web page, or the window to the tablet computer for display.

In addition, the notebook computer may further generate first prompt information. The first prompt information is used to prompt the user that the tablet computer is located in the front side region or the rear side region of the notebook computer, and the content displayed on the display interface of the notebook computer cannot be extended to the display interface of the tablet computer for display.

In a scenario, there may be a plurality of tablet computers that are distributed on a left side and a right side of the notebook computer. If the user drags the content such as the document, the web page, or the window leftwards in the notebook computer, the notebook computer sends, in response to the drag operation, the content such as the document, the web page, or the window to a tablet computer located on the left side of the notebook computer, for display. If the user drags the content such as the document, the web page, or the window rightwards in the notebook computer, the notebook computer sends, in response to the drag operation, the content such as the document, the web page, or the window to a tablet computer located on the right side of the notebook computer, for display.

2. Application Scenario of Secure Screen Projection

Figure 17:
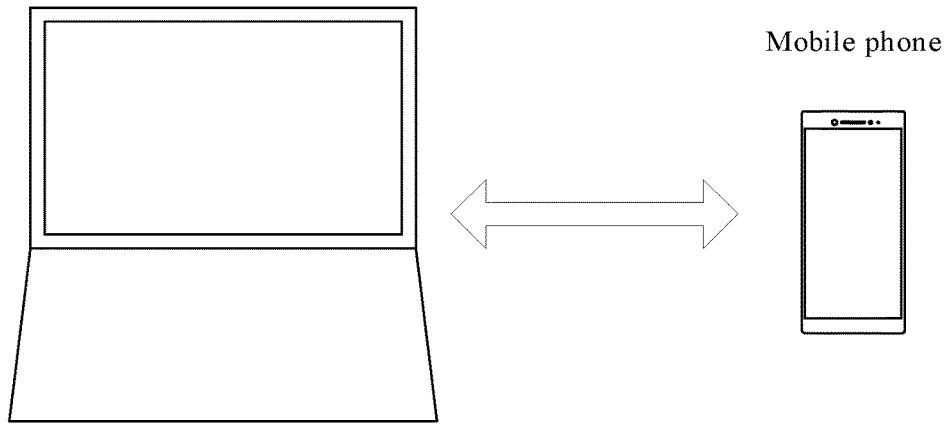
FIG. 17 is a schematic diagram of an application scenario of secure screen projection according to an embodiment.

FIG. 17 is a schematic diagram of an application scenario of secure screen projection according to an embodiment. The following describes the application scenario of the secure screen projection by using an example in which the first electronic device is a notebook computer and the second electronic device is a mobile phone. In the application scenario of the secure screen projection, content displayed on a display interface of the mobile phone may be projected to a display interface of the notebook computer for display, and an operation is performed on the mobile phone through the notebook computer.

First, for establishing a pairing connection between the notebook computer and the mobile phone, refer to related descriptions in the application scenario of the extended display. Details are not described herein again.

Next, an angle of the mobile phone relative to the notebook computer is determined by using the angle determining method in embodiments.

In this embodiment, the angle of the tablet computer relative to the notebook computer may be 0° to 360°. For a specific process of determining the angle of the mobile phone relative to the notebook computer, refer to related content in FIG. 10 and subsequent Embodiment 1 to Embodiment 7. Details are not described herein again.

Finally, when the angle meets a preset location requirement, the mobile phone sends content such as a file, a picture, or the display interface to the display interface of the notebook computer for display, or the notebook computer sends a file, a picture, or content on the display interface to the display interface of the mobile phone for display.

In some embodiments, the preset location requirement may be a preset angle range of the mobile phone relative to the notebook computer. If the angle falls within the preset angle range, and a distance between the mobile phone and the notebook computer is less than a threshold, the mobile phone sends the content such as the file, the picture, or the display interface to the notebook computer. The notebook computer displays the content such as the file, the picture, or the display interface, to project the content such as the file, the picture, or the display interface in the mobile phone to the display interface of the notebook computer for display. Alternatively, the notebook computer sends the content such as the file, the picture, or the display interface to the mobile phone. The mobile phone displays the content such as the file, the picture, or the display interface, to project the content such as the file, the picture, or the display interface in the notebook computer to the display interface of the mobile phone for display.

In some embodiments, the preset location requirement may be that the mobile phone is located in one of a front side region, a rear side region, a left side region, and a right side region of the notebook computer. Correspondingly, the angle may be converted into a direction of the mobile phone relative to the notebook computer with reference to the method in the application scenario of the extended display. In the application scenario of the secure screen projection, the direction of the mobile phone relative to the notebook computer may include: The mobile phone is located in a left side region of the notebook computer, the mobile phone is located in a right side region of the notebook computer, and the mobile phone is located in a front side region or a rear side region of the notebook computer.

For example, if the mobile phone is located in the front side region or the rear side region of the notebook computer, and the distance between the mobile phone and the notebook computer is less than the threshold, the mobile phone sends the content such as the file, the picture, or the display interface to the notebook computer. The notebook computer displays the content such as the file, the picture, or the display interface, to project the content such as the file, the picture, or the display interface in the mobile phone to the display interface of the notebook computer for display. Alternatively, the notebook computer sends the content such as the file, the picture, or the display interface to the mobile phone. The mobile phone displays the content such as the file, the picture, or the display interface, to project the content such as the file, the picture, or the display interface in the notebook computer to the display interface of the mobile phone for display.

In some embodiments, when the mobile phone performs screen projection to the notebook computer, the notebook computer may generate second prompt information. The second prompt information is used to prompt the user of a specific angle range/direction in which the mobile phone is placed in the notebook computer and the distance between the mobile phone and the notebook computer. The user can conveniently project, according to the second prompt information, the content such as the file, the picture, or the display interface in the mobile phone to the display interface of the notebook computer for display.

In some embodiments, when the notebook computer performs screen projection to the mobile phone, the mobile phone may generate the foregoing second prompt information. The user can conveniently project, according to the second prompt information, the content such as the file, the picture, or the display interface in the notebook computer to the display interface of the mobile phone for display.

The following uses a direction as an example to describe a process of projecting the content such as the file, the picture, or the display interface in the computer to the display interface of the notebook computer for display.

For example, a process of projecting a file or a picture in the mobile phone to the display interface of the notebook computer for display may be as follows: If the mobile phone is located in the front side region or the rear side region of the notebook computer, and the distance between the mobile phone and the notebook computer is less than the threshold, the mobile phone sends, to the notebook computer, a file A or a picture B that needs to be projected to the notebook computer for display. After obtaining the file A or the picture B, the notebook computer opens the file A or the picture B, and displays the file A or the picture B on the display interface.

Alternatively, a process of projecting a file or a picture in the mobile phone to the display interface of the notebook computer for display may be as follows: If the mobile phone is located in the left side region of the notebook computer, and the distance between the mobile phone and the notebook computer is less than the threshold, the mobile phone sends, to the notebook computer, a file A or a picture B that needs to be projected to the notebook computer for display. After obtaining the file A or the picture B, the notebook computer opens the file A or the picture B, and displays the file A or the picture B on the display interface.

Alternatively, a process of projecting a file or a picture in the mobile phone to the display interface of the notebook computer for display may be as follows: If the mobile phone is located in the right side region of the notebook computer, and the distance between the mobile phone and the notebook computer is less than the threshold, the mobile phone sends, to the notebook computer, a file A or a picture B that needs to be projected to the notebook computer for display. After obtaining the file A or the picture B, the notebook computer opens the file A or the picture B, and displays the file A or the picture B on the display interface.

For example, a process of projecting the display interface of the mobile phone to the display interface of the notebook computer for display may be as follows: If the mobile phone is located in the front side region or the rear side region of the notebook computer, and the distance between the mobile phone and the notebook computer is less than the threshold, the mobile phone sends content of the display interface of the mobile phone and a length-width ratio of the display interface of the mobile phone to the notebook computer. The notebook computer displays, on the display interface, the content of the display interface of the mobile phone based on the length-width ratio of the display interface of the mobile phone.

The length-width ratio of the display interface of the mobile phone is usually different from a length-width ratio of the display interface of the notebook computer. Therefore, to display the display interface of the mobile phone on the display interface of the notebook computer, the notebook computer needs to determine a display region based on the length-width ratio of the display interface of the mobile phone. A length-width ratio of the display region is equal to the length-width ratio of the display interface of the mobile phone, and the display region should be as large as possible. For example, a length of the display region is the same as a width of the display interface of the notebook computer. After determining the display region, the notebook computer displays the content of the display interface of the mobile phone in the display region.

After the content of the display interface of the mobile phone is changed, the mobile phone sends, to the notebook computer, new content displayed on the interface of the mobile phone. The notebook computer displays, in the display region, new content displayed on the interface of the mobile phone.

In some embodiments, the content such as the file, the picture, or the display interface may have a privacy requirement, or may not have a privacy requirement. For the content such as the file, the picture, or the display interface that has a privacy requirement, privacy leakage needs to be prevented or reduced.

For example, for the content such as the file, the picture, or the display interface that has a privacy requirement, if the angle meets the preset location requirement and the distance between the mobile phone and the notebook computer is less than the threshold, the mobile phone may project, to the display interface of the notebook computer for display, the content such as the file, the picture, or the display interface that has a privacy requirement, or the notebook computer projects, to the display interface of the mobile phone for display, the content such as the file, the picture, or the display interface that has a privacy requirement. If the distance between the mobile phone and the notebook computer is greater than or equal to the threshold, the mobile phone stops sending, to the notebook computer, the content such as the file, the picture, or the display interface that has a privacy requirement, or the notebook computer stops sending, to the mobile phone, the content such as the file, the picture, or the display interface that has a privacy requirement.

For another example, for content such as a file, a picture, or a display interface that does not have a privacy requirement, the distance between the mobile phone and the notebook computer may not be required to be less than the threshold. For example, if the angle meets the preset location requirement, regardless of whether the distance between the mobile phone and the notebook computer is less than the threshold, the mobile phone may project, to the display interface of the notebook computer for display, the content such as the file, the picture, or the display interface that does not have a privacy requirement, or the notebook computer may project, to the display interface of the mobile phone for display, the content such as the file, the picture, or the display interface that does not have a privacy requirement.

In some embodiments, when screen projection has been established between the mobile phone and the notebook computer, if the angle of the mobile phone relative to the notebook computer is changed, so that the changed angle does not meet the preset location requirement, and/or the distance between the mobile phone and the notebook computer is greater than the threshold, the notebook computer stops displaying the content such as the file, the picture, or the display interface that is sent by the mobile phone and that has a privacy requirement, and ends the screen projection established between the mobile phone and the notebook computer.

For example, the notebook computer may generate a screen projection ending control, and the user performs a touch operation on the control. The notebook computer stops, in response to the touch operation, displaying the content such as the file, the picture, or the display interface that is sent by the mobile phone and that has a privacy requirement, and ends the screen projection established between the mobile phone and the notebook computer.

For example, the mobile phone may generate a screen projection ending control, and the user performs a touch operation on the control. The mobile phone sends a screen projection end request to the notebook computer in response to the touch operation. The notebook computer stops, in response to the screen projection end request, displaying the content such as the file, the picture, or the display interface that is sent by the mobile phone and that has a privacy requirement, and ends the screen projection established between the mobile phone and the notebook computer.

In a scenario, after the screen projection established between the mobile phone and the notebook computer is ended, the mobile phone may generate a screen projection continuing control. After the user performs a touch operation on the control, the mobile phone sends a screen projection continuing instruction to the notebook computer in response to the touch operation. The notebook computer continues, in response to the screen projection continuing instruction, displaying the content such as the file, the picture, or the display interface that is sent by the mobile phone and that has a privacy requirement.

In some embodiments, when screen projection has been established between the mobile phone and the notebook computer, if the angle of the mobile phone relative to the notebook computer is changed, so that the changed angle does not meet the preset location requirement, and/or the distance between the mobile phone and the notebook computer is greater than the threshold, the notebook computer may continue displaying the content such as the file, the picture, or the display interface that is sent by the mobile phone and that does not have a privacy requirement, and may not end the screen projection established between the mobile phone and the notebook computer.

It may be determined, by using a ranging algorithm, whether the distance between the mobile phone and the notebook computer is less than the threshold.

In an embodiment, a ranging algorithm for determining the distance between the mobile phone and the notebook computer may be as follows: The mobile phone transmits a sound wave signal to the notebook computer, and receives a sound wave signal reflected back by the notebook computer. The mobile phone determines the distance between the mobile phone and the notebook computer based on a propagation time and a propagation speed of the sound wave signal.

For example, the mobile phone transmits a sound wave signal at a first moment through a loudspeaker, the sound wave signal is reflected back to the mobile phone after being blocked by the notebook computer, and the mobile phone receives the reflected sound wave signal at a second moment through a microphone. A distance for transmitting a sound wave signal from the mobile phone to the notebook computer is the same as a distance for reflecting a sound wave signal from the notebook computer back to the mobile phone. Therefore, it can be learned that the distance between the mobile phone and the notebook computer is half of a product of a difference between the second moment and the first moment and the propagation speed of the sound wave signal.

In an embodiment, the ranging algorithm for determining the distance between the mobile phone and the notebook computer may be as follows: The notebook computer transmits a sound wave signal to the mobile phone, and the mobile phone determines the distance between the mobile phone and the notebook computer based on a propagation time and a propagation speed of the sound wave signal; or the mobile phone transmits a sound wave signal to the notebook computer, and the notebook computer determines the distance between the mobile phone and the notebook computer based on a propagation time and a propagation speed of the sound wave signal.

For example, the notebook computer transmits a sound wave signal through the loudspeaker at a third moment, where the sound wave signal carries information about the first moment. The mobile phone receives the sound wave signal at a fourth moment through the microphone, parses a time (that is, the third moment) at which the notebook computer transmits the sound wave signal, and then determines, based on a time (that is, the fourth moment) at which the sound wave signal is received, that the distance between the mobile phone and the notebook computer is a product of a difference between the fourth moment and the third moment and a propagation speed of the sound wave signal.

3. Application Scenario of a Stereo

Figure 18:
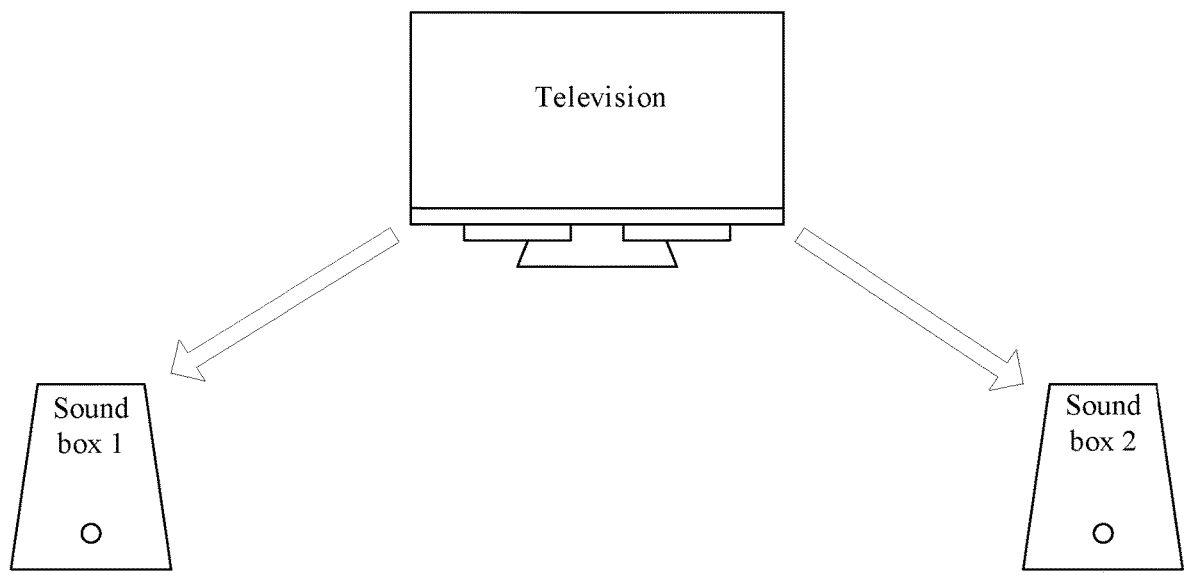
FIG. 18 is a schematic diagram of an application scenario of a stereo according to an embodiment.

FIG. 18 is a schematic diagram of an application scenario of a stereo according to an embodiment. The following describes the application scenario of the stereo by using an example in which the first electronic device is a television and the second electronic device is two sound boxes (a sound box 1 and a sound box 2). In the application scenario of the stereo, the television determines a correspondence between each of the sound box 1 and the sound box 2 and each of left channel audio information and right channel audio information based on an angle of the sound box 1 relative to the television and an angle of the sound box 2 relative to the television, and then transmits audio information to the sound box 1 and the sound box 2 to implement stereo playing, without requiring a manual operation to select sound channels of the two sound boxes.

First, for establishing a pairing connection between the television and each of the sound box 1 and the sound box 2, refer to related descriptions in the application scenario of the extended display. Details are not described herein again.

Then, an angle between the television and each of the sound box 1 and the sound box 2 is determined by using the angle determining method in embodiments.

In this embodiment, the angle of each of the sound box 1 and the sound box 2 relative to the television may be 0° to 360°. For a specific process of determining the angle between the television and each of the sound box 1 and the sound box 2, refer to related content in FIG. 10 and subsequent Embodiment 1 to Embodiment 7. Details are not described herein again.

When the television needs to determine that the two sound boxes play the left channel audio information and the right channel audio information, location information of each of the two sound boxes relative to the television needs to be determined. In an audio playing process, if locations of the sound boxes and/or a location of the television are/is changed, the angle of each of the two sound boxes relative to the television also needs to be determined again.

For example, if an accelerometer sensor, a gyro sensor, or a magnetometer sensor of a first sound box (for example, any one of the sound box 1 and the sound box 2) detects that a location of the first sound box is changed, or an accelerometer sensor, a gyro sensor, or a magnetometer sensor of the television detects that the location of the television is changed, the television and the first sound box re-determine an angle of the first sound box relative to the television by using the method in FIG. 10. It should be noted that, if the first sound box is the sound box 1 or the sound box 2, it is only required to re-determine the angle, relative to the television, of the sound box 1 or the sound box 2 whose location is changed, or re-determine the angle of each of the two sound boxes relative to the television.

Finally, the television sends audio information to the sound box 1 and the sound box 2 based on the angle, to implement stereo playing through the sound box 1 and the sound box 2.

In some embodiments, the television may determine relative location information between the sound box 1 and the sound box 2 based on the angle of each of the sound box 1 and the sound box 2 relative to the television. Then, based on the relative location information, the television sends the left channel audio information to a sound box located on a left side, and sends the right channel audio information to a sound box located on a right side.

For example, if the angle of the sound box 1 relative to the television is 60° and the angle of the sound box 2 relative to the television is 210°, the television may determine that the sound box 1 is located on a right side of the sound box 2 and the sound box 2 is located on a left side of the sound box 1. In this case, the television may send the left channel audio information to the sound box 2 located on the left side, and send the right channel audio information to the sound box 1 located on the right side.

In some embodiments, the television may determine a direction of the sound box 1 relative to the television based on the angle of the sound box 1 relative to the television, and determine a direction of the sound box 2 relative to the television based on the angle of the sound box 2 relative to the television. Then, the television sends audio information to the sound box 1 and the sound box 2 based on the direction of each of the sound box 1 and the sound box 2 relative to the television.

For example, if the angle of the sound box 1 relative to the television is 60° and the angle of the sound box 2 relative to the television is 210°, the television may determine that the sound box 1 is located on a right side of the television and the sound box 2 is located on a left side of the television. In this case, the television may send the left channel audio information to the sound box 2 located on the left side of the television, and send the right channel audio information to the sound box 1 located on the right side of the television.

For how to convert the angle of each of the sound box 1 and the sound box 2 relative to the television into the direction of each of the sound box 1 and the sound box 2 relative to the television, refer to related descriptions in the application scenario of the extended display. Details are not described herein again.

In some embodiments, if the sound box 1 is located in a left side region of the television, and the sound box 2 is located in a right side region, a front side region, or a rear side region of the television, the television determines that the sound box 1 is located on the left side of the sound box 2, and the television sends the left channel audio information to the sound box 1 and sends the right channel audio information to the sound box 2. If the sound box 1 is located in a right side region of the television, and the sound box 2 is located in a left side region, a front side region, or a rear side region of the television, the television determines that the sound box 1 is located on the right side of the sound box 2, and the television sends the right channel audio information to the sound box 1 and sends the left channel audio information to the sound box 2.

In some embodiments, if both the sound box 1 and the sound box 2 are located in a region on a same side of the television, the television may determine a direction between the two sound boxes based on angle information of the two sound boxes relative to the television. A specific process may be as follows: After the angle of each of the two sound boxes relative to the television is obtained, the direction between the two sound boxes may be determined based on a magnitude relationship between the two angles with reference to content in FIG. 15.

For example, if both the sound box 1 and the sound box 2 are located in the left side region of the television, the angle of the sound box 1 relative to the television is a1, and the angle of the sound box 2 relative to the television is α2, the television may determine the relative location information between the sound box 1 and the sound box 2 based on a first absolute value of a difference between α1 and 180° and a second absolute value of a difference between α2 and 180°. For example, if the first absolute value is greater than the second absolute value, the television can determine that the sound box 1 is located on the right side of the sound box 2. Then, the television sends the right channel audio information to the sound box 1, and sends the left channel audio information to the sound box 2. For another example, if the first absolute value is less than the second absolute value, the television can determine that the sound box 1 is located on the left side of the sound box 2. Then, the television sends the right channel audio information to the sound box 2, and sends the left channel audio information to the sound box 1.

4. Application Scenario of Directional Sound Playing

Figure 19:
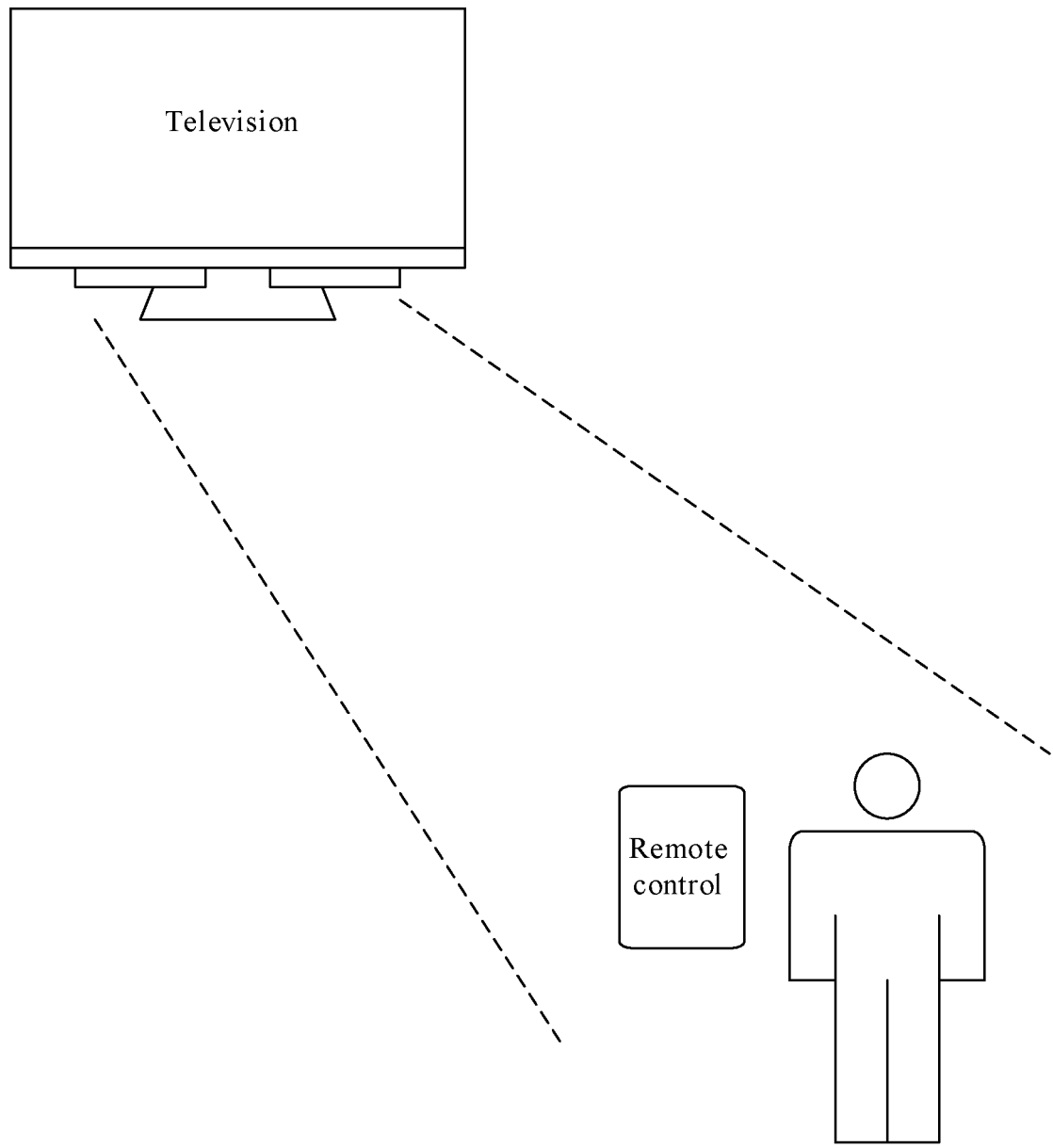
FIG. 19 is a schematic diagram of an application scenario of directional sound playing according to an embodiment.

FIG. 19 is a schematic diagram of an application scenario of directional sound playing according to an embodiment. The following describes the application scenario of directional sound playing by using an example in which the first electronic device is a television and the second electronic device is a remote control. In the application scenario of the stereo, the television plays a sound in a direction corresponding to a location of the remote control based on a relative angle between the television and the remote control.

First, for establishing a pairing connection between the television and the remote control, refer to related descriptions in the application scenario of the extended display. Details are not described herein again.

Then, an angle of the remote control relative to the television is determined by using the angle determining method in embodiments.

In this embodiment, the angle of the remote control relative to the television may be 0° to 360°. For a specific process of determining the angle of the remote control relative to the television, refer to related content in FIG. 10 and subsequent Embodiment 1 to Embodiment 7. Details are not described herein again.

When the scenario of directional sound playing starts, a relative angle between the television and the remote control needs to be determined. In a directional sound playing process, if a location of the remote control changes, the angle of the remote control relative to the television also needs to be determined again. For example, a sensor of the remote control detects that the location of the remote control is changed, and the television re-determines an angle of the remote control relative to the television.

Finally, based on the angle, the television plays a sound in a direction in which the remote control is located.

In some embodiments, the television may have an audio play unit that can adjust an audio play direction. For example, the audio play unit may include a directional loudspeaker and a rotating mechanism, and the rotating mechanism can drive the directional loudspeaker to rotate. A processor of the television may determine a direction of the remote control based on the angle, and then control the rotating mechanism to drive the directional loudspeaker to rotate, so that the directional loudspeaker plays a sound in the direction of the remote control.

The directional loudspeaker can focus sound by using a parabolic reflector by using a method similar to light concentration of a flashlight, to generate a directional audible sound. Alternatively, the directional loudspeaker may use nonlinear interaction of ultrasonic waves in the air to produce a highly directional audible sound.

It may be understood that, in a process in which the user watches the television, the user usually places the remote control nearby to facilitate watching of the television. In this case, the relative angle between the television and the remote control is an angle of the user relative to the television. Therefore, the television may implement, based on the angle of the remote control relative to the television, directional playing of a sound in a direction in which the user is located. Because the television plays a sound in a directional manner in the direction in which the user is located, and almost does not play the sound in a direction other than the direction in which the user is located, the sound in the direction other than the direction in which the user is located is relatively small.

The following uses an ultrasound signal as an example. The following describes in detail a method for determining an angle between electronic devices provided in an embodiment.

Embodiment 1

Figure 20:
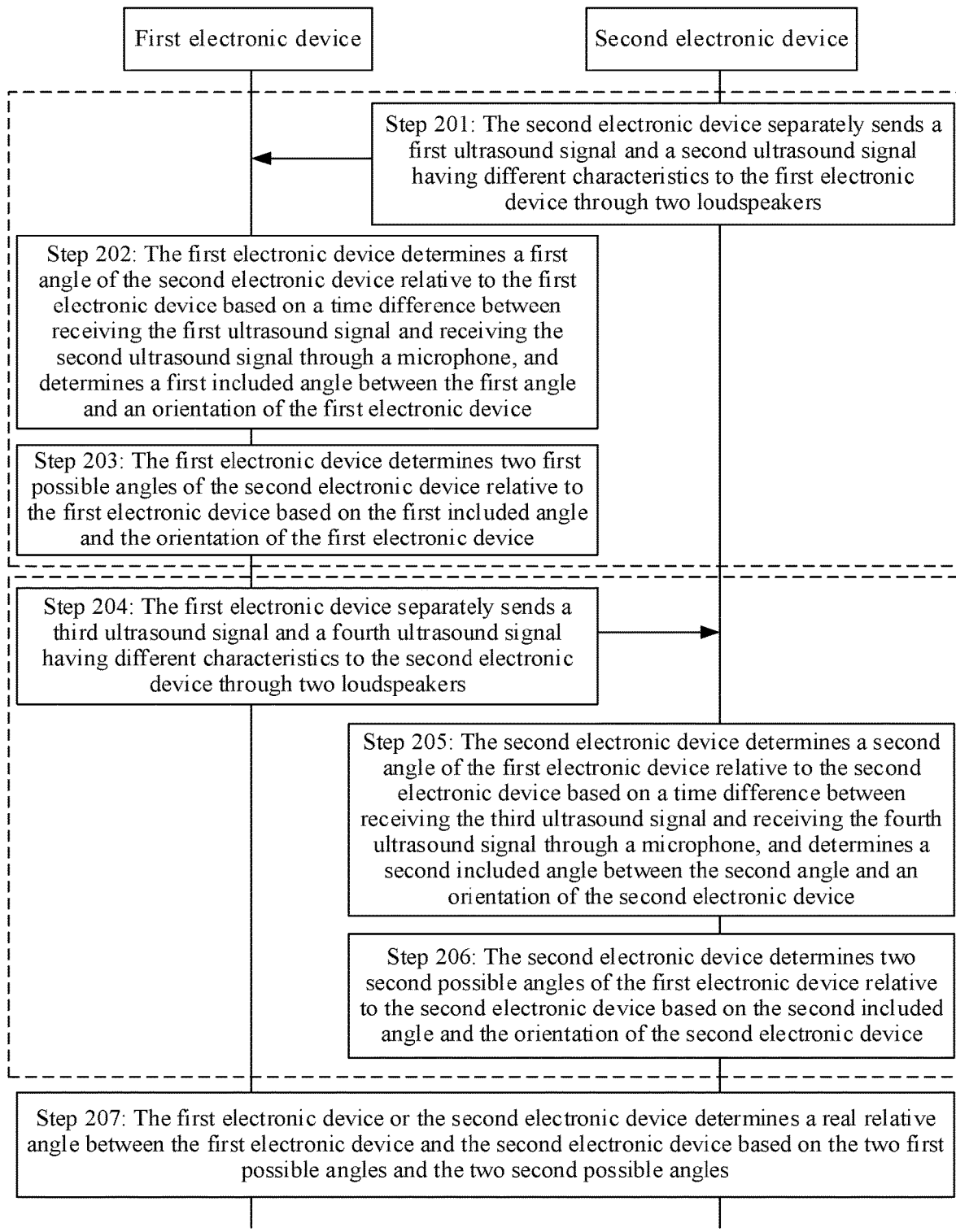
FIG. 20 is a schematic flowchart of determining an angle between electronic devices according to an embodiment.

FIG. 20 is a schematic flowchart of determining an angle between electronic devices according to an embodiment. Referring to FIG. 20, the foregoing process of determining an angle between electronic devices may include steps 201 to 207. A first electronic device has at least two loudspeakers and at least one microphone, and a second electronic device has at least two loudspeakers and at least one microphone.

Step 201: The second electronic device separately sends a first ultrasound signal and a second ultrasound signal having different characteristics to the first electronic device through two loudspeakers.

The first ultrasound signal and the second ultrasound signal may be two ultrasound signals with different characteristics. For example, the first ultrasound signal and the second ultrasound signal are ultrasound signals having different frequency bands, or are ultrasound signals having different orthogonal sequences. Alternatively, the second electronic device may send the first ultrasound signal and the second ultrasound signal through the two loudspeakers at different moments. Alternatively, the first ultrasound signal and the second ultrasound signal may be two ultrasound signals having different characteristics, and the second electronic device may send the first ultrasound signal and the second ultrasound signal through the two loudspeakers at different moments.

In a scenario, the second electronic device generates one baseband sequence s having a bandwidth of B. The second electronic device performs up-conversion on the baseband sequence s to obtain a first ultrasound signal $x_1(t)$ and a second ultrasound signal $x_2(t)$. A frequency range of the first ultrasound signal $x_1$ is $[f_1,f_2]$, a frequency range of the second ultrasound signal $x_2$ is $[f_3,f_4]$, and there is no overlapping portion between the frequency range $[f_1,f_2]$ and the frequency range $[f_3,f_4]$. A scenario of step 201 is shown in FIG. 21A. The second electronic device sends the first ultrasound signal $x_1(t)$ and the second ultrasound signal $x_2(t)$ to the first electronic device through the two loudspeakers.

A process in which the second electronic device performs up-conversion on the baseband sequence s may be: modulating the baseband sequence s on a low-frequency carrier, mixing the baseband sequence with a high-frequency signal, and then obtaining two upper sideband signals obtained after the mixing, to obtain the first ultrasound signal $x_1$ (t) and the second ultrasound signal $x_2(t)$.

In another scenario, the second electronic device may generate two baseband sequences, and separately perform up-conversion on the two baseband sequences to obtain a first ultrasound signal $x_1(t)$ having a frequency range of $[f_1,f_2]$ and a second ultrasound signal $x_2(t)$ having a frequency range of $[f_3,f_4]$, where there is no overlapping portion between the frequency range $[f_1,f_2]$ and the frequency range $[f_3,f_4]$.

In this embodiment, the two loudspeakers are a first loudspeaker and a second loudspeaker. For example, the first loudspeaker may be a left-channel loudspeaker of the second electronic device, and the second loudspeaker may be a right-channel loudspeaker of the second electronic device. For example, after the first ultrasound signal $x_1(t)$ and the second ultrasound signal $x_2(t)$ are obtained, the second electronic device sends the first ultrasound signal $x_1(t)$ to the first electronic device through the left-channel loudspeaker, and sends the second ultrasound signal $x_2(t)$ to the first electronic device through the right-channel loudspeaker at the same time.

For the first ultrasound signal and the second ultrasound signal having different orthogonal sequences, the second electronic device may generate an ultrasound signal, and send the ultrasound signal to the first electronic device through the first loudspeaker. After the first loudspeaker completes sending the ultrasound signal to the first electronic device, the second electronic device sends the ultrasound signal to the first electronic device through the second loudspeaker.

Step 202: The first electronic device determines a first angle of the second electronic device relative to the first electronic device based on a time difference between receiving the first ultrasound signal and receiving the second ultrasound signal through the microphone, and determines a first included angle between the first angle and an orientation of the first electronic device.

For a process of determining the first included angle, refer to Embodiment 2. Details are not described herein again.

Step 203: The first electronic device determines two first possible angles of the second electronic device relative to the first electronic device based on the first included angle and the orientation of the first electronic device.

The orientation $\theta_1$ of the first electronic device may be measured by using a magnetometer in the first electronic device.

Because two locations of the second electronic device may be determined based on the first angle, the first included angle $\theta_{10}$ determined based on the first angle includes two cases: $\theta_{10}$ corresponding to $\theta_{11}$ and $\theta_1$, and $\theta_{10}$ corresponding to $\theta_{12}$ and $\theta_1$ that are shown in FIG. 10. Because an angle $\theta_1$ corresponding to the orientation of the first electronic device is an angle in a terrestrial coordinate system, the first included angle $\theta_{10}$ may be converted into an angle in the terrestrial coordinate system by using the angle $\theta_1$ corresponding to the orientation of the first electronic device. The first included angle $\theta_{10}$ may be converted into the angle in the terrestrial coordinate system by using $\theta_{11}=\theta_1+\theta_{10}$ and $\theta_{12}=\theta_1-\theta_{10}$, to obtain two first possible angles $\theta_{11}$ and $\theta_{12}$ of the second electronic device relative to the first electronic device.

Step 204: The first electronic device separately sends a third ultrasound signal and a fourth ultrasound signal having different characteristics to the second electronic device through two loudspeakers.

A scenario of step 204 is shown in FIG. 21B. For a specific process, refer to step 201. Details are not described herein again.

It should be noted that the first electronic device and the second electronic device may send ultrasound signals simultaneously, or may not send ultrasound signals simultaneously. This is not limited in this embodiment.

In addition, the first ultrasound signal and the second ultrasound signal may be ultrasound signals having different frequency bands, and the third ultrasound signal and the fourth ultrasound signal may be ultrasound signals having different frequency bands. Alternatively, the first ultrasound signal and the second ultrasound signal may be ultrasound signals having different frequency bands, and the third ultrasound signal and the fourth ultrasound signal may be ultrasound signals having different orthogonal sequences. Alternatively, the first ultrasound signal and the second ultrasound signal may be ultrasound signals having different orthogonal sequences, and the third ultrasound signal and the fourth ultrasound signal may be ultrasound signals having different frequency bands.

Step 205: The second electronic device determines a second angle of the first electronic device relative to the second electronic device based on a time difference between receiving the third ultrasound signal and receiving the fourth ultrasound signal through a microphone, and determines a second included angle between the second angle and an orientation of the second electronic device.

For a specific process of determining the second included angle $\theta_{20}$, refer to step 202. Details are not described herein again.

Step 206: The second electronic device determines two second possible angles of the first electronic device relative to the second electronic device based on the second included angle and the orientation of the second electronic device.

For a specific process of determining the two second possible angles $\theta_{21}$ and $\theta_{22}$, refer to step 203. Details are not described herein again.

Step 207: The first electronic device or the second electronic device determines a real relative angle between the first electronic device and the second electronic device based on the two first possible angles and the two second possible angles.

For a detailed process of determining the real relative angle between the first electronic device and the second electronic device, refer to related content in FIG. 10. Details are not described herein again.

Embodiment 2

In this embodiment, a first electronic device and a second electronic device are used as examples to describe a process of determining a first included angle by the first electronic device.

First, a process of determining a first angle is described by using an example.

In some embodiments, the first angle may be determined through two loudspeakers of the second electronic device and one microphone of the first electronic device.

After the first electronic device receives ultrasound signals sent through the two loudspeakers of the second electronic device, the ultrasound signals are filtered by using a first filter and a second filter to obtain a first ultrasound signal and a second ultrasound signal. A filtering bandwidth of the first filter is the same as a frequency range of the first ultrasound signal, and a filtering bandwidth of the second filter is the same as a frequency range of the second ultrasound signal.

It should be noted that, in a channel transmission process, the first ultrasound signal $x_1(t)$ and the second ultrasound signal $x_2(t)$ are affected by channel information, a delay, or the like. Therefore, after the first electronic device receives the two ultrasound signals, the first ultrasound signal $x_1(t)$ is converted into a first ultrasound signal $y_1(t)$, and the second ultrasound signal $x_2(t)$ is converted into a second ultrasound signal $y_2(t)$. A frequency range of the first ultrasound signal $y_1(t)$ is the same as the frequency range of the first ultrasound signal $x_1(t)$, and is $[f_1, f_2]$. The frequency range of the first ultrasound signal $y_1(t)$ is the same as the frequency range of the second ultrasound signal $x_2(t)$, and is $[f_3, f_4]$.

The first electronic device converts the filtered first ultrasound signal and the filtered second ultrasound signal into a same frequency range. For example, the first electronic device may perform frequency conversion processing on the first ultrasound signal $y_1(t)$, so that the first ultrasound signal $y_1(t)$ and the second ultrasound signal $y_2(t)$ are converted into a same frequency range. Alternatively, the first electronic device may perform frequency conversion processing on the second ultrasound signal $y_2(t)$, so that the first ultrasound signal $y_1(t)$ and the second ultrasound signal $y_2(t)$ are converted into a same frequency range. Alternatively, the first electronic device may perform frequency conversion processing on both the first ultrasound signal $y_1(t)$ and the second ultrasound signal $y_2(t)$, so that the first ultrasound signal $y_1(t)$ and the second ultrasound signal $y_2(t)$ are converted into a same frequency range.

The first electronic device performs related calculation on the first ultrasound signal and the second ultrasound signal that are converted into a same frequency range, and determines a time difference between arrival of the first ultrasound signal and arrival of the second ultrasound signal at the microphone of the first electronic device.

For example, the time difference between the arrival of the first ultrasound signal and the arrival of the second ultrasound signal at the microphone of the first electronic device may be represented as a difference between a quantity of sampling points of the microphone of the first electronic device for the first ultrasound signal and a quantity of sampling points of the microphone of the first electronic device for the second ultrasound signal. After the ultrasound signals arrive at the microphone, the microphone samples the ultrasound signals at a fixed sampling frequency $f_s$. For example, the sampling frequency $f_s$ is 48 kHz. Therefore, within a time t, a quantity of sampling points collected by the microphone is $t*f_s$.

For example, if the first ultrasound signal first arrives at the microphone and then the second ultrasound signal arrives at the microphone, a quantity of sampling points of the microphone for the first ultrasound signal is greater than a quantity of sampling points of the microphone for the first ultrasound signal. The difference between the two quantities of sampling points is a product of the sampling frequency and the time difference: $\Delta t \cdot f_s$, and $\Delta t$ is the time difference.

In a scenario, the first electronic device converts the frequency range of the second ultrasound signal into the frequency range of the first ultrasound signal, and the first electronic device performs related calculation on the first ultrasound signal $y_1(t)$ and the second ultrasound signal $y_2(t)$.

When the first sound wave signal first arrives at the microphone and then the second sound wave signal arrives at the microphone, a formula for related calculation may be:

$$z(\tau) = \sum_t y_1(t) y_2'(t-\tau),$$

where $y_1(t)$ indicates a value of the first ultrasound signal $y_1(t)$ at a sampling moment t, and $y_2(t-\tau)$ indicates a value of the second ultrasound signal $y_2(t)$ at a sampling moment $t-\tau$. When a peak value of $y_1(t)$ coincides with a peak value of $y_2(t-\tau)$, a peak value of $z(\tau)$ and a quantity $\tau^*$ of sampling points corresponding to a time difference between the arrival of the first ultrasound signal and the arrival of the second ultrasound signal at the microphone of the first electronic device may be obtained.

When the second ultrasound signal first arrives at the microphone and then the first ultrasound signal arrives at the microphone, a formula for related calculation may be:

$$z(\tau) = \sum_t y_1(t-\tau) y_2'(t),$$

where $y_1(t-\tau)$ indicates a value of the first ultrasound signal $y_1(t)$ at a sampling moment $t-\tau$, and $y_2(t)$ indicates a value of the second ultrasound signal $y_2(t)$ at a sampling moment t. When a peak value of $y_1(t-\tau)$ coincides with a peak value of $y_2(t)$, a peak value of $z(\tau)$ and a quantity $\tau^*$ of sampling points corresponding to a time difference between the arrival of the first ultrasound signal and the arrival of the second ultrasound signal at the microphone of the first electronic device may be obtained.

The first electronic device determines the first angle based on the time difference (namely, a difference between quantities of sampling points), a first spacing, and the sampling frequency of the microphone. The first spacing is a spacing between the two loudspeakers of the second electronic device.

Referring to related content of the application scenario of the stereo in FIG. 2 and FIG. 3, when the reference angles are 90°, 0°, and −90°, the first angle may be approximately $$\theta \approx \frac{\tau^* v}{D' f_s} \cdot 90°;$$

and when the reference angles are 0°, 90°, and 180°, the first angle may be approximately $$\theta \approx \left(1 - \frac{\tau^* v}{D' f_s}\right) \cdot 90°.$$

In some embodiments, the first angle may alternatively be determined through two microphones of the second electronic device and one loudspeaker of the first electronic device. For a specific process, refer to the related technology 1. Details are not described herein again.

The following describes a process of determining the first included angle by using the first electronic device as an example.

Referring to FIG. 22, in a scenario, when the reference angles are 90°, 0°, and −90°, the orientation of the first electronic device is consistent with −90° in the reference angles. If the first angle is 60°, it can be learned from a definition of the first included angle in related content in FIG. 10 that the first included angle $\theta_{10}$ is an included angle between a line corresponding to the first angle 60° and a line corresponding to the reference angle −90°, in other words, $\theta_{10}=|60°-(-90°)|=150°$.

In another scenario, when the reference angles are 90°, 0°, and −90°, the orientation of the first electronic device is consistent with 90° in the reference angles. If the first angle is 60°, it can be learned from a definition of the first included angle in related content in FIG. 10 that the first included angle $\theta_{10}$ is an included angle between a line corresponding to the first angle 60° and a line corresponding to the reference angle 90°, in other words, $\theta_{10}=|60°-90°|=30°$.

Referring to FIG. 23, in a scenario, when the reference angles are 0°, 90°, and 180°, the orientation of the first electronic device is consistent with 180° in the reference angles. If the first angle is 60°, it can be learned from a definition of the first included angle in related content in FIG. 10 that the first included angle $\theta_{10}$ is an included angle between a line corresponding to the first angle 60° and a line corresponding to the reference angle 180°, in other words, $\theta_{10}=|60°-180°|=120°$.

In another scenario, when the reference angles are 0°, 90°, and 180°, the orientation of the first electronic device is consistent with 0° in the reference angles. If the first angle is 60°, it can be learned from a definition of the first included angle in related content in FIG. 10 that the first included angle $\theta_{10}$ is an included angle between a line corresponding to the first angle 60° and a line corresponding to the reference angle 0°, in other words, $\theta_{10}=|60°-0°|=60°$.

It should be noted that, for a second angle of the first electronic device relative to the second electronic device and a second included angle between the second angle and an orientation of the second electronic device, refer to the foregoing process of determining the first included angle, to determine the second angle and the second included angle. Details are not described herein again.

Embodiment 3

Different from Embodiment 1, in this embodiment, a first electronic device may have at least one loudspeaker and at least two microphones, and a second electronic device may have at least one loudspeaker and at least two microphones. The following describes this embodiment by using an example in which the first electronic device has one loudspeaker and two microphones, and the second electronic device has one loudspeaker and two microphones.

Referring to FIG. 24A, the loudspeaker of the second electronic device transmits an ultrasound signal, and the two microphones of the first electronic device receive the ultrasound signal. The first electronic device determines two first possible angles of the second electronic device relative to the first electronic device based on a time difference between receiving the ultrasound signal through the two microphones.

Referring to FIG. 24B, the loudspeaker of the first electronic device transmits an ultrasound signal, and the two microphones of the second electronic device receive the ultrasound signal. The second electronic device determines two second possible angles of the first electronic device relative to the second electronic device based on a time difference between receiving the ultrasound signal through the two microphones.

The first electronic device or the second electronic device determines a real relative angle between the first electronic device and the second electronic device based on the two first possible angles and the two second possible angles.

Embodiment 4

Different from Embodiment 1, in this embodiment, a first electronic device may have at least two loudspeakers and at least two microphones, and a second electronic device may have at least one loudspeaker and at least one microphone. The following describes this embodiment by using an example in which the first electronic device has two loudspeakers and two microphones, and the second electronic device has one loudspeaker and one microphone.

Figure 25A:
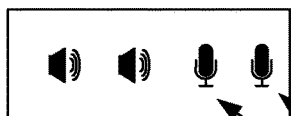
FIG. 25A and FIG. 25B are schematic diagrams of scenarios of determining an angle between electronic devices according to an embodiment.
Figure 25A:
Figure 25A:
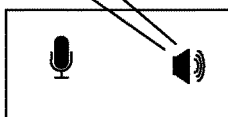

Referring to FIG. 25A, the loudspeaker of the second electronic device transmits an ultrasound signal, and the two microphones of the first electronic device receive the ultrasound signal. The first electronic device determines two first possible angles of the second electronic device relative to the first electronic device based on a time difference between receiving the ultrasound signal through the two microphones.

Figure 25B:

Referring to FIG. 25B, the two loudspeakers of the first electronic device transmit two ultrasound signals, and the microphone of the second electronic device receives the ultrasound signals. The second electronic device determines two second possible angles of the first electronic device relative to the second electronic device based on a time difference between receiving the two ultrasound signals through the microphone.

The first electronic device or the second electronic device determines a real relative angle between the first electronic device and the second electronic device based on the two first possible angles and the two second possible angles.

Embodiment 5

Different from Embodiment 4, in this embodiment, a first electronic device may have at least one loudspeaker and at least one microphone, and a second electronic device may have at least two loudspeakers and at least two microphones. The following describes this embodiment by using an example in which the first electronic device has one loudspeaker and one microphone, and the second electronic device has two loudspeakers and two microphones.

Figure 26A:
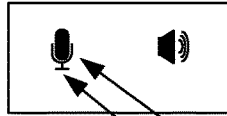
FIG. 26A and FIG. 26B are schematic diagrams of scenarios of determining an angle between electronic devices according to an embodiment.
Figure 26A:
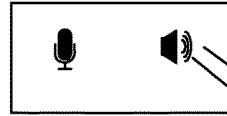
Figure 26A:
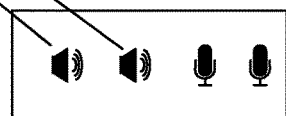

Referring to FIG. 26A, the two loudspeakers of the second electronic device transmit two ultrasound signals, and the microphone of the first electronic device receives the ultrasound signals. The first electronic device determines two first possible angles of the second electronic device relative to the first electronic device based on a time difference between receiving the two ultrasound signals through the microphone.

Figure 26B:
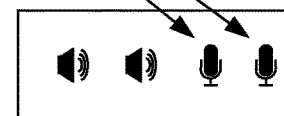

Referring to FIG. 26B, the loudspeaker of the first electronic device transmits an ultrasound signal, and the two microphones of the second electronic device receive the ultrasound signal. The second electronic device determines two second possible angles of the first electronic device relative to the second electronic device based on a time difference between receiving the ultrasound signal through the two microphones.

The first electronic device or the second electronic device determines a real relative angle between the first electronic device and the second electronic device based on the two first possible angles and the two second possible angles.

Embodiment 6

Different from Embodiment 1, in this embodiment, a first electronic device has at least three loudspeakers, three loudspeakers of the at least three loudspeakers are not located on one straight line, and a second electronic device has at least one microphone.

The following describes this embodiment by using an example in which the first electronic device has three loudspeakers and the second electronic device has one microphone.

Figure 27A:
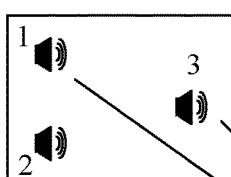
FIG. 27A and FIG. 27B are schematic diagrams of scenarios of determining an angle between electronic devices according to an embodiment.
Figure 27A:
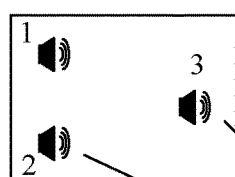
Figure 27A:

Referring to FIG. 27A, a loudspeaker 1 and a loudspeaker 3 of the first electronic device transmit two ultrasound signals, and the microphone of the second electronic device receives the two ultrasound signals. The second electronic device determines two possible angles $\theta_{31}$ and $\theta_{32}$ of the first electronic device relative to the second electronic device based on a time difference between receiving the two ultrasound signals through the microphone.

Figure 27B:

Referring to FIG. 27B, a loudspeaker 2 and the loudspeaker 3 of the first electronic device transmit two ultrasound signals, and the microphone of the second electronic device receives the two ultrasound signals. The second electronic device determines two possible angles $\theta_{41}$ and $\theta_{42}$ of the first electronic device relative to the second electronic device based on a time difference between receiving the two ultrasound signals through the microphone.

The second electronic device determines an actual angle of the first electronic device relative to the second electronic device based on the four possible angles. For example, the first electronic device calculates $|\theta_{31}-\theta_{41}|$, $|\theta_{31}-\theta_{42}|$, $|\theta_{32}-\theta_{41}|$, and $|\theta_{32}-\theta_{42}|$, and uses two angles corresponding to a smallest difference as actual angles of the first electronic device relative to the second electronic device. Alternatively, the first electronic device uses an average value of two angles corresponding to a smallest difference as an actual angle of the first electronic device relative to the second electronic device.

It should be noted that, in other embodiments, alternatively, the loudspeaker 1 and the loudspeaker 2 of the first electronic device may transmit two ultrasound signals, and the loudspeaker 2 and the loudspeaker 3 of the first electronic device may transmit two ultrasound signals.

In some embodiments, when the first electronic device or the second electronic device has four or more loudspeakers, a combination of a first loudspeaker and any second loudspeaker may be used to transmit an ultrasound signal, where the second loudspeaker is a plurality of loudspeakers located on one straight line, and the first loudspeaker is a loudspeaker that is not located on one straight line with the second loudspeaker.

For example, the first electronic device has four loudspeakers, and any three loudspeakers are not located on one straight line. Referring to FIG. 28A, the first electronic device transmits two ultrasound signals through a loudspeaker 1 and a loudspeaker 4, and the microphone of the second electronic device receives the two ultrasound signals. Referring to FIG. 28B, the first electronic device transmits two ultrasound signals through a loudspeaker 2 and a loudspeaker 3, and the microphone of the second electronic device receives the two ultrasound signals.

Embodiment 7

Different from Embodiment 1, in this embodiment, a first electronic device has at least one microphone, a second electronic device has at least three loudspeakers, and three loudspeakers of the at least three loudspeakers are not located on one straight line.

The second electronic device sends an ultrasound signal to the first electronic device through a loudspeaker, and the first electronic device receives the ultrasound signal through a microphone. The first electronic device determines an actual angle of the second electronic device relative to the first electronic device based on a time difference between receiving the ultrasound signal through the microphone. For a specific process, refer to Embodiment 6. Details are not described herein again.

The first electronic device may request the second electronic device to send the ultrasound signal to the first electronic device; or the second electronic device sends the ultrasound signal to the first electronic device directly through a loudspeaker.

Embodiment 8

Different from Embodiment 1, in this embodiment, a first electronic device may have at least two loudspeakers, and a second electronic device may have at least two microphones. The following describes this embodiment by using an example in which the first electronic device has two loudspeakers and the second electronic device has two microphones.

Referring to FIG. 29A, the two loudspeakers of the first electronic device transmit two ultrasound signals, and a microphone of the second electronic device receives the two ultrasound signals. The second electronic device determines two possible angles $\theta_{51}$ and $\theta_{52}$ of the first electronic device relative to the second electronic device based on a time difference between receiving the two ultrasound signals through one of the microphones.

Referring to FIG. 29B, the loudspeaker of the first electronic device transmits an ultrasound signal, and the two microphones of the second electronic device receive the ultrasound signal. The second electronic device determines two possible angles $\theta_{61}$ and $\theta_{62}$ of the first electronic device relative to the second electronic device based on a time difference between receiving the ultrasound signal through the two microphones.

The second electronic device determines an actual angle of the first electronic device relative to the second electronic device based on the four possible angles. For example, the first electronic device calculates $|\theta_{51}-\theta_{61}|$, $|\theta_{51}-\theta_{62}|$, $|\theta_{52}$-

$\theta_{61}|$, and $|\theta_{52}-\theta_{62}|$, and uses two angles corresponding to a smallest difference as actual angles of the first electronic device relative to the second electronic device. Alternatively, the first electronic device uses an average value of two angles corresponding to a smallest difference as an actual angle of the first electronic device relative to the second electronic device.

It should be noted that, in other embodiments, the second electronic device may have at least two loudspeakers, and the first electronic device may have at least two microphones. Two loudspeakers of the second electronic device transmit two ultrasound signals, and a microphone of the first electronic device receives the two ultrasound signals. In addition, one loudspeaker of the second electronic device transmits an ultrasound signal, and two microphones of the first electronic device receive the ultrasound signal.

Embodiment 9

Different from Embodiment 8, in this embodiment, a first electronic device may have at least two microphones, and a second electronic device may have at least two loudspeakers.

The second electronic device sends an ultrasound signal to the first electronic device through a loudspeaker, and the first electronic device receives the ultrasound signal through a microphone. The first electronic device determines an actual angle of the second electronic device relative to the first electronic device based on a time difference between receiving the ultrasound signal through the microphone. For a specific process, refer to Embodiment 8. Details are not described herein again.

The first electronic device may request the second electronic device to send the ultrasound signal to the first electronic device; or the second electronic device sends the ultrasound signal to the first electronic device directly through a loudspeaker.

Optionally, an embodiment further provides an electronic device, including one or more processors, a memory, and two loudspeakers. The memory and the two loudspeakers are coupled to the one or more processors. The memory is configured to store computer program code. The two loudspeakers are configured to send ultrasound signals. The computer program code includes computer instructions. When the one or more processors execute the computer instructions, the electronic device is enabled to perform one or more steps in any one of the foregoing methods.

Optionally, an embodiment further provides an electronic device, including one or more processors, a memory, and a microphone. The memory and the microphone are coupled to the one or more processors. The memory is configured to store computer program code. The microphone is configured to receive an ultrasound signal. The computer program code includes computer instructions. When the one or more processors execute the computer instructions, the electronic device is enabled to perform one or more steps in any one of the foregoing methods.

Optionally, an embodiment further provides a computer-readable storage medium. The computer-readable storage medium stores instructions. When the instructions run on a computer or a processor, the computer or the processor is enabled to perform one or more steps in any one of the foregoing methods.

Optionally, an embodiment further provides a computer program product including instructions. When the computer program product runs on a computer or a processor, the computer or the processor is enabled to perform one or more steps in any one of the foregoing methods.

Optionally, an embodiment further provides a chip system. The chip system may include a memory and a processor. The processor executes a computer program stored in the memory, to implement one or more steps in any one of the foregoing methods. The chip system may be a single chip, or a chip module including a plurality of chips.

Optionally, an embodiment further provides a chip system. The chip system may include a processor, the processor is coupled to a memory, and the processor executes a computer program stored in the memory, to implement one or more steps in any one of the foregoing methods. The chip system may be a single chip, or a chip module including a plurality of chips.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, all or some of the procedures or functions according to embodiments are generated. The computer may be a general-purpose computer, a dedicated computer, a computer network, or other programmable apparatuses. The computer instructions may be stored in a computer-readable storage medium, or may be transmitted through the computer-readable storage medium. The computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid-state disk (SSD)), or the like.

Persons of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a read-only memory (ROM), a random-access memory (RAM), a magnetic disk, or an optical disc.

In conclusion, the foregoing descriptions are merely specific implementations of this disclosure, but are not intended to limit the protection scope of this disclosure. Any variation or replacement within the technical scope disclosed shall fall within the protection scope of this disclosure. Therefore, the protection scope of this disclosure shall be subject to the protection scope of the claims.

What is claimed is:

1. A method applied to a first electronic device, wherein the method comprises:
sending first sound wave signals through one or more loudspeakers;
receiving, through a first microphone, second sound wave signals from a second electronic device;

determining a first receiving result of receiving the second sound wave signals;

determining a first possible angle value between the second electronic device and the first electronic device based on the first receiving result;

receiving, from the second electronic device, a second possible angle value between the first electronic device and the second electronic device; and determining an actual angle between the first electronic device and the second electronic device based on the first possible angle value and the second possible angle value, or sending the first possible angle value to the second electronic device and receiving the actual angle from the second electronic device.

2. The method of claim 1, wherein the first receiving result comprises:
a first time difference between receiving the second sound wave signals through the first microphone; or
a first signal strength of the second sound wave signals received through the first microphone.

3. The method of claim 2, wherein determining the first possible angle value comprises:
determining a first direction from the second electronic device to the first electronic device based on the first time difference or the first signal strength;
determining a first included angle between the first direction and an orientation of the first electronic device; and
determining two first possible angle values between the second electronic device and the first electronic device based on the first included angle and the orientation of the first electronic device.

4. The method of claim 3, wherein there are two second possible angle values, and wherein determining the actual angle comprises:
negating the two second possible angle values;
calculating differences between the two negated second possible angle values and the two first possible angle values, wherein each of the differences corresponds to two angle values; and
determining the actual angle based on two angle values corresponding to a smallest value among the differences.

5. The method of claim 1, wherein the one or more loudspeakers comprise a first loudspeaker and a second loudspeaker, wherein sending the first sound wave signals:
sending a third sound wave signal of the first sound wave signals through the first loudspeaker; and
sending a fourth sound wave signal of the first sound wave signals through the second loudspeaker, and
wherein a sending time of the first sound wave signal is different from a sending time of the second sound wave signal and/or wherein the first sound wave signal and the second sound wave signal have different characteristics.

6. The method of claim 1, wherein the one or more loudspeakers consist of one loudspeaker, and wherein the first sound wave signal and the second sound wave signal are sent through the one loudspeaker.

7. The method of claim 1, wherein the method further comprises:
detecting a first operation on first target content displayed on the first electronic device; and
sending, by the first electronic device, the first target content to a display interface of the second electronic device for display when the first operation corresponds to the actual angle.

8. The method of claim 1, wherein the method further comprises:
detecting a second operation on first target content displayed on the first electronic device; and
sending, by the first electronic device, the first target content to a display interface of a second electronic device located on a left side of the first electronic device when the second operation is an operation of extending the first target content leftwards.

9. The method of claim 1, wherein the method further comprises redetermining a redetermined actual angle between the second electronic device and the first electronic device after a location of the first electronic device and/or a location of the second electronic device changes.

10. The method of claim 1, wherein the second possible angle value between the first electronic device and the second electronic device that is sent by the second electronic device is determined based on a second receiving result, wherein the second receiving result is a receiving result based on receiving the at least two sound wave signals through a microphone of the second electronic device; or
wherein the actual angle is determined by the second electronic device based on the first possible angle value and the second possible angle value, wherein the second possible angle value is determined based on a second receiving result, and wherein the second receiving result is based on receiving, through a microphone of the second electronic device, the sound wave signals sent by the first electronic device.

11. The method of claim 1, wherein the method further comprises:
detecting a second operation on a first target content displayed on the first electronic device; and
sending, by the first electronic device, the first target content to a display interface of the second electronic device located on a right side of the first electronic device when the second operation is an operation of extending the first target content rightwards.

12. An angle determining method, applied to a first electronic device, wherein the method comprises:
sending first sound wave signals through a first group of loudspeakers;
sending second sound wave signals through a second group of loudspeakers, wherein a time at which the first sound wave signals are sent through the first group of loudspeakers is different from a time at which the second sound wave signals are sent through the second group of loudspeakers, and/or wherein characteristics of the first sound wave signals are different from characteristics of the second sound wave signals; and
receiving an actual angle between the first electronic device and a second electronic device from the second electronic device, wherein the actual angle is determined by the second electronic device based on a first possible angle value and a second possible angle value, the first possible angle value is determined based on a receiving result of receiving, through a microphone of the second electronic device, the at least two sound wave signals sent through the first group of loudspeakers, and the second possible angle value is determined by the second electronic device based on receiving, through the microphone of the second electronic device, the at least two sound wave signals sent through the second group of loudspeakers.

13. The method of claim 12,
wherein the first electronic device comprises a first loudspeaker, a second loudspeaker, and a third loudspeaker deployed in a nonlinear arrangement, wherein the first group of loudspeakers and the second group of loudspeakers each comprise any two of the first loudspeaker, the second loudspeaker, and the third loudspeaker, and wherein the loudspeakers in the first group of loudspeakers and the second group of loudspeakers are not identical;

wherein the first electronic device comprises a first loudspeaker, a second loudspeaker, a third loudspeaker, and a fourth loudspeaker arranged in a quadrilateral, wherein a first group of loudspeakers consists of the first loudspeaker and the third loudspeaker and are located at two opposite angles of the quadrilateral, and wherein a second group of loudspeakers consists of the second loudspeaker and the fourth loudspeaker and are located at two opposite angles of the quadrilateral; or wherein the first electronic device comprises a first loudspeaker and a second loudspeaker, wherein a first group of loudspeakers consists of the first loudspeaker and the second loudspeaker, and wherein a second group of loudspeakers consists of one of the first loudspeaker or the second loudspeaker.

14. The method of claim 12, wherein the method further comprises:
detecting a first operation on first target content displayed on the first electronic device;
determining whether the first operation is corresponding to the actual angle; and
sending, by the first electronic device, the first target content to a display interface of the second electronic device when the first operation corresponds to the actual angle.

15. The method of claim 12, wherein the method further comprises:
detecting a second operation on a first target content displayed on the first electronic device; and
sending, by the first electronic device, the first target content to a display interface of a second electronic device located on a left side of the first electronic device when the second operation is an operation of extending the first target content leftwards.

16. The method of claim 12, wherein the method further comprises redetermining a redetermined actual angle between the second electronic device and the first electronic device after a location of the first electronic device and/or a location of the second electronic device changes.

17. The method of claim 12, wherein the method further comprises:
detecting a second operation on a first target content displayed on the first electronic device; and
sending, by the first electronic device, the first target content to a display interface of a second electronic device located on a right side of the first electronic device when the second operation is an operation of extending the first target content rightwards.

18. A first electronic device, comprising:
a memory configured to store computer program code comprising computer instructions;
a display; and
one or more processors coupled to the memory and the display, wherein execution of the instructions by the one or more processors causes the electronic device to:
send at least two sound wave signals through one or more loudspeakers;
receive, through a microphone, at least two sound wave signals from a second electronic device, and determine a first receiving result of receiving the at least two sound wave signals;
determine a first possible angle value between the second electronic device and the first electronic device based on the first receiving result;
receive, from the second electronic device, a second possible angle value between the first electronic device and the second electronic device;
determine an actual angle between the first electronic device and the second electronic device based on the first possible angle value and the second possible angle value, or send the first possible angle value to the second electronic device, and receive an actual angle between the first electronic device and the second electronic device from the second electronic device; and
display the actual angle.

19. The first electronic device of claim 18, wherein the one or more loudspeakers comprise a first loudspeaker and a second loudspeaker, wherein sending at least two sound wave signals comprises:
sending a first sound wave signal through the first loudspeaker; and
sending a second sound wave signal through the second loudspeaker, and
wherein a sending time of the first sound wave signal is different from a sending time of the second sound wave signal, and/or wherein the first sound wave signal and the second sound wave signal are two sound wave signals with different characteristics.

20. The first electronic device of claim 18, wherein the first electronic device further comprises a first loudspeaker, a second loudspeaker, and a third loudspeaker deployed in a nonlinear arrangement, wherein a first group of loudspeakers and a second group of loudspeakers each comprise any two of the first loudspeaker, the second loudspeaker, and the third loudspeaker, and wherein the loudspeakers in the first group of loudspeakers and the second group of loudspeakers are not identical; or wherein the first electronic device further comprises a first loudspeaker, a second loudspeaker, a third loudspeaker, and a fourth loudspeaker arranged in a quadrilateral, wherein a first group of loudspeakers consists of the first loudspeaker and the third loudspeaker and are located at two opposite angles of the quadrilateral, and wherein a second group of loudspeakers consists of the second loudspeaker and the fourth loudspeaker and are located at two opposite angles of the quadrilateral; or wherein the first electronic device further comprises a first loudspeaker and a second loudspeaker, wherein a first group of loudspeakers consists of the first loudspeaker and the second loudspeaker, and wherein a second group of loudspeakers consists of one of the first loudspeaker or the second loudspeaker.

* * * * *